US012155210B2

(12) United States Patent
Zeighami et al.

(10) Patent No.: US 12,155,210 B2
(45) Date of Patent: Nov. 26, 2024

(54) TECHNIQUES FOR ORCHESTRATED LOAD SHEDDING

(71) Applicant: Oracle International Corporation, Redwood Shores, CA (US)

(72) Inventors: Roy Mehdi Zeighami, Fall City, WA (US); Sumeet Kochar, Cary, NC (US); Jonathan Luke Herman, Seattle, WA (US); Mark Lee Huang, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/338,962

(22) Filed: Jun. 21, 2023

(65) Prior Publication Data

US 2024/0154418 A1    May 9, 2024

Related U.S. Application Data

(60) Provisional application No. 63/439,576, filed on Jan. 18, 2023, provisional application No. 63/423,762, filed on Nov. 8, 2022.

(51) Int. Cl.
*G06F 9/46* (2006.01)
*G06F 9/50* (2006.01)
(Continued)

(52) U.S. Cl.
CPC ............ *H02J 3/003* (2020.01); *G06F 9/5094* (2013.01); *H02J 3/14* (2013.01); *H02J 3/144* (2020.01);
(Continued)

(58) Field of Classification Search
CPC .... H02J 3/144; H02J 2203/20; H02J 2310/60; G06F 9/5094; G06F 2209/5019; G06F 2209/504; G06F 2209/506
(Continued)

(56) References Cited

U.S. PATENT DOCUMENTS

| 5,546,568 A | * 8/1996 | Bland ................ G06F 1/324 |
| | | 713/601 |
| 8,006,108 B2 | 8/2011 | Brey et al. |

(Continued)

FOREIGN PATENT DOCUMENTS

| WO | 2019213466 A1 | 11/2019 |
| WO | 2021211220 A1 | 10/2021 |
| WO | 2021214752 A1 | 10/2021 |

OTHER PUBLICATIONS

US 11,971,693 B2, 04/2024, Kochar et al. (withdrawn)
(Continued)

*Primary Examiner* — Bradley A Teets
(74) *Attorney, Agent, or Firm* — Kilpatrick Townsend & Stockton LLP

(57) ABSTRACT

Disclosed techniques relate to orchestrating power consumption reductions across a number of hosts. A number of response levels may be utilized, each having an association to a corresponding set of reduction actions. The impact to customers, hosts, and/or workloads can be computed at run time based on current and/or predicted conditions and workloads, and a particular response level can be selected based on the computed impact. These techniques enable a sufficient, but least impactful response to be employed.

19 Claims, 20 Drawing Sheets

(51) Int. Cl.
*H02J 3/00* (2006.01)
*H02J 3/14* (2006.01)

(52) U.S. Cl.
CPC .............. *G06F 2209/5019* (2013.01); *G06F 2209/504* (2013.01); *G06F 2209/506* (2013.01); *H02J 2203/20* (2020.01); *H02J 2310/60* (2020.01); *H02J 2310/62* (2020.01)

(58) Field of Classification Search
USPC ........................................................ 718/103
See application file for complete search history.

(56) References Cited

U.S. PATENT DOCUMENTS

| | | |
|---|---|---|
| 8,514,215 B2 | 8/2013 | Cases et al. |
| 8,694,810 B2 | 4/2014 | Ahluwalia et al. |
| 8,732,503 B2 | 5/2014 | Okano |
| 8,738,193 B2 | 5/2014 | Furuichi et al. |
| 8,843,772 B2 | 9/2014 | Hormuth |
| 8,914,157 B2 | 12/2014 | Li et al. |
| 8,930,725 B2 | 1/2015 | Wang |
| 9,003,211 B2 | 4/2015 | Pfeiffer |
| 9,146,814 B1 | 9/2015 | van der Merwe et al. |
| 9,262,272 B2 | 2/2016 | Akers et al. |
| 9,538,689 B2 | 1/2017 | Dasario et al. |
| 9,595,070 B2 | 3/2017 | Matsuoka et al. |
| 9,880,599 B1 | 1/2018 | Allen-Ware et al. |
| 10,075,327 B2 | 9/2018 | Maltz et al. |
| 10,460,403 B2* | 10/2019 | Janssen .................. G06Q 10/04 |
| 10,608,433 B1 | 3/2020 | McNamara et al. |
| 10,643,121 B2 | 5/2020 | Evans et al. |
| 11,099,628 B2 | 8/2021 | Ananthakrishnan et al. |
| 11,106,528 B2 | 8/2021 | Wolfson et al. |
| 11,157,380 B2 | 10/2021 | Sethi et al. |
| 11,275,429 B2 | 3/2022 | Singh et al. |
| 11,287,868 B1 | 3/2022 | Sturm et al. |
| 11,349,337 B2 | 5/2022 | Gyota |
| 11,397,457 B2 | 7/2022 | Jain et al. |
| 11,397,634 B1 | 7/2022 | Monga et al. |
| 11,398,729 B1* | 7/2022 | Upreti .................. H02J 7/0063 |
| 11,514,354 B2 | 11/2022 | Rajnayak et al. |
| 11,544,676 B2 | 1/2023 | Ghosh et al. |
| 11,561,851 B2 | 1/2023 | Wolfson et al. |
| 11,656,928 B2 | 5/2023 | Monga et al. |
| 12,007,734 B2 | 6/2024 | Kochar et al. |
| 2003/0037150 A1 | 2/2003 | Nakagawa |
| 2003/0056125 A1 | 3/2003 | O'Conner et al. |
| 2003/0171851 A1* | 9/2003 | Brickfield .............. H02J 3/003 700/286 |
| 2004/0264124 A1 | 12/2004 | Patel et al. |
| 2005/0102544 A1 | 5/2005 | Brewer et al. |
| 2005/0138438 A1 | 6/2005 | Bodas |
| 2006/0028347 A1* | 2/2006 | Ziejewski ............... H02J 9/002 361/57 |
| 2007/0067656 A1 | 3/2007 | Ranganathan et al. |
| 2008/0320322 A1 | 12/2008 | Green et al. |
| 2009/0070611 A1 | 3/2009 | Bower, III et al. |
| 2009/0210215 A1 | 8/2009 | Lorge |
| 2009/0240964 A1 | 9/2009 | Pfeiffer |
| 2011/0047390 A1 | 2/2011 | Bolan et al. |
| 2011/0090077 A1 | 4/2011 | Meyer et al. |
| 2011/0173465 A1 | 7/2011 | Akers et al. |
| 2011/0301911 A1 | 12/2011 | VanGilder et al. |
| 2012/0017219 A1 | 1/2012 | Hsieh et al. |
| 2012/0109394 A1 | 5/2012 | Takagi et al. |
| 2012/0283888 A1 | 11/2012 | Mao et al. |
| 2012/0323382 A1 | 12/2012 | Kamel et al. |
| 2014/0001847 A1* | 1/2014 | Khandelwal ...... H02J 13/00004 307/11 |
| 2014/0006819 A1* | 1/2014 | Min ........................ G06F 1/324 713/320 |
| 2014/0137107 A1 | 5/2014 | Banerjee et al. |
| 2014/0331039 A1 | 11/2014 | Akers et al. |
| 2015/0234879 A1* | 8/2015 | Baldwin ............. G06F 16/1727 707/694 |
| 2015/0309560 A1 | 10/2015 | Ling et al. |
| 2016/0054779 A1 | 2/2016 | Bodas et al. |
| 2016/0102880 A1 | 4/2016 | Lovicott et al. |
| 2016/0291656 A1 | 10/2016 | Jenne et al. |
| 2016/0294211 A1 | 10/2016 | Tricarico et al. |
| 2017/0017288 A1 | 1/2017 | Bose et al. |
| 2017/0351232 A1 | 12/2017 | Chen et al. |
| 2019/0332164 A1* | 10/2019 | Sinha .................... G06F 1/3225 |
| 2020/0073456 A1 | 3/2020 | Nguyen et al. |
| 2020/0136396 A1 | 4/2020 | Sun |
| 2020/0272889 A1 | 8/2020 | Evans et al. |
| 2020/0331636 A1 | 10/2020 | Mulholland et al. |
| 2020/0380295 A1 | 12/2020 | Natsumeda et al. |
| 2021/0042140 A1 | 2/2021 | Paul et al. |
| 2021/0081020 A1 | 3/2021 | Ghose |
| 2021/0081266 A1 | 3/2021 | Kern et al. |
| 2021/0190362 A1 | 6/2021 | Ko et al. |
| 2021/0262689 A1 | 8/2021 | Shinde et al. |
| 2021/0302043 A1 | 9/2021 | Dempsey |
| 2021/0303388 A1 | 9/2021 | George et al. |
| 2021/0318745 A1 | 10/2021 | Manousakis et al. |
| 2021/0349776 A1 | 11/2021 | Wolfson et al. |
| 2021/0397239 A1 | 12/2021 | Sethi et al. |
| 2021/0405727 A1 | 12/2021 | Singh et al. |
| 2022/0090804 A9 | 3/2022 | Magcale |
| 2022/0164186 A1* | 5/2022 | Pamidala ............... G06F 18/213 |
| 2022/0334558 A1 | 10/2022 | Huang et al. |
| 2022/0410171 A1 | 12/2022 | Ghose |
| 2023/0037609 A1 | 2/2023 | Gururaja et al. |
| 2023/0061136 A1* | 3/2023 | Abdollahian Noghabi ................. G06F 9/5072 |
| 2023/0069177 A1 | 3/2023 | Albright et al. |
| 2023/0108991 A1 | 4/2023 | Sato et al. |
| 2023/0117225 A1 | 4/2023 | Porto Guedes et al. |
| 2023/0148090 A1* | 5/2023 | Mazur ................ G05B 19/4188 700/97 |
| 2023/0153680 A1 | 5/2023 | Rohrkemper et al. |
| 2023/0208139 A1* | 6/2023 | Holveck ........... H02J 13/00004 700/295 |
| 2023/0229216 A1 | 7/2023 | Lerer et al. |
| 2023/0236923 A1 | 7/2023 | Gowri et al. |
| 2023/0239809 A1 | 7/2023 | Mukherjee et al. |
| 2023/0259102 A1 | 8/2023 | Misra et al. |
| 2023/0259112 A1 | 8/2023 | Cheon et al. |
| 2023/0367378 A1* | 11/2023 | Vaysman ................ G06F 1/206 |

OTHER PUBLICATIONS

Shervin et al., "Intelligent Load Shedding Need for a Fast and Optimal Solution", 2005 (Year: 2005).*
"Active Power Management™ For Green Data Centers A Breakthrough Approach for Energy-efficient Operation of Your Servers", Cassatt Corporation, Available Online at: https://ftpdocs.broadcom.com/cadocs/IM_Documents/ecoMeter/Cassatt/GDCWhitePaper09_03%20FINAL.pdf, 2007, pp. 1-8.
"Cassatt Announces Strategy to Save Energyby Turning Off Idle Servers in the Data Center", DatacenterDynamics, Available Online at: https://www.datacenterdynamics.com/en/news/cassatt-announces-strategy-to-save-energy-by-turning-off-idle-servers-in-the-data-center-2/, Sep. 4, 2007, pp. 1-8.
"Intelligent Load Shedding |Optimal Load Preservation |Intelligent Load Restoration https://", Operation Technology, Inc., Available Online at: https://etap.com/solutions/load-shedding-system, 2022, pp. 1-11.
"Patentability Search Report", 19 pages.
"Taking Automatic Corrective Action in Your Data Center", AVTECH Software Inc., Available Online at: https://avtech.com/articles/9054/taking-automatic-corrective-action-data-center, Accessed from Internet on Jan. 4, 2023, pp. 1-4.
Li et al., "A Scalable Priority-Aware Approach to Managing Data Center Server Power", IEEE International Symposium on High-Performance Computer Architecture (HPCA), Available Online at: https://www.pdl.cmu.edu/PDL-FTP/PowerMgmt/CapMaestro_HPCA2019.pdf, Feb. 2019, pp. 1-14.

(56) References Cited

OTHER PUBLICATIONS

Patentability Search Report mailed on Feb. 2, 2023, 18 pages.
U.S. Appl. No. 18/202,712, Non-Final Office Action mailed on Sep. 15, 2023, 12 pages.
U.S. Appl. No. 18/339,114, Non-Final Office Action mailed on Aug. 31, 2023, 22 pages.
Bhattacharya et al., The Need for Speed and Stability in Data Center Power Capping, International Green Computing Conference (IGCC), Available Online at: http://sdb.cs.berkeley.edu/sdb/files/publications/local/the_need_for_speed.pdf, Jun. 4-8, 2012, 10 pages.
Chen et al., Dynamic Server Power Capping for Enabling Data Center Participation in Power Markets, IEEE/ACM International Conference on Computer-Aided Design (ICCAD), Available Online at: https://www.bu.edu/peaclab/files/2014/03/chen_ICCAD13.pdf, Nov. 18-21, 2013, 8 pages.
Li et al., CapMaestro: Exploiting Power Redundancy, Data Center—Wide Priorities, and Stranded Power for Boosting Data Center Performance, IBM Research Report RC25680, Mar. 28, 2018, 19 pages.
Sakalkar et al., Data Center Power Oversubscription with a Medium Voltage Power Plane and Priority-Aware Capping, Proceedings of the Twenty-Fifth International Conference on Architectural Support for Programming Languages and Operating Systems, Mar. 16-20, 2020, pp. 497-511.
Wu et al., Dynamo: Facebook's Data Center-Wide Power Management System, ACM/IEEE 43rd Annual International Symposium on Computer Architecture, Available Online at: http://ieeexplore.ieee.org/document/7551415/, Jun. 18-22, 2016, pp. 469-480.
U.S. Appl. No. 18/338,695, Non-Final Office Action mailed on Nov. 29, 2023, 21 pages.
International Application No. PCT/US2023/030096, International Search Report and Written Opinion mailed on Nov. 22, 2023, 23 pages.
International Application No. PCT/US2023/030101, International Search Report and the Written Opinion mailed on Dec. 6, 2023, 22 pages.
International Application No. PCT/US2023/030106, International Search Report and Written Opinion mailed on Nov. 27, 2023, 28 pages.
U.S. Appl. No. 18/202,712, Notice of Allowance mailed on Jan. 31, 2024, 5 pages.
U.S. Appl. No. 18/202,712 , "Corrected Notice of Allowability", May 1, 2024, 2 pages.
U.S. Appl. No. 18/338,695 , Final Office Action, Mailed On Apr. 18, 2024, 23 pages.
U.S. Appl. No. 18/339,114 , Final Office Action, Mailed On Apr. 18, 2024, 23 pages.
U.S. Appl. No. 18/338,695, Non-Final Office Action, Mailed On Sep. 19, 2024, 26 pages.

* cited by examiner

| VEPO Response Levels | Reduction Action(s) |
|---|---|
| VEPO Response Level 1 | Power off vacant/idle hosts and hypervisors that can be evacuated completely |
| VEPO Response Level 2 | All action(s) of VEPO Level 1. Power off hypervisors hosting an instance or workload associated with a customer of category 1. |
| VEPO Response Level 3 | All action(s) of VEPO Level 2. Power off category 2 BMs and hypervisors hosting category 3 VMs (Exclude BMs and VMs associated with customer and/or cloud services of priority level 1. |
| VEPO Response Level 4 | All action(s) of VEPO Level 3. Power off all hosts in compute user enclave except those that persist state 1 and/or are critical for recovery. |
| ... | ... |

*FIG. 8*

TECHNIQUES FOR ORCHESTRATED LOAD SHEDDING

CROSS REFERENCES TO RELATED APPLICATIONS

The present application claims priority to U.S. Provisional Application No. 63/423,762, filed Nov. 8, 2022, entitled "Orchestrated DC-Scale Load Shedding," and U.S. Provisional Application No. 63/439,576, filed Jan. 18, 2023, entitled "Orchestrated DC-Scale Load Shedding," the content of which are herein incorporated by reference in their entirety for all purposes.

BACKGROUND

Datacenters are configured with a power infrastructure that affords numerous safety features according to a hierarchical power distribution. Power is provided from a local power utility and allocated to various components of the datacenter including power distribution units (PDUs) (e.g., transformers, switch boards, bus ways, rack PDUs, etc.) and power consuming devices (e.g., servers, network devices, etc.) according to this power distribution hierarchy. This ensures that power consumed by all downstream devices adheres to the power limits of each device upstream. When demand peaks and/or when components fail, the datacenter may no longer be able to effectively handle the demand, potentially resulting in widespread power failure, causing significant disruption to at least the downstream devices, resulting in reduced processing capabilities within the datacenter and/or datacenter power failure, which in turn leads to a poor user experience. In worst-case scenarios, a power failure in one datacenter can trigger a cascading power failure of other devices within the same datacenter or within other datacenters as workloads are redistributed in an attempt to recover from the initial power outage. Additionally, in some embodiments, external factors (e.g., government regulation mandates) may require a decrease in power consumption of a particular datacenter for a particular time.

Conventional methods to managing load shedding included manual tasks in which an operator shut down host racks or individual devices, one by one, to reduce power consumption. Alternatively, conventional techniques include pressing an emergency shut off switch or button configured to turn off power to the whole, or large portion, of the datacenter. The operator determining which components to power down typically has no insight as to the workloads or customers impacted by those actions or the extent of the effects of taking those actions. Conventional approaches like the ones mentioned here lead to a suboptimal approach with respect to affected customers and workloads. A more sophisticated approach may result in less impact to customer and/or devices/workloads, while still providing the power reduction desired for the situation. Therefore, it is desirable to improve power management techniques, specifically with respect to load shedding, to reduce power consumption to an impact and amount that is sufficient and avoids the pitfalls of conventional approaches.

BRIEF SUMMARY

In the following description, for the purposes of explanation, specific details are set forth in order to provide a thorough understanding of certain embodiments. However, it will be apparent that various embodiments may be practiced without these specific details. The figures and description are not intended to be restrictive.

Some embodiments may include a method. The method may comprise identifying, by the computer system, respective sets of workloads executing on each of a plurality of hosts. The method may comprise identifying, by a computer system, a plurality of response levels that specify applicability of a respective set of reduction actions to a plurality of hosts. In some embodiments, a first response level of the plurality of response levels may specify applicability of a first set of reduction actions to the plurality of resources. The method may comprise determining a first estimate for a power reduction resulting from the first response level based at least on (a) the respective sets of workloads executing on each of the plurality of hosts and (b) applicability of the first set of reduction actions on the plurality of hosts according to the first response level. The method may comprise selecting the first response level from the plurality of response levels based at least on the first estimate for the power reduction resulting from the first response level. The method may comprise causing application of the first set of reduction actions to the plurality of hosts according to the selected first response level.

In some embodiments, the method may further comprise determining a second estimate for the power reduction resulting from a second response level of the plurality of response levels based at least on (a) the respective sets of workloads executing on each of the plurality of hosts and (b) applicability of a second set of reduction actions on the plurality of hosts according to the second response level. In some embodiments, selecting the first response level from the plurality of response levels is based at least on the first estimate for the power reduction resulting from the first response level.

In some embodiments, determining the first estimate for the power reduction resulting from the first response level comprises any suitable combination of: 1) determining that the first set of reduction actions are applicable to a first subset of the plurality of hosts, 2) identifying the respective sets of workloads executing on each of the first subset of hosts, and/or 3) determining respective power consumptions of the respective sets of workloads executing on each of the first subset of hosts.

In some embodiments, determining the first estimate for the power reduction resulting from the first response level further comprises determining a sum of the respective power consumptions of the respective sets of workloads executing on each of the first subset of hosts as the first estimate for the power reduction resulting from the first response level.

In some embodiments, determining the first estimate for the power reduction resulting from the first response level further comprises any suitable combination of 1) determining respective estimated power consumptions of the respective sets of workloads executing on each of the first subset of hosts after application of the first set of reduction actions to the first subset of hosts, and/or 2) determining the first estimate for the power reduction resulting from the first response level based on (a) the respective power consumptions of the respective sets of workloads executing on each of the first subset of hosts and (b) the respective estimated power consumptions of the respective sets of workloads executing on each of the first subset of hosts after application of the first set of reduction actions to the first subset of hosts.

In some embodiments, the method further comprises 1) determining a difference between a current value for an aggregate power consumption of the plurality of hosts and a current value for an aggregate power threshold of the plurality of hosts and 2) determining that the first value for the power reduction resulting from the first response level is greater than the difference. In some embodiments, selecting the first response level is based at least on determining that the first value for the power reduction resulting from the first response level is greater than the difference.

In some embodiments, the respective sets of workloads executing on each of a plurality of hosts and the plurality of response levels that specify applicability of the respective set of reduction actions to the plurality of hosts are identified based at least in part on at least one of: 1) identifying a degradation or failure of a temperature control system for a physical environment including the plurality of hosts, or 2) identifying a government reduction in power supply, or 3) identifying an increase in external temperature.

A second method is disclosed herein. The second method may comprise identifying, by a computer system, respective sets of workloads executing on each of a plurality of hosts. The second method may comprise identifying, by the computer system, a plurality of response levels that specify applicability of a respective set of reduction actions to the plurality of hosts. In some embodiments, a first response level of the plurality of response levels specifies applicability of a first set of reduction actions to the plurality of resources such that a first reduction action of the first set of reduction actions is applicable to a first resource of the plurality of resources. The second method may comprise determining a first estimate for a predicted impact resulting from the first response level based at least on (a) the respective sets of workloads executing on each of the plurality of hosts and (b) applicability of the first set of reduction actions on the plurality of hosts according to the first response level. In some embodiments, the workload impact is determined based on at least one of a priority of a host, or a number of affected hosts, a number of affected workloads, priority levels of the affected workloads, a number of affected customers, or priority levels of the affected customers. The second method may comprise selecting the first response level from the plurality of response levels based at least on the first estimate for the workload impact resulting from the first response level. The second method may comprise causing application of the first set of reduction actions to the plurality of hosts according to the selected first response level.

In some embodiments, the second method may comprise determining a second estimate for the workload impact resulting from a second response level of the plurality of response levels based at least on (a) the respective sets of workloads executing on each of the plurality of hosts and (b) applicability of a second set of reduction actions on the plurality of hosts according to the second response level. In some embodiments, selecting the first response level from the plurality of response levels is based at least on the first estimate for the workload impact resulting from the first response level and the second estimate for the workload impact resulting from the second response level.

In some embodiments, the first set of reduction actions is more severe than the second set of reduction actions, and the first estimate for the workload impact resulting from the first response level is less than the second estimate for the workload impact resulting from the second response level.

In some embodiments, determining the first estimate for the workload impact resulting from the first response level comprises at least one of: 1) determining that the first set of reduction actions are applicable to a first subset of the plurality of hosts, 2) identifying the respective sets of workloads executing on each of the first subset of hosts as the affected workloads resulting from the first response level, or 3) determining at least one of (a) the number of the affected workloads resulting from the first response level, or (b) the priority types of the affected workloads resulting from the first response level.

In some embodiments, determining the first estimate for the workload impact resulting from the first response level comprises at least one of: 1) determining that the first set of reduction actions are applicable to a first subset of the plurality of hosts, 2) identifying the respective sets of workloads executing on each of the first subset of hosts, 3) identifying respective customers for the respective sets of workloads executing on each of the first subset of hosts as the affected customers resulting from the first response level, or 4) determining at least one of (a) the number of the affected customers resulting from the first response level, or (b) the priority types of the affected customers resulting from the first response level.

In some embodiments, the second method further comprises determining a second estimate for a power reduction resulting from the first response level based at least on (a) the respective sets of workloads executing on each of the plurality of hosts and (b) applicability of the first set of reduction actions on the plurality of hosts according to the first response level. In some embodiments, selecting the first response level from the plurality of response levels is based at least on the first estimate for the workload impact resulting from the first response level and the second estimate for the power reduction resulting from the first response level.

In some embodiments, the selected first response level is a response level of the plurality of response levels that is associated with a least workload impact that achieves a power reduction greater than or equal to a difference between a current value for an aggregate power consumption of the plurality of hosts and a current value for an aggregate power threshold of the plurality of hosts.

A third method is disclosed herein. The third method may comprise determining, by the computer system, respective predicted sets of workloads executing on each of a plurality of hosts during a future time period. The third method may comprise identifying, by a computer system, a plurality of response levels that specify applicability of a respective set of reduction actions to a plurality of hosts. In some embodiments, a first response level of the plurality of response levels specifies applicability of a first set of reduction actions to the plurality of resources. The third method may comprise determining a first estimate for a power reduction resulting from the first response level based at least on (a) the respective predicted sets of workloads executing on each of the plurality of hosts and (b) applicability of the first set of reduction actions on the plurality of hosts according to the first response level. The third method may comprise selecting the first response level from the plurality of response levels based at least on the first estimate for the power reduction resulting from the first response level. The third method may comprise identifying one or more workloads that (a) are currently executing on the plurality of hosts and (b) would be affected by application of the first set of reduction actions to the plurality of hosts according to the selected first response level. The third method may comprise, prior to the future time period, preemptively migrating the affected workloads from the plurality of hosts to one or more other hosts.

In some embodiments, determining the respective predicted sets of workloads executing on each of a plurality of hosts during the future time period is based on historical patterns of workloads executing on the plurality of hosts.

In some embodiments, determining the respective predicted sets of workloads executing on each of a plurality of hosts during the future time period is performed using a machine learning model that has previously been trained using a supervised learning algorithm to predict a set of workloads based at least in part on historical workload data provided as training data.

In some embodiments, the third method comprises at least one of: 1) obtaining, by the computer system, a predicted value for an aggregate power consumption of the plurality of hosts for the future time period, 2) obtaining, by the computer system, a predicted value for an aggregate power threshold of the plurality of hosts for the future time period, or 3) responsive to determining that the predicted value for the aggregate power consumption exceeds the predicted value for the aggregate power threshold, making a selection from the plurality of response levels.

In some embodiments, the third method comprises at least one of: 1) identifying, by the computer system, a predicted failure of a temperature control system associated with the plurality of hosts for a future time period, 2) obtaining, by the computer system, a predicted value for an aggregate power threshold of the plurality of hosts for the future time period based at least in part on identifying the predicted failure, or 3) responsive to identifying the predicted failure, making a selection from the plurality of response levels.

In some embodiments, identifying the predicted failure of the temperature control system utilizes a machine-learning model that has been previously trained with training data comprising historical data associated with the plurality of hosts. In some embodiments, the machine-learning model is trained using a supervised learning algorithm to identify the predicted failure from input data.

In some embodiments, the historical data of the training data comprises temperature control system data, historical power consumption data corresponding to a set of hosts, and historical aggregate power thresholds.

Systems, devices, and computer media are disclosed, each of which may comprise one or more memories on which instructions corresponding to the methods disclosed herein may be stored. The instructions may be executed by one or more processors of the disclosed systems and devices to execute the methods disclosed herein. One or more computer programs can be configured to perform particular operations or actions corresponding to the described methods by virtue of including instructions that, when executed by data processing apparatus, cause the apparatus to perform the actions.

BRIEF DESCRIPTION OF THE DRAWINGS

FIG. 8 is a table illustrating an example set of response levels and respective sets of reduction actions for each response level, in accordance with at least one embodiment.

DETAILED DESCRIPTION

Figure 1:
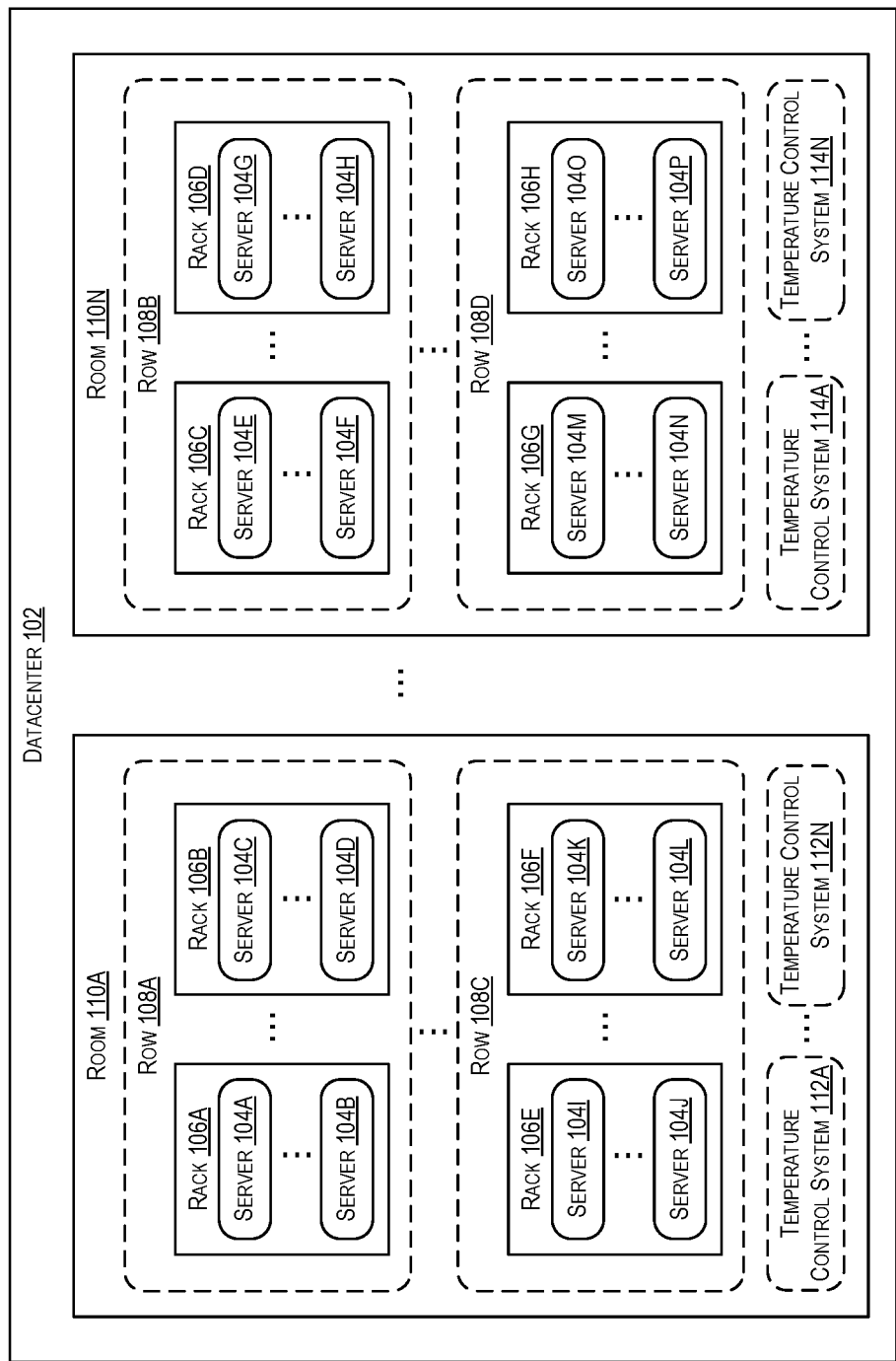
FIG. 1 depicts an example physical environment (e.g., a datacenter or some portion thereof) that includes a variety of components, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The present disclosure relates to managing a power consumption and orchestrating power consumption reductions within an environment (e.g., at hosts or power distribution units of a datacenter, or portion thereof). More particularly, techniques are described for enabling orchestrated load shedding to implement power consumption reductions due to current conditions and according to an aggregate power threshold.

Balancing power supply and consumption within a datacenter is desirable. When the power consumed outstrips the available supply, the balance can be restored by increasing the power supply or reducing the rate of power consumption. If this balance is not maintained and the components attempt to consume more than the available supply, circuit breakers may trip, disconnecting components from the supply.

The maximum aggregate power threshold for a particular environment may depend on a number of factors including, but not limited, current power consumption values at hosts within the environment, operational status of related components such as temperature control systems (e.g., HVAC, chillers, etc.), environmental conditions (e.g., an ambient temperature, an external temperature outside the environment), and the like. Conventional systems are not configured to manage power consumption based on these factors. When power consumption peaks and power failures are imminent, conventional techniques largely utilize manual efforts to shut down or pause hosts. This leads to a suboptimal load shedding strategy as the operator implementing the load shedding usually has no insight as the effect of their actions. By way of example, the operator rarely, if ever, knows the customers, workloads, instances, or hosts, or respective priorities thereof, when selecting which devices to shut down or pause. Power failures can cause interruptions in the operations performed by the components of the datacenter. By way of example, a website hosted on datacenter servers will crash if a tripped circuit breaker disconnects the servers from a datacenter's power supply. Suboptimal load shedding strategies can be inefficient and may potentially exceed the amount of power reduction sufficient to reduce the aggregate power consumption the desired amount. Additionally, or alternatively, suboptimal load shedding strategies can result in a broader/greater impact to the underlying hosts, instances, workloads, and corresponding customers than might be desirable.

The balance between a datacenter's power supply and power consumption can be managed by maintaining an equilibrium between the available supply and the demand and/or consumption. Scaling the power supply in a datacenter may not be feasible at times because power is often statically allocated in long term contracts with an electric utility. While the supply may be statically allocated, power consumption in a datacenter can vary, sometimes drastically. As a simplistic example, a server's power consumption may increase when the number of threads executed by the server's processor increases. Ambient temperature within the datacenter can affect the power consumed by the datacenter's cooling systems. When the cooling system works harder, it consumes more power as it works to reduce the ambient temperature experienced in the datacenter. When a cooling system fails, the datacenter may no longer be able to withstand the heat generated by the current power consumption levels. The demand caused by some components in the datacenter, such as uninterruptible power supplies, power distribution units, cooling systems, or bus ways, may be difficult to adjust. However, some components, such as servers, virtual machines, and/or bare metal instances, can be more easily constrained. Additionally, workloads and/or instances may be migrated to other hosts and/or instances to condense resources on a smaller subset of hosts, thereby creating more idle and/or vacant hosts. Apply power reductions thereafter to idle/vacant hosts can ensure that the impact (e.g., the number of hosts, customers, instances, workloads) affected is minimized.

Many conventional power management approaches utilize power capping to constrain operations at power-consuming devices (e.g., servers, network devices, etc.) within a datacenter. When power capping is utilized, a power cap limit may be used to constrain the power consumed by a device. The power cap limit is used to constrain (e.g., throttle) operations at the server to ensure that the server's power consumption does not exceed the power cap limit. Using power capping ensures that upstream devices' allocated power limits are not breached, causing each upstream device to be provisioned according to a worse-case scenario in which each downstream device is presumed to consume their respective maximum allotted power. However, these downstream devices may often consume less than their maximum allotted power, leaving at least a portion of the power allotted to the upstream device unutilized. These approaches waste valuable power and limit the density of power-consuming devices that can be utilized within the datacenter.

An efficient power infrastructure within a datacenter is necessary to increase the provider's profit margins, to manage scarce power resources, and to make services provided by the datacenter more environmentally friendly. A datacenter that includes components that host a multi-tenant environment (e.g., a public cloud) may experience higher than the average consumption because not all the tenancies of the cloud are used simultaneously. To push power consumption closer to the statically allocated capacity to improve the efficiency and resource utilization of the datacenter, datacenter providers may increase servers and/or tenancies so that the power consumption across all power-consuming devices is closer to the allocated power capacity of the datacenter. However, in some instances, closing the gap between the allocated power capacity and the power consumption increases the risk of tripping circuit breakers and losing the ability to utilize computing resources. Techniques described herein minimize the frequency at which operations at the downstream devices are constrained, enable these devices to utilize previously unutilized power, all while maintaining a high degree of safety with respect to avoiding power failures.

Additionally, systems and methods provide an automated and dynamically orchestrated approach to constraining power consumption (e.g., via power caps, migrating workloads, etc.), pausing hosts, migrating instances and/or hosts, and/or shutting down hosts to achieve a desired power reduction. In some embodiments, at least a portion of the functionality executed toward these actions are user-selectable and/or based on user input. The described techniques provide a variety of response levels. Each response level may be associated with a set of reduction actions (herein referred to as "actions," for brevity). Each response level (herein referred to as "level," for brevity) may provide successively severe sets of reduction actions to be applied. When the aggregate power threshold is breached, a response level may be selected (e.g., by the system, by the user, etc.) based on an estimated power reduction corresponding to each of the response levels. A least severe level and/or least impactful level that, if implemented, is sufficient to cause the aggregate power consumption of the datacenter to fall below the aggregate power threshold may be selected.

The estimated impact of applying the reduction actions associated with a level may be determined at run time, based on the current attributes of the workloads implemented by virtual machines and/or bare metal instances, the customers with which the workloads and/or affected hosts are associated, and the priorities corresponding to those workloads, hosts, and/or customers. Demand (e.g., corresponding to an aggregate power threshold) can be dynamically modified based on operational status data and environmental data corresponding to various components of the datacenter. These factors may be utilized to identify changes in the aggregate power threshold (e.g., a threshold amount of aggregate power consumption/heat/demand for which components of the datacenter are collectively capable of managing) as power management capabilities within the datacenter occur. Response level selection may be triggered by real time changes in demand, via request (e.g., by user request, by requests submitted by governmental entities mandating a reduction in power consumption, etc.), and based on the impact of implementing the corresponding reduction actions.

Utilizing these techniques described herein may tailor the power constraints, migration tasks, and/or pause or shut down tasks employed to the current conditions and resources (e.g., hosts, instances, workloads) in the datacenter so that excessive reductions are mitigated or avoided entirely.

These techniques provide real time capabilities for reducing the impact of power management response actions with respect to the customers, hosts, instances, and/or workloads, while ensuring the risk of power failure is effectively avoided. The systems and methods described herein provide a more efficient and effective power orchestration approach than conventional systems, which may lead to a more satisfactory user experience. The particular actions implemented can be selected (e.g., by the system automatically, through user selection, etc.) based at least in part on any suitable combination of 1) maximizing an overall power consumption reduction, 2) identifying/implementing a least severe response level, 3) identifying/implementing a least impactful response level, and/or 4) identifying a response level for which estimated power reduction is sufficient to drop current aggregate power consumption values below the current or predicted aggregate power threshold while also providing the least amount of excessive power reduction (e.g., reductions that exceed what is needed to drop current power consumption lower than the current aggregate power threshold). Thus, the techniques provide a more flexible and intelligent approach to shedding load in a variety of contexts and/or due to a variety of triggering events.

FIG. 1 depicts an example environment (e.g., environment 100) including a variety of components, in accordance with at least one embodiment. Environment 100 may be a physical environment such as a datacenter (e.g., datacenter 102) or portion thereof (e.g., a room of the data center such as room 110A). Environment 100 may include a dedicated space that hosts any suitable number of servers, such as servers 104A-P (collectively referred to as "servers 104"), and the infrastructure for hosting those servers such as networking hardware, cooling systems (also referred to as "temperature control systems"), and storage devices. Servers 104A-P may also be referred to as "hosts." Networking hardware (not depicted here) of the datacenter 100 can enable remote users to interact with the servers over a network (e.g., the Internet). Any suitable number of servers 104 (e.g., 10, 14, 21, 42, etc.) can be held in various racks such as racks 106A-H (collectively referred to as "racks 106"). Racks 106 can include a frame or enclosure to which corresponding sets of servers are placed and/or mounted.

Various subsets of racks 106 can be organized into groups called "rows" (e.g., rows 108A-D, collectively referred to as "rows 108"). In some implementations, the rows 108 can include any suitable number of racks (e.g., 5, 8, 10, up to 10, etc.) that are collocated (e.g., within a threshold distance from one another). In other implementations, rows can be an organizational unit and the racks with a given row can be placed in different locations (not necessarily within a threshold distance of one another). As an example, rows 108 can be located in a room (e.g., room 110A, room 110N, etc.). A room (e.g., room 110A) can be a subdivision of a building or a physical enclosure or physical environment in which any suitable number of racks 106 are placed. In other embodiments, a room can be an organizational unit and the rooms can be located in different physical locations or multiple rooms can be located in a single subdivision of a building.

Various temperature control systems (e.g., temperature control system(s) 112A-N, temperature control system(s) 114A-N, etc.) may be configured to manage the ambient temperature in the datacenter or portion thereof. As a non-limiting example, the temperature control system(s) 112A-N may be associated with room 110A, while the temperature control system(s) 114A-N may be associated with room 110N. Any suitable number of temperature control systems may be associated with the datacenter and/or a portion thereof. In some embodiments, these temperature control systems can be any suitable heating, ventilation, and air-conditioning (HVAC) device (e.g., an air-conditioning unit), chillers (e.g., cooling water circulation devices that control temperature by circulating a liquid such as water), or the like. In some embodiments, each temperature control system may be associated with a corresponding amount of heat (e.g., an amount of heat produced by a corresponding amount of power consumption of the servers 104) for which it is capable and/or configured to manage.

Figure 2:
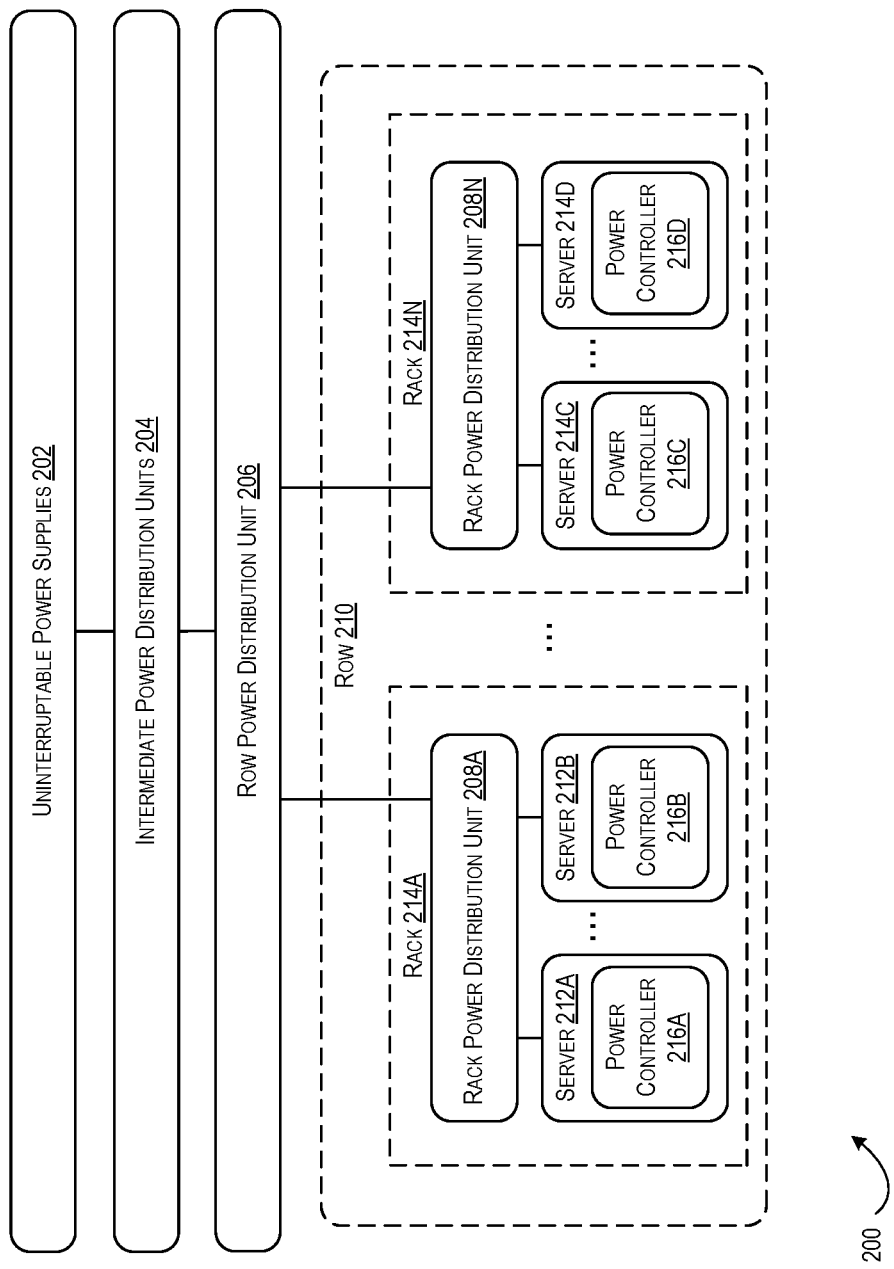
FIG. 2 shows a simplified diagram an exemplary power distribution infrastructure including a variety of components of a datacenter, in accordance with at least one embodiment.

FIG. 2 shows a simplified diagram an exemplary power distribution infrastructure 200 including a variety of components (e.g., components of datacenter 102 of FIG. 1), in accordance with at least one embodiment. The power distribution infrastructure 200 can be connected to a utility power source (not depicted) and power can initially be received at one or more uninterruptable power supplies (uninterruptable power supplies (UPS(s)) 202). In some embodiments, the power may be received from the utility, at the UPS(s) via an on-site power sub-station (not depicted) that is configured to establish suitable voltage levels for distributing electricity through the datacenter). UPS(s) 202 may individually include a specialized battery or generator that provides emergency power if the input power source fails. UPS(s) 202 may monitor the input power and provide backup power if a drop in the input power is detected.

The power distribution infrastructure 200 can include any suitable number of intermediate power distribution units (PDU(s)) (e.g., intermediate PDU(s) 204) that connect to and receive power/electricity from UPS(s) 202. Any suitable number of intermediate PDU(s) 204 may be disposed between a UPS (of UPS(s) 202) and any suitable number of row PDUs (e.g., row PDU 206). A power distribution unit (e.g., intermediate PDU(s) 204, row PDU 206, rack PDU(s) 208, etc.) may be any suitable device that is configured to control and distribute power/electricity. Example power distribution units may include, but are not limited to main switchboards, switchboards, remote power panels, bus bars, power strips, transformers, and the like. Power can be provided to intermediate PDU(s) 204 from the UPS(s) 202. Intermediate PDU(s) 204 may distribute power to downstream components (e.g., row PDU 206) of power distribution infrastructure 200.

The power distribution infrastructure 200 may include any suitable number of row power distribution units (including row PDU 206). A row PDU may include any suitable PDU (e.g., a remote power panel, a bus bar/way, etc.) that is disposed between an intermediate PDU (e.g., a PDU of intermediate PDU(s) 204) and one or more rack PDUs (e.g., rack PDU 208A, rack PDU 208N, collectively referred to as "rack PDU(s) 208"). A "row PDU" refers to a PDU that is configured to distribute power to one or more rows of devices (e.g., row 210, including servers 212A-D, collectively referred to as "servers 212"). As described above, a row (e.g., row 210) can include any suitable number of racks (e.g., racks 214A-N, collectively referred to as "racks 214") within which the servers 212 are located.

The power distribution infrastructure 200 can include any suitable number of rack power distribution units (including rack PDU(s) 208). A rack PDU may include any suitable PDU that is disposed between a row PDU (e.g., row PDU 206) and one or more servers (e.g., server 212A, server 212B, etc.) corresponding to a rack (e.g., rack 214A, an example of the racks 106 of FIG. 1). A "rack PDU" refers to any suitable PDU that is configured to distribute power to one or more servers within a rack. The rack (e.g., rack 214A) can include any suitable number of servers 212. In some embodiments, rack PDU(s) 208 may include intelligent PDUs that are additionally configured to monitor, manage, and control consumption at multiple devices (e.g., rack PDU 208A, server 212A, server 212B, etc.).

Servers 212 (each an example of servers 104 of FIG. 1) can individually include a power controller (power controller(s) 216A-D, collectively referred to as "power controllers 216")). A power controller refers to any suitable hardware or software component operating at a device (e.g., a server) that is configured to monitor and/or manage power consumption at the device. Power controllers 216 may individually monitor the power consumption of a respective server on which they operate. Power controllers 216 may each be configured enforce power cap limits to constrain power consumption at a respective server. Enforcing power cap limits may include any suitable combination of: monitoring power consumption at the server, determining whether to constrain (e.g., limit, restrict, etc.) power consumption at the server (e.g., based at least in part on a comparison between the server's current consumption and a stored power cap limit), and limiting/restricting power consumption at the server (e.g., using processor and memory dynamic voltage and frequency scaling to suppress server power consumption). Enforcing power cap limits may be referred to as "power capping."

Datacenter 102 of FIG. 1 may include various components depicted in power distribution infrastructure 200. By way of example, the room 110A may include one or more bus ways (each an example of row PDU 206). A bus bar (also referred to as a "bus way") refers to a duct of conductive material that can distribute power (e.g., within the room 110A). A bus way can receive power from a power distribution unit of intermediate PDU(s) 204 and provide power to one or more racks (e.g., rack 106A of FIG. 1, rack 106B of FIG. 1, etc.) associated with a row (e.g., row 108A of FIG. 1). Each power infrastructure component that distributes/provides power to other components, also consumes a portion of the power that passes through it. This loss can be caused by heat loss from power flowing through the component or by power directly consumed by the component (e.g., power consumed by a processer in a rack PDU).

Figure 3:
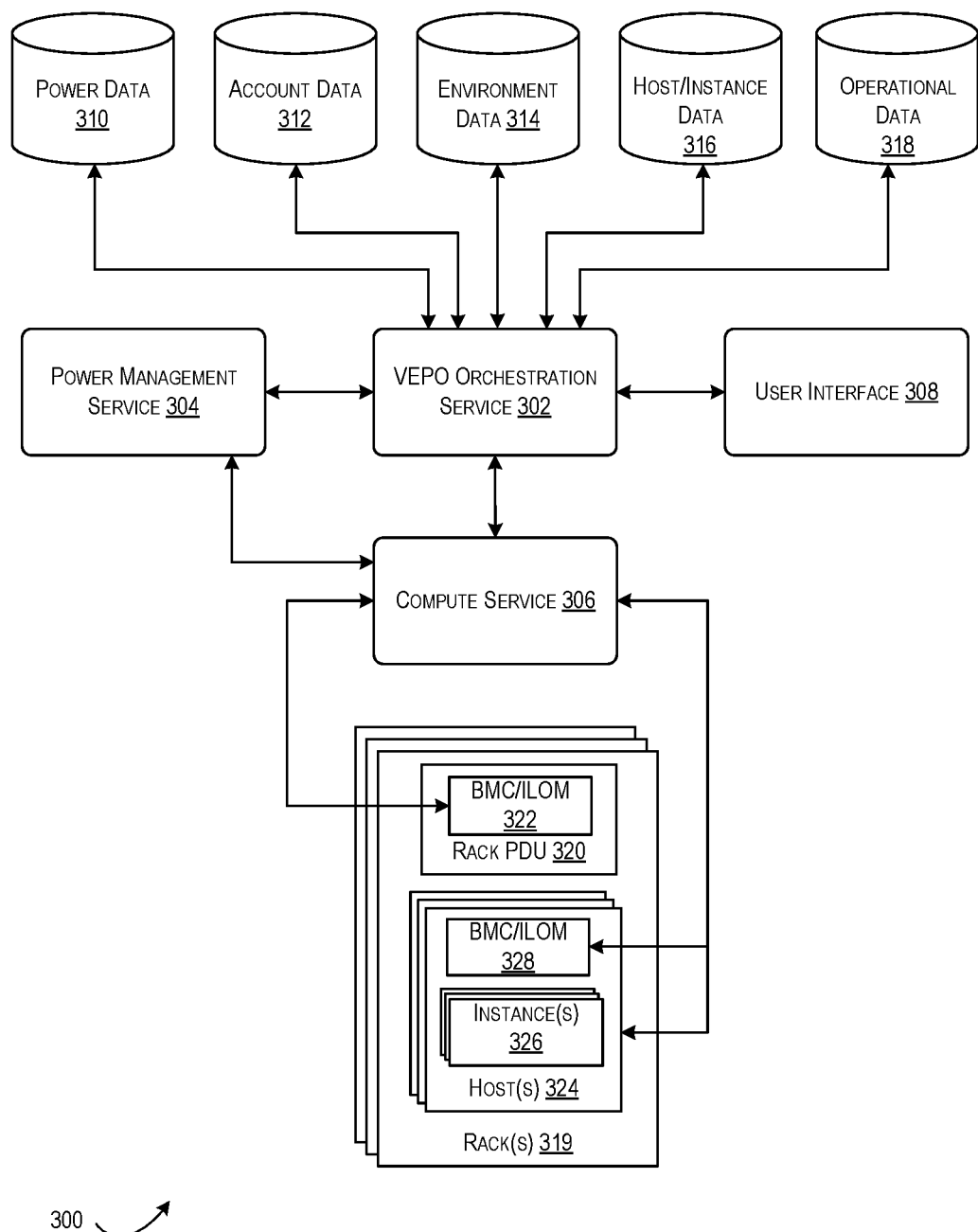
FIG. 3 illustrates an example architecture of an exemplary power orchestration system that is configured to orchestrate power consumption reductions which are applicable to various resources of a physical environment (e.g., a datacenter, a room of a datacenter, etc.), in accordance with at least one embodiment.

FIG. 3 illustrates an example architecture of an exemplary power orchestration system 300 that is configured to orchestrate power consumption reductions that are applicable to various resources of a physical environment (e.g., a datacenter, a room of a datacenter, etc.), in accordance with at least one embodiment. The term "resources" may be considered to include hosts, workloads (e.g., virtual machines and/or bare metal instances running those workloads), and/or customers associated with those hosts and/or workloads/instances. The power orchestration system 300 may be configured to monitor power consumption levels (e.g., current individual and/or aggregate power consumption values corresponding to variety of hosts such as host(s) 324, each of which are an example of the server(s) 104 of FIG. 1). The power orchestration system 300 may manage, based at least in part on that monitoring, power consumption within the physical environment such that an aggregate power threshold is enforced. The aggregate power threshold, as used herein, represents a maximum amount of power consumption that is able to be managed by the components of the system 300, given current conditions. The aggregate power threshold may be dynamically adjusted as conditions change (e.g., based on a mandate of a government entity to reduce power consumption, based on environment conditions, real or predicted, based on current power consumption values, real or predicted, based on operational status of various components such as temperature control systems of the physical environment, real or predicted, or the like). The particular impact (e.g., scope, applicability) of the changes made to enforce a current aggregate power threshold may vary based on real time conditions. Some example actions that may be employed to enforce the current aggregate power threshold may be power capping (e.g., enforcing a maximum cap of power consumption at a particular device such as one or more of host(s) 324) or otherwise allocating a budgeted amount of power to any suitable device (e.g., host(s) 324, PDU(s) 202, 204, 206, 208 of FIG. 2, etc.), pausing or shutting down a host and/or an instance (e.g., a VM or BM) and/or a workload executing at an instance, migrating a workload from one instance to another, migrating a workload from one host to another, or the like.

Power orchestration system 300 may include a variety of components such as the ones depicted in FIG. 3. For example, power orchestration system 300 may include a VEPO orchestration service 302. VEPO orchestration service 302 may be configured to obtain various data on which an impact and a reduction action may be determined. By way of example, VEPO orchestration service 302 may be configured to obtain any suitable combination of: power data 310, account data 312, environment data 314, host/instance data 316, and/or operational data 318.

Power data 310 may include any suitable budgeted/allocated values for host(s) 324 or PDU(s) including rack PDU 320 (an example of the rack PDUs 208 of FIG. 2), power cap values, and/or current power consumption values indicating an amount of power currently being consumed by that device. Power data 310 may be stored in a location that is accessible to the VEPO orchestration service 302, and/or power data 310 may be obtained from a source and/or service that is configured to manage and/or obtain such data. In some embodiments, the power management service 304 may be configured to obtain power data 310 and store such data at a location from which the data is retrievable by VEPO orchestration service 302. In some embodiments, the power management service 304, or another component configured to obtain such data, may provide power data 310 to the VEPO orchestration service 302 directly, according to a predefined schedule, frequency, or periodicity, or via request.

Account data 312 may include any suitable attributes of a customer, any suitable attributes of the host(s) and/or instance(s) associated with that customer, or the like. Some example attributes may include a category associated with the customer's account (e.g., a free tier category indicating the customer is utilizing services on a non-paying basis potentially being provided limited functionality or resources, a free trial category indicating the customer is utilizing services on a non-paying basis for a limited time). A category may correspond with a priority associated with the customer, or a priority may otherwise be assigned to the customer, host, or workload. The priority may indicate a degree of relational importance such as low priority, medium priority, and high priority, although other priority schemes are contemplated. Another example attribute may include an identifier associated with the customer, host, instance, and/or workload. Account data 312 may be stored at a location accessible to the VEPO orchestration service 302 and from which the account data 312 is retrievable, or the account data 312 may be obtained from a service and/or source that is configured to manage and/or obtain such data (e.g., an accounts service of a cloud computing environment, not depicted). In some embodiments, the account data 310 to the VEPO orchestration service 302 directly from the source, or component configured to obtain such data, according to a predefined schedule, frequency, or periodicity, or via request.

Environment data 314 may include any suitable data associated with the physical environment or environmental data indicating external conditions. By way of example, environmental data 314 may include an ambient temperature reading of the physical environment, an external temperature outside of the physical environment, a design point indicating an external temperature for which the physical environment was designed to withstand, or the like. At least some portion of the environment data 314 may be collected from one or more sensor(s) (not depicted) that are configured to measure a particular condition such as the ambient temperature within the physical environment, an external temperature occurring outside the physical environment, or the like. In some embodiments, at least a portion of environment data 314 may be provided by weather sources such as weather forecasts that are stored within storage of the power orchestration system 300, or obtainable from external sources such as weather forecasting websites. In some embodiments, the environment data 314 may include tables and/or protocols from which a reduced capacity/capability may be determined/identified. By way of example, a table or mapping may be included in environment data 314 indicating that a particular difference between an ambient temperature and a temperature occurring outside of the physical environment (referred to as "an external" temperature) is associated with a particular reduced capacity of the power consumption that is capable of being managed by the components, or an individual component, of the system. Environment data 314 may be stored at a location accessible to the VEPO orchestration service 302 and from which the environment data 314 is retrievable, or the environment data 314 may be obtained from a service and/or source that is configured to manage and/or obtain such data (e.g., a metrics service of a cloud computing environment, the power management service 304, etc.). In some embodiments, the environment data 314 to the VEPO orchestration service 302 directly from the source, or component configured to obtain such data, according to a predefined schedule, frequency, or periodicity, or via request.

Host/instance data 316 may include any suitable data associated with a host and/or instance. Host/instance data 316 may include workload metadata identifying the workloads executing at a host and/or via a particular instance. In some embodiments, the host/instance data 316 may identify a corresponding customer, a corresponding priority for the host and/or instance and/or workload, or the like. At least some portion of the host/instance data 316 may be originally obtained and/or maintained by a separate service (e.g., compute service 306, an example of a compute service control plane of a cloud computing environment). Host/instance data 316 may be stored at a location accessible to the VEPO orchestration service 302 and from which the host/instance 316 is retrievable, or the host/instance 316 may be obtained from a service and/or source that is configured to manage and/or obtain such data (e.g., compute service 306, etc.). In some embodiments, the host/instance data 316 may be provided to the VEPO orchestration service 302 directly from the source, or component configured to obtain such data, according to a predefined schedule, frequency, or periodicity, or via request.

Operational data 318 may include any suitable data associated an operational status or condition corresponding to one or more devices or components of the physical environment. As a non-limiting example, operational data 318 may include the operational status of one or more temperature control systems (e.g., temperature control system(s) 112 of FIG. 1). In some embodiments, the operational data 318 may indicate which temperature control systems are operational and/or an operational capacity for those systems. In some embodiments, the environment data 314 may include tables and/or protocols from which a reduced capacity/capability may be determined/identified. By way of example, a table or mapping may be included in operational data 318 indicating that failure (e.g., complete or partial) of a particular component (e.g., a particular temperature control system) is associated with a particular reduced capacity of the power consumption that is capable of being managed by the components of the system as a whole, or an individual component of the system. At least some portion of the operational data 318 may be originally obtained and/or maintained by a separate service (e.g., power management service 304, or the like). Operational data 318 may be stored at a location accessible to the VEPO orchestration service 302 and from which the operational data 318 is retrievable, or the operational data 318 may be obtained from a service and/or source that is configured to manage and/or obtain such data (e.g., compute service 306, etc.). In some embodiments, the operational data 318 may be provided to the VEPO orchestration service 302 directly from the source, or component configured to obtain such data, according to a predefined schedule, frequency, or periodicity, or via request.

It should be appreciated that power data 310, account data 312, environment data 314, host/instance data 316, or operational data 318 may include current data indicating current values and/or historical data indicating corresponding historical values. In some embodiments, future attributes of power data 310, account data 312, environment data 314, host/instance data 316, or operational data 318 may be predicted based at least in part on these historical values. In some embodiments, machine learning may be utilized to predict any suitable portion of these future attributes. Example methods for predicting future values for power data 310, account data 312, environment data 314, host/instance data 316, or operational data 318 are discussed in more detail with respect to FIG. 12. In some embodiments, the VEPO orchestration service 302 may be configured to aggregate the data of any suitable combination of power data 310, account data 312, environment data 314, host/instance data 316, or operational data 318 into a table, mapping, or database from which the data may be filtered or sorted to identify a subset of resources (e.g., hosts, instances, workloads, customers) for a given set of constraints (e.g., low-priority workloads, free tier customers, etc.).

VEPO orchestration service 302 may be configured to identify and/or modify an aggregate power threshold associated with the physical environment based at least in part on any suitable combination of: current/aggregate power consumption values (real or predicted) associated with any suitable combination of the host(s) 324, a received request associated with a government entity (e.g., a local power authority) that mandates/requests particular power reductions or an overall power reduction, potentially for a particular time period (e.g., the next 24 hours), current or predicted environmental conditions (e.g., current or predicted ambient temperatures, current or future external temperatures, etc.), current or predicted operational status corresponding to temperature control systems (e.g., current or predicted total/partial failures), or the like.

VEPO orchestration service 302 may be configured to manage through associated functionality or functionality provided by other systems and/or services, actual power consumption values corresponding to the hosts/instances/workloads of the physical environment. Managing actual power consumption values may include power capping, pausing a workload, instance, host, shutting down a workload/instance/host, migrating an instance from one host to another, migrating a workload from one instance and/or host to another instance and/or host, or the like.

VEPO orchestration service 302 may obtain configuration data (e.g., a mapping, a protocol set, rules, etc.) corresponding to a number of response levels. Each response level may be associated with a corresponding set of reduction actions (e.g., power capping, migrating, pausing, shutting down, etc.) that are performable on components of the physical environment (e.g., server(s) 104, PDU(s) 202, 204, 206, 208, etc.). In some embodiments, each set of reduction actions corresponding to a particular level is associated with implementing a potentially different reduction in the aggregate power consumption of the data center. In some embodiments, the plurality of response levels indicate an increasing severity with which reduction actions are performed to reduce the aggregate power consumption of the data center. "Severity" is intended to refer to a relative extent by which the action is disruptive. By way of example, an action of power capping a server may be considered less severe than an action of shutting down the server entirely since, in the former, the server may still provide some processing capability, albeit at a reduced capacity, whereas in the latter, the server provides no processing capability. An example set of response levels is discussed in more detail with respect to FIG. 9.

The VEPO orchestration service 302 may be configured to utilize the configuration data corresponding to a specification of the response level(s) and their corresponding reduction actions to determine an impact of applying the reduction actions of a given level to the hosts/instances/workloads (collectively, "resources") of the physical environment. The impact of applying a given action may depend on the current conditions of the resources at run time. In some embodiments, identifying an impact for a given reduction action may include identifying a set of resources and/or customers to which the action, if implemented, is applicable.

An estimated impact is therefore intended to refer to a scope, or applicability of a given action or level. Identifying the scope and/or applicability of a given action or level may include identifying the particular resources and/or customers that would be affected by implementing the action or level and/or identifying any suitable attributes associated with the applicable resources and/or customers. As a simplistic example, the VEPO orchestration service 302 may identify that X number of idle host of host(s) 324 would be affected should an action be taken to shut down all idle hosts, that those host(s) are associated with particular customers or a particular number of customers, and/or that the host(s) and/or customers are associated with other attributes such as a category (e.g., free tier), a priority (e.g., high priority), and the like.

The VEPO orchestration service 302 may be configured to estimate an impact and/or an actual power reduction that would likely be experienced for one or more of the levels based at least in part on the configuration data specifying the levels and corresponding actions and any suitable combination of the power data 310, account data 312, host/instance data, or the like. An estimated impact (e.g., what host(s), instance(s), workload(s), customer(s) would likely be affected, what attributes are associated with the affected host(s), instance(s), workload(s) and/or customers, how many host(s)/instance(s)/workload(s)/customer(s) are affected, etc.) can be identified for one or more response levels, one or more reduction actions corresponding to a given level, or the like. In some embodiments, the estimated impact of a given action may be aggregated with the estimated impacts for all actions of a given level to identify an estimated impact for the given level.

The VEPO orchestration service 302 may be configured to determine an estimated impact and/or an actual power reduction that would likely be experienced for one or more of the levels based at least in part on current data, historical, or predicted data (e.g., current, historical, or predicted values corresponding to the power data 310, account data 312, environment data 314, host/instance data 316, and/or operational data 318).

In some embodiments, the VEPO orchestration service 302 may be configured to present, recommend, or select automatically a given response level from the set of possible response levels based at least in part on any suitable combination of the estimated impact and/or estimated power reduction that would likely be experienced if the reduction actions corresponding to a given level were implemented (e.g., effectuated). Thus, in some embodiments, a particular level may be recommended and/or selected by the power orchestration system 300 based on any suitable combination of: 1) determining a level that, if implemented, would likely to lead to a sufficient, but not overly excessive reduction in power consumption at the resources of the physical environment (e.g., a least amount of power consumption reduction that is sufficient to drop the current power consumption values under the current aggregate power threshold), 2) determining a level that includes the set of least sever actions, or 3) determining a least impactful level or action (e.g., a fewest number of likely affected resources/customers, a set of affected resources and/or customers that have the priorities or categories that indicate the least collective degree of importance, etc.). Determining a least sever level or action, or a least impactful level or action may be determined regardless of the estimated power consumption reduction likely to be experienced through implementing the level and/or action, or determining the least severe level/action and/or least impactful level/action may be determined from one or more level(s) that, if implemented given current conditions, are estimated to cause a sufficient reduction in power consumption to drop power consumption values to an aggregated value that falls under the current aggregate power threshold.

Power management service 304 may be configured to provide functionality for identifying power cap values for host(s) and/or instances based at least in part on the aggregate power threshold, budget/allocated power thresholds associated with PDU(s), and/or current individual and/or aggregate power consumption values. In some embodiments, the power management service 304 may be configured to identify which resources to apply power caps and/or particular values for those power caps based at least in part on any suitable combination of current, historic, or predicted values of power data 310, account data 312, environment data 314, host/instance data 316. In some embodiments, the VEPO orchestration service 302 may trigger and utilize the functionality provided by the power management service 304 for any suitable combination of identifying/modifying a budgeted/allocated power corresponding to one or more resources (e.g., hosts, instances, PDUs, etc.), identifying which or how many resources are applicable, and estimated power reduction values that are likely to be experienced if the action(s) of a given level are implemented. In some embodiments, the power management service 304 may perform some or all of these functions.

The VEPO orchestration service 302 and/or the power management service 304 may host user interface 308. User interface 308 may be configured to provide any suitable application metadata corresponding to combination of: current individual and/or power consumption values corresponding to any suitable number or type of resources (e.g., hosts, instances, workloads, etc.) or customers, any suitable attribute (e.g., priority, category, etc.) associated with those resources or customers, a predicted condition (e.g., a change in the aggregate power threshold is predicted), a current condition (e.g., a current aggregate power threshold), an estimated impact (e.g., a number, identifier, or other attribute associated with an impacted host/instance/workload customer), and/or an estimated power reduction (e.g., estimated reductions expected to be experienced if the actions of the level are applied), and/or identification of the action(s) corresponding to a given level. The user interface 308 may present any suitable combination of this application metadata. The application metadata may correspond to any suitable combination of the available response levels. In some embodiments, application metadata corresponding to current/predicted power consumption values and/or a current/predicted aggregate power threshold may be displayed. In some embodiments, the application metadata presented at user interface 308 may correspond to the estimated power consumption reduction and/or estimated impact for any suitable number of levels. In some embodiments, the VEPO orchestration service 302 may provide a recommendation of a particular level (e.g., via provided application metadata corresponding to that level or the reduction actions associated with that level) and a confirmation/or rejection of the recommended level may be entered via a selectable option at the user interface 308. If confirmed, the VEPO orchestration service 302 may be configured to execute operations to effectuate the implementation of the confirmed level and its corresponding actions. In some embodiments, the user interface 308 may present application metadata for any suitable number of response levels and/or corresponding reduction actions and one or more options may be provided at the user interface 308 to enable user selection of a particular level and/or action.

Receiving user input indicating selection of a particular level and/or action or confirmation of selection of a particular level and/or action may cause the VEPO orchestration service 302 to execute operations to effectuate the implementation of the confirmed level and its corresponding actions. Effectuating or implementing the confirmed level and/or its corresponding actions may include instructing any suitable component of the power orchestration system (e.g., the power management service 304, the compute service 306) to implement any suitable portion of the level and/or corresponding action(s). Instructing a component or components may include providing any suitable data such as any suitable combination of power data 310, account data 312, environment data 314, host/instance data 316, operational data 318 to the component(s) being instructed. In some embodiments, the instructed component may be configured to effectuate the action(s) or level according to the data provided by the VEPO orchestration service 302 or the instructed component may obtain any suitable portion of the data from the location at which the power data 310, account data 312, environment data 314, host/instance data 316, or operational data 318 is stored.

As a non-limiting example, if the action(s) of the level for which a reduction or impact is to be estimated includes power capping, the power management service 304 may be configured to estimate power caps, estimate individual or aggregate power consumption reductions, and/or effectuate estimated power caps to bring about the estimated individual/aggregate power consumption reduction. In some embodiments, the power caps may be implemented by the power management service 304 directly, or through instructing the compute service 306. Other actions, such as migrating instances or workloads, pausing instances, workloads, or hosts, shutting down hosts, or preventing (at least for a time) future assignment or launches of instances and/or workloads can be identified by the VEPO orchestration service 302 and/or the compute service 306 and effectuated by the VEPO orchestration service 302 through the functionality provided by the compute service 306. In some embodiments, the compute service 306 may be configured to identify potentially affected hosts/instances/workloads/customers and provide such information to the VEPO orchestration service 302 and/or the power management service 304.

The compute service 306 may be configured to communicate with baseboard management controller (BMC)/Integrated Lights Out Manager (ILOM) 322 of rack PDU 320. An ILOM is one example of a BMC which is used for illustrative purposes. In some embodiments, the BMC/ILOM 322 may be a specialized service processor that monitors the physical state of the host machine, in this instance, the rack PDU 320. Similarly, host(s) 324 (e.g., the host(s) of rack 319, for which the rack PDU 320 manages power according to the power distribution hierarchy discussed in connection with FIG. 5) may include a BMC/ILOM 328 that may be a specialized service processor that monitors the physical state of the host, in this instance, one of the host(s) 324. BMC/ILOM 322 and BMC/ILOM 328 may be configured to, among other things, manage and/or enforce budgeted power and/or power caps on the device on which BMC/ILOM 328 operates or to downstream devices. For example, BMC/ILOM 322 may receive power cap values to be utilized by BMC/ILOM 328 to constrain power consumption of a given host. BMC/ILOM 322 may distribute power caps to the corresponding BMC/ILOM 328 to which the power cap relates. In some embodiments, the BMC/ILOM 322 may distribute the power cap(s) which are stored at the applicable host(s), but the enforcement of these power caps are not effectuated until a further instruction is provided by the BMC/ILOM 322 to BMC/ILOM 328. The BMC/ILOM 328 may enforce power caps at the host level and/or at the instance level and/or at a workload level for one or more workloads (not depicted) executing at the instance.

BMC/ILOM 322 to BMC/ILOM 328 may be used to instruct a device (e.g., rack PDU 320 and/or host(s) 324) to pause operations or shutdown a host/instance/workload. In some embodiments, the BMC/ILOM 322 to BMC/ILOM 328 may be instructed to resume operations of a host/instance/workload. If shutdown, a device (e.g., via its BMC/ILOM) may be instructed (e.g., by the computer service 306 and/or by an upstream device such as its PDU) to power up from shutdown. This may include compute service 306 to send instruction(s) to the BMC/ILOM 322 to BMC/ILOM 328 to pause and/or shutdown a host/instance/workload.

In some embodiments, the compute service 306 may execute any suitable operations to migrate a workload from one instance to another (e.g., to an instance on the same host, to a different instance operating at a different host, etc.), to migrate an instance from one host to another (e.g., a host in the same rack, a host in a different rack, etc.), to migrate an instance/workload back to a host that originally hosted the instance/workload that was previously migrated, etc. In some embodiments, the compute service 306 may be configured to ensure that hosts/instances/workloads are not assigned to a host and/or an instance to which a level and/or action that has been effectuated, or is in the process of being effectuated, applies.

Any suitable combination of device(s) (e.g., host(s) 324, rack PDU 320) may include on or more power controllers (e.g., BMC/ILOM 328, BMC/ILOM 322, respectively). A power controller may be any suitable hardware or software component operating at a device (e.g., a server) that is configured to monitor and/or manage power consumption at the device. Power controller may individually monitor the power consumption of the respective device on which it operates. Power controllers may each be configured enforce power cap limits to constrain power consumption at the respective device. Enforcing power cap limits may include monitoring power consumption at the device, determining whether to constrain (e.g., limit, restrict, etc.) power consumption at the device (e.g., based at least in part on a comparison between the device's current consumption and a stored power cap limit), and limiting/restricting power consumption at the device (e.g., using dynamic voltage and/or frequency scaling with processor(s) and/or memory of that device to suppress power consumption at the device). Any suitable operation associated with power capping may be implemented by a power controller.

In some embodiments, a power controller (e.g., BMC/ILOM 322) may communicate via direct connection (e.g., via cable) and/or via network(s) with another power controller (e.g., BMC/ILOM 328) corresponding to one of host(s) 324). Power controller (e.g., BMC/ILOM 328) may provide power consumption data indicating the device's current power consumption (e.g., a cumulative power consumption over a time period, a current rate of power consumption, etc.). Power consumption data can be provided to power controller (e.g., BMC/ILOM 322) at any suitable frequency, periodicity, or according to a predefined schedule or event (e.g., upon breaching a predefined consumption threshold, upon a threshold amount of change in a rate of consumption, upon determining that one or more predefined conditions are met, upon determining a thermal attribute of the device, or the like).

In some embodiments, power controller (e.g., BMC/ILOM 328) may receive a power cap value (also referred to as a "power cap") from power controller (e.g., BMC/ILOM 322). In some embodiments, additional data may be provided with the power cap value. By way of example, an indicator may be included with the power cap value that indicates whether the power cap value is to be applied immediately. In some embodiments, a received power cap may be applied/enforced immediately by default. In other embodiments, a received power cap may not be applied/enforced immediately by default.

When applying/enforcing a power cap, the power controller (e.g., BMC/ILOM 328) may monitor power consumption at the device. This may include utilizing metering devices or software that is configured to identify/calculate power consumption data for the device (e.g., cumulative power consumption over a time period, a current rate of power consumption, a current change in the rate of power consumption over a time window, etc.). As part of applying/enforcing a power cap (also referred to as "power capping"), the power controller (e.g., BMC/ILOM 328) may determine whether to constrain (e.g., limit, restrict, etc.) power consumption at the device (e.g., based at least in part on comparing the device's current rate of consumption and a stored power cap value). When constraining power consumption at the device, the power controller (e.g., BMC/ILOM 328) may limit/restrict power consumption at the device (e.g., using dynamic voltage and frequency scaling with processor(s) and/or memory to suppress power consumption at the device). In some embodiments, the power controller (e.g., BMC/ILOM 328) may execute instructions to limit/restrict the power consumption of the device when the device's current consumption data (e.g., a cumulative consumption amount, a rate of consumption over a time window, etc.) approaches the power cap value being enforced (e.g., breaches a threshold that is less than the power cap value). When constraining/restricting the power consumption at the device (also referred to as "throttling"), the power controller (e.g., BMC/ILOM 328) ensures that the power consumption of the device remains under the power consumption indicated by the power cap value. The power controller (e.g., BMC/ILOM 328) may be configured to constrain the power at the host generally, or according to the instance and/or workload to which a power cap may apply.

In some embodiments, the power controllers of host(s) 324 may be configured to allow the host(s) 324 to run unconstrained (e.g., without restricting based on power consumption and a power cap) until instructed to apply/enforce a power cap by the power controller (e.g., BMC/ILOM 328). In some embodiments, the power controller (e.g., BMC/ILOM 328) may receive a power cap value that it may or may not later be instructed to enforce, but when received, the power cap value may be stored in memory without being utilized for power management at the device. Therefore, in some embodiments, the power controller (e.g., BMC/ILOM 328) may refrain from commencing with power capping operations (e.g., the comparisons and determinations described above) until instructed to do so (e.g., via an indicator provided by power controller 448). The indication to commence enforcement of a power cap can be received with the power cap value or may be received as a separate communication from power controller 448.

According to power distribution hierarchy 500, each power controller of one or more PDU(s) (e.g., BMC/ILOM 322) may be configured to distribute, manage, and monitor power with respect to any suitable number of device(s) (e.g., host(s) 324 of rack 319). In some embodiments, the power controller (e.g., BMC/ILOM 322) may be a computing agent or program installed at a given PDU (e.g., rack PDU 320 of FIG. 3). The power controller (e.g., BMC/ILOM 322) may be configured to obtain power consumption data from the host(s) 324 of rack 319 corresponding to the devices it relates (e.g., the devices for which the given PDU is configured to distribute, manage, or monitor power). Power controller (e.g., BMC/ILOM 322) may receive the consumption data according to a predefined frequency, periodicity, or schedule implemented by power controller (e.g., BMC/ILOM 328), and/or the power controller (e.g., BMC/ILOM 322) may receive the consumption data in response to requesting the consumption data from power controller (e.g., BMC/ILOM 328. The power controller (e.g., BMC/ILOM 322) may be configured to request consumption data from the power controller (e.g., BMC/ILOM 328) according to a predefined frequency, periodicity, or schedule implemented by power controller (e.g., BMC/ILOM 322).

The power controller (e.g., BMC/ILOM 322) may transmit received consumption data to power management service 402 (directly or through compute service 306) at any suitable time, according to any suitable frequency, periodicity, or schedule, or as a result of one or more predefined conditions being met (e.g., a change in a rate of individual/cumulative/collective consumption of the host(s) 324 breaches a threshold). In some embodiments, the power controller (e.g., BMC/ILOM 322) may aggregate the power consumption data received from the host(s) 324 (e.g., via the power controller (e.g., BMC/ILOM 328) of each device) prior to transmitting the aggregated consumption data to power management service 402. In some embodiments, the consumption data may be aggregated by host, instance type/category/priority, workload type/category/priority, or customer.

The power controller (e.g., BMC/ILOM 322) may receive at any suitable time one or more power cap values corresponding to host(s) 324 (e.g., from enforcement manager 410 of the power management service 402). These power cap value(s) may be calculated by power management service 402 (e.g., via the constraint identification manager 408). In some embodiments, the power controller (e.g., BMC/ILOM 322) may receive a timing value with the power cap value indicating a duration to be used for a timer. The power controller (e.g., BMC/ILOM 322) may be configured to generate and initiate a timer with an associated duration/time period corresponding to the timing value. Upon expiration of the timer indicating the time period corresponding to the time period has elapsed, the power controller (e.g., BMC/ILOM 322) may transmit data to one or more hosts including an indicator or other suitable data that instructs the one or more hosts to proceed with power capping using the power cap value previously stored at each device. In some embodiments, the power cap value may be provided with the indicator. In other embodiments, the power cap value may be provided by the power controller (e.g., BMC/ILOM 322) to the power controllers of the devices (e.g., BMC/ILOM 328) immediately after receiving the power cap value(s) from the power management service 402. Thus, in some embodiments, the power cap values may be transmitted by the power controller (e.g., BMC/ILOM 322) to the power controller (e.g., BMC/ILOM 328, stored in memory, but not enforced by power controller (e.g., BMC/ILOM 322) until power controller (e.g., BMC/ILOM 328) receives the subsequent data from power controller (e.g., BMC/ILOM 322) that instructs the power controller (e.g., BMC/ILOM 328) to commence power capping.

VEPO orchestration service 302, power management service 304, compute service 306, rack PDU 320, host(s) 324 (referred to collectively as "the devices of FIG. 3") may communicate via one or more wired or wireless networks (e.g., network(s) 808). Storage devices at which power data 310, account data 312, environment data 314, hist/instance data 316, and operational data 318 are stored may also communicate with VEPO orchestration service 302, power management service 304, compute service 306, rack PDU 320, host(s) 324 via the one or more wired or wireless connections (e.g., via one or more networks). In some embodiments, the network(s) may include any one or a combination of many different types of networks, such as cable networks, the Internet, wireless networks, cellular networks, and other private and/or public networks.

The device(s) of FIG. 3 may be any suitable type of computing device such as, but not limited to a server device, a networking device, or any suitable device within a datacenter. In some embodiments, some of the devices (e.g., rack PDU 320 and host(s) 324) are arranged in a power distribution hierarchy such as the power distribution hierarchy 500 discussed in connection with FIG. 5. In some embodiments, the host(s) 324 may correspond and be represented by the level 1 nodes of power distribution hierarchy 500. Rack PDU 320 (a "rack leader") may correspond and be represented by higher-level nodes of the power distribution hierarchy (e.g., a level 2 node).

Each of the device(s) of FIG. 3 may include at least one memory. The processor(s) may each be implemented as appropriate in hardware, computer-executable instructions, firmware, or combinations thereof. Computer-executable instruction or firmware implementations of the processor(s) of the device(s) of FIG. 3 may include computer-executable or machine-executable instructions written in any suitable programming language to perform the various functions described.

The memories of the device(s) of FIG. 3 may store program instructions that are loadable and executable on the respective processor(s) of the given device, as well as data generated during the execution of these programs. Depending on the configuration and type of user computing device, the memories may be volatile (such as random-access memory (RAM)) and/or non-volatile (such as read-only memory (ROM), flash memory, etc.). The device(s) of FIG. 3 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memories may individually include multiple different types of memory, such as static random-access memory (SRAM), dynamic random-access memory (DRAM), or ROM.

Turning to the contents of the memories in more detail, the memories may include an operating system, one or more data stores, and one or more application programs, modules, instances, workloads, or services such as the VEPO orchestration service 302, the power management service 304, the compute service 306, and the like.

The device(s) of FIG. 3 may include communications connection(s) that allow the device(s) to communicate with one another via the network(s) (not depicted). The device(s) of FIG. 3 may also include I/O device, such as a keyboard, a mouse, a pen, a voice input device, a touch input device, a display, speakers, a printer, etc.

Figure 4:
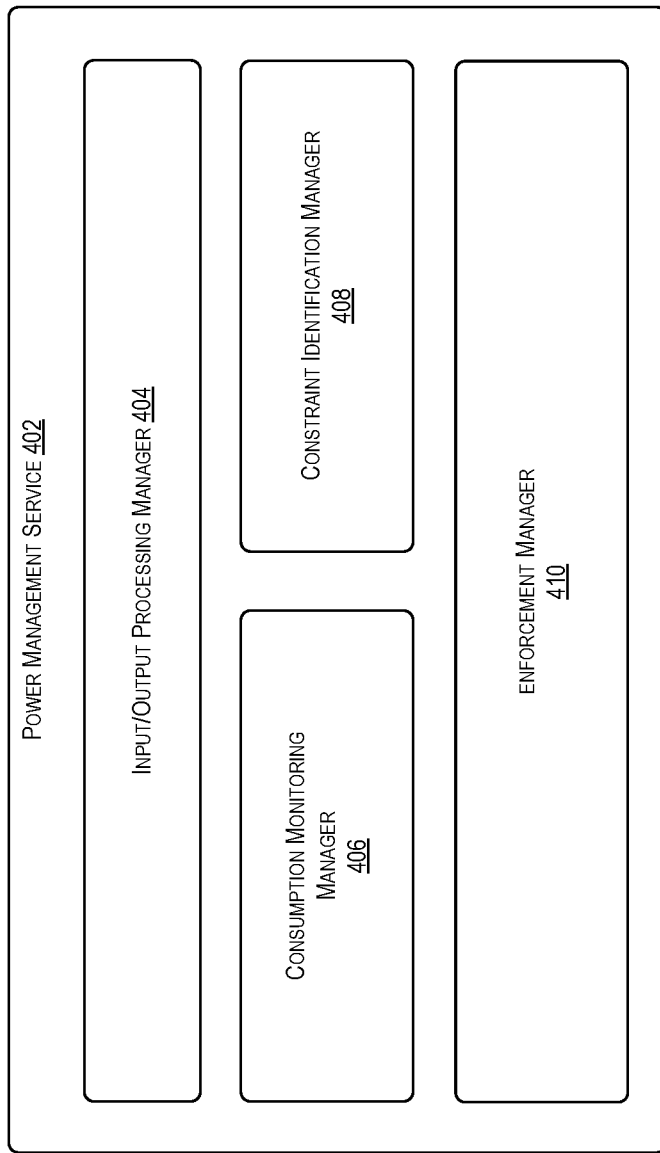
FIG. 4 illustrates an example architecture of a power management service for detecting consumption overages and constraining power consumption overages, in accordance with at least one embodiment.

FIG. 4 illustrates an example architecture 400 of a power management service 402 (an example of the power management service 304 of FIG. 3), in accordance with at least one embodiment. The power management service may include input/output processing manager 404 which may be configured to receive and/or transmit any suitable data between the power management service 402 and any other suitable device of FIG. 3. As depicted, the power management service 402 may include consumption monitoring manager 406, constraint identification manager 408, and enforcement manager 410, although more or fewer computing components or subroutines may be similarly utilized.

The consumption monitoring manager 406 may be configured to determine current individual and/or aggregate power consumption values (e.g., corresponding to the host(s) 324 of FIG. 3, each an example of the server(s) 104 of FIG. 1). The constraint identification manager 408 may be configured to perform any suitable functionality corresponding to identifying one or more power cap values for a host, instance, or workload (e.g., host(s) 324). The enforcement manager 410 may be configured to enforcing and/or triggering enforcement of power caps at any suitable device, in accordance with at least one embodiment. Allocating power may refer to a process of assigning a budgeted amount of power (e.g., an expected amount of load/power draw) to any suitable component. A power cap may be an example of a budgeted amount of power.

The functionality described in connection with power management service 402 may, in some embodiments, be executed by one or more virtual machines that are implemented in a hosted computing environment (e.g., on host(s) 324, corresponding to any suitable number of servers 104 of FIG. 1). The hosted computing environment may include one or more rapidly provisioned and released computing resources, which computing resources may include computing, networking and/or storage devices. A hosted computing environment may also be referred to as a cloud-computing environment. A number of example cloud-computing environments are provided and discussed below in more detail with respect to FIGS. 20-25.

The power management service 450 (e.g., consumption monitoring manager 406) may be configured to receive/obtain consumption data from PDU(s) (e.g., from rack PDU 320 from a power controller such as BMC/ILOM 322 of FIG. 3). As described above, the consumption data may be aggregated or cumulative with respect to one or more devices. As a non-limiting example, an instance of consumption data received by power management service 402 may include the cumulative/aggregated consumption data for every device relating to (e.g., managed by) a given PDU. By way of example, the PDU providing the consumption data may be a rack PDU (e.g., rack PDU 320) and the consumption data provided by that PDU may include the cumulative/aggregated and/or individual consumption data values for every device in the rack (e.g., the hosts of host(s) 324 associated with a given rack 319). In some embodiments, the cumulative/aggregate consumption data values may additionally include a power consumption of the PDU. The power management service 402, from this consumption data, may access to individual and/or aggregated or cumulative power consumption data with respect to individual devices or all of the devices to which that instance of consumption data relates. The power management service 402 may be configured to perform any suitable operation (e.g., aggregating consumption data, calculating power cap values, calculating timing values, determining budgeted power values, identifying whether power capping is needed (e.g., when aggregated consumption breaches/is likely to breach budgeted power, etc.) based at least in part on data representing the power distribution hierarchy 500 of FIG. 5 and/or any suitable configuration data identifying the arrangement of the components within the datacenter (e.g., indicating which devices distribute power to which devices). By way of example, the configuration data may include data representing power distribution hierarchy 500.

Figure 5:
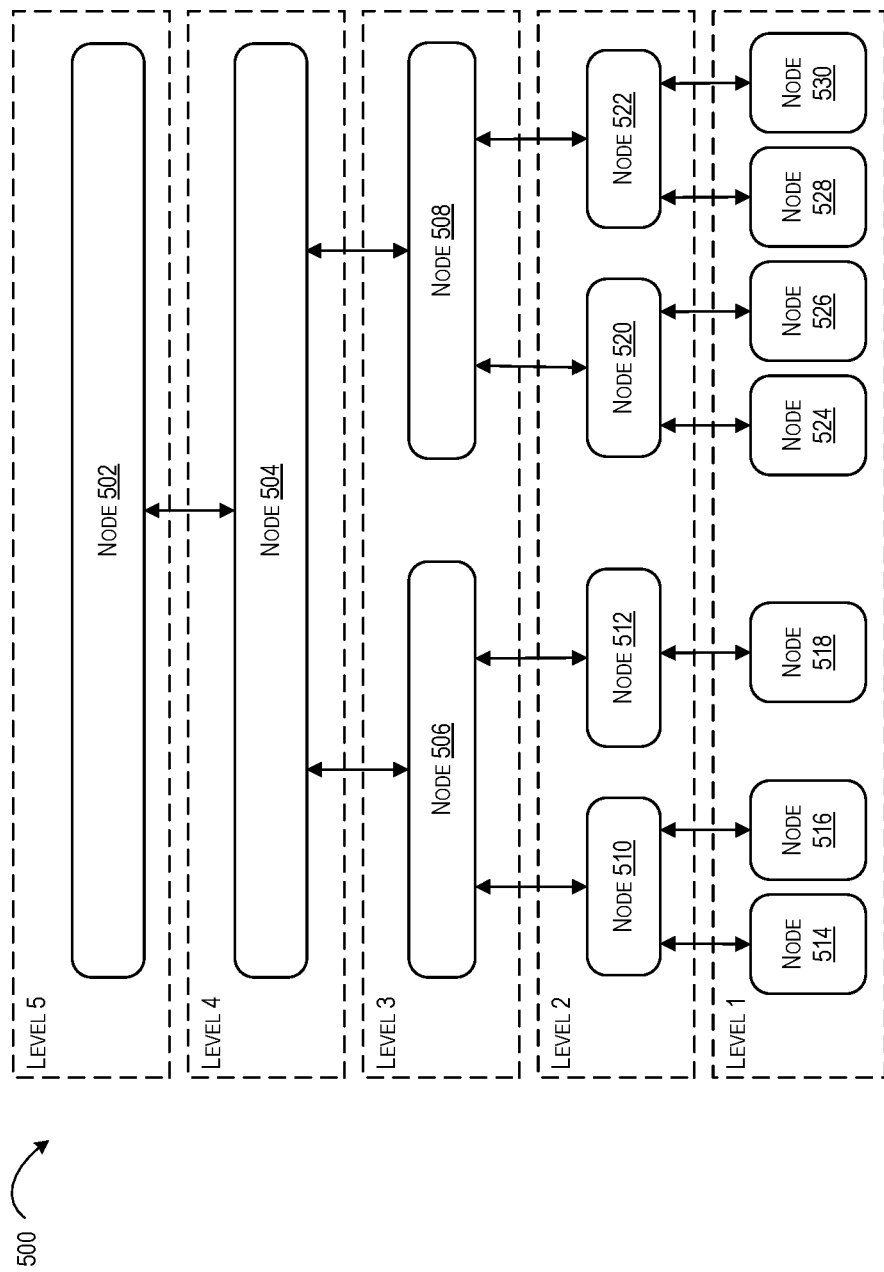
FIG. 5 illustrates an example power distribution hierarchy corresponding to the arrangement of the components of FIG. 2, in accordance with at least one embodiment.

FIG. 5 illustrates an example of a power distribution hierarchy 500 corresponding to an arrangement of the components of FIG. 2, in accordance with at least one embodiment. Power distribution hierarchy 500 may represent an arrangement of any suitable number of components of a power system such as the power distribution infrastructure components discussed in connection with power distribution infrastructure 200 of FIG. 2. The power distribution hierarchy 500 may include any suitable number of nodes organized according to any suitable number of levels. Each level can include one or more nodes. A root level (e.g., level 5) may include a single root node of the power distribution hierarchy 500. Each node of the power distribution hierarchy 500 may represent a corresponding component of the power distribution infrastructure 200. A set of one or more nodes of a given level may descend from a particular node corresponding to a higher level of the power distribution hierarchy 500. A set of lower-level components that are represented by nodes of a lower level (e.g., level 1), may receive power distributed through a higher-level component represented by a node of level 2 (e.g., a component that is upstream from the lower-level components), which in turn receives power from a higher-level component represented by a node of level 3, which receives power from a higher-level component represented by a node of level 4. In some embodiments, every component of the power system receives power that is initially distributed through a component corresponding to a node (e.g., node 502, a root node) of level 5 (e.g., the highest level of the power distribution hierarchy 500). Node 502 may receive power from a utility power source (e.g., a local electric utility system).

As depicted, power distribution hierarchy 500 includes node 502 of level 5. In some embodiments, node 502 may represent an uninterrupted power supply of UPS(s) 202 of FIG. 2. The component corresponding to node 502 may distribute/supply power to a component corresponding to node 504 of level 4. A component (e.g., a lower-level component) that receives power from a higher-level component (a component represented by a node of a higher level of the power distribution hierarchy 500 than the level of the node representing the lower-level component) may be considered to be subordinate to the higher-level component. In some embodiments, node 304 may represent a component such as one of the intermediate PDU(s) 204 of FIG. 2 (e.g., a switchboard) that is subordinate to the UPS represented by node 502. The component represented by node 504 may be configured to distribute/supply power to components respectively represented by nodes 506 and 508.

Nodes 506 and 508 of level 3 may each represent a respective component (e.g., respective row PDU(s)) of FIG. 2. The component corresponding to node 506 (e.g., row PDU 206, a bus bar) may distribute/supply power to a component corresponding to node 510 (e.g., rack PDU 208A of FIG. 2) and a component corresponding to node 512 (e.g., rack PDU 208N of FIG. 2). A component corresponding to node 510 (e.g., rack PDU 208A) may distribute/supply power to components corresponding to nodes 514 and 516 of level 1 (respectively representing servers 212A and 212B of FIG. 2) which may be monitored/managed by a component of servers 212A and 212B such as power controllers 216A and 216B. The components corresponding to nodes 514 and 516 may be arranged in the same rack.

A component corresponding to node 512 (e.g., rack PDU 208A) may distribute/supply power to a component corresponding to node 518 of level 1 (e.g., server 214C of FIG. 2 including power controller 216C). Nodes 514, 516, and 518 of level 1 may be arranged and/or associated with the same row (e.g., row 210 of FIG. 2).

Returning to node 508 of level 3, node 508 (e.g., a different row PDU, a remote power panel, for example) may distribute/supply power to a component corresponding to node 510 (e.g., rack PDU 208A of FIG. 2) and a component corresponding to node 512 (e.g., rack PDU 208N of FIG. 2). A component corresponding to node 520 (e.g., a rack PDU) may distribute/supply power to components corresponding to nodes 522 and 526 of level 1 (e.g., corresponding to respective servers including respective power controllers). The components corresponding to nodes 524 and 526 may be arranged in the same rack. A component corresponding to node 522 (e.g., another rack PDU) may distribute/supply power to components corresponding to nodes 528 and 530 of level 1 (e.g., corresponding to respective servers including respective power controllers). The components corresponding to nodes 528 and 530 may be arranged in the same rack.

The particular number of components (e.g., corresponding to the nodes of level 1) receiving power distributed from a higher-level component (e.g., corresponding to a node of level 2) may vary from the number shown in FIG. 5. The particular number of levels within a power distribution hierarchy may vary depending on the particular arrangement of the components used in a given datacenter. It is contemplated that each non-root level (e.g., in the example of FIG. 5, levels 1-4) may include a different number of nodes representing a different number of components then the number of nodes depicted in each non-root level of FIG. 5. Nodes may be arranged in a different, but similar configuration as the one depicted in FIG. 5.

Returning to FIG. 4, the power management service 402 (e.g., the constraint identification manager 408) may calculate aggregated/cumulative consumption data to identify aggregated/cumulative consumption data with respect to one or more devices at a higher level of the of the power distribution hierarchy 500. By way of example, the power management service 402 (e.g., the constraint identification manager 408) may utilized consumption data provided by one or more rack PDUs and calculate aggregated/cumulative consumption data for a row device. For example, consumption data corresponding to devices represented by level 1 nodes of FIG. 5 that share a common set of nodes up to level 3 of the hierarchy. In this case, the common level 3 nodes represents a row PDU such as a bus bar. In some embodiments, consumption data indicating the power consumption of the one or more rack PDUs (e.g., examples of components corresponding to level 2 of the power distribution hierarchy 500) may be included in the consumption data provided to power management service 402. The consumption data provided by the rack PDUs may be provided according to any suitable frequency, periodicity, or schedule, or in response to a request transmitted by power management service 402. Power management service 402 may obtain consumption data relating to any suitable number of device(s) of FIG. 3 such as the host(s) 324 and/or racks of device(s) corresponding to one or more racks (e.g., rack 319) and may aggregate or calculate any suitable consumption data corresponding to any suitable number of components represented by any suitable node and/or level of power distribution hierarchy 500.

The power management service 402 (e.g., the constraint identification manager 408) may be configured to calculate one or more power caps (e.g., power cap values for one or more servers to which power is distributed by a higher-level device (e.g., in this example, a row-level device) based at least in part on allocated power values (e.g., an amount of budgeted power) for that higher-level component. The higher-level component may correspond to any suitable level (e.g., levels 2-5) of the power distribution hierarchy 500 other than the lowest level (e.g., level 1). By way of example, the power management service 402 may calculate power cap values for servers to which power is distributed by a given row device (e.g., a bus bar). These calculations may be based on consumption data provided by the rack PDUs to which power is distributed by the row device. In some embodiments, the power management service 402 may store consumption data for subsequent use. The power management service 402 may utilize historical consumption data when calculating these power cap values. In some embodiments, the power management service 402 may obtain, utilize, and/or train one or more machine-learning models to identify, from historical consumption data, particular power cap values for one or more host(s) 324 (e.g., components corresponding to level 1 of the power distribution hierarchy). These techniques are discussed in more detail with respect to FIG. 12.

The power management service 402 (e.g., the enforcement manager 410) may calculate a timing value for a timer (e.g., a timer that may be initiated and managed by the PDU(s) such as rack PDU 320). The timing value may be calculated based at least in part on any suitable combination of: a rate of change in the power consumption of a higher-level component, a direction of change (increasing/decreasing) of the power consumption of the higher-level component, a power spike tolerance of the higher-level component and/or of the system 300 as a whole, or an enforcement time associated for lower-level devices (e.g., a presumed/known delay between when each of the device(s) (e.g., host(s) 324) are instructed to enforce power cap values and when each of device(s) (e.g., host(s) 324) will be actively enforcing the cap (e.g., a first time at which power consumption at that device is constrained/throttled, or at least a determination of whether to constrain/throttle is made).

The power management service 402 (e.g., the enforcement manager 410) may communicate calculated timing values to the PDU(s) 402 at any suitable time. In some embodiments, the power management service 450 may initially determine power caps for a given higher-level component (e.g., a row component) without regard to consumption occurring with respect to other components of the same level (e.g., other row components). In some embodiments, while the timer is being initialized or elapsing, or at any suitable time, the power management service 402 may process consumption data corresponding to other same-level components to determine if power capping downstream components of one or more of those same-level components is more desirable. In some embodiments, the power management service 402 may utilize a priority associated with the device(s) and/or the workloads running on those device(s) to determine power cap values (e.g., a priority identified based at least in part on host/instance data 316 of FIG. 3). The power management service 402 may be configured to favor power capping lower-priority device(s)/ workload(s) while leaving device(s)/workload(s) with higher priority values unconstrained. In some embodiments, the power management service 402 may be configured to favor power capping a set of highest consuming devices (e.g., across one row, across rows, etc.) while leaving lower consuming devices to operate unconstrained. In some embodiments, the particular consumption of one device, even if the device is included in the set of highest consuming devices, may be left unconstrained if the priority associated with that device and/or workload is high (or higher than priorities associated with other devices and/or workloads). Thus, the power management service 402 may be configured to prioritize the priority of the device/workload over the power consumption of that particular device.

In some embodiments, power cap values may be initially determined by the power management service 402 (e.g., by the constraint identification manager) for a given row. Those power cap values may be provided to the power controller of the rack PDU (e.g., the BMC/ILOM 320, or another agent or component of the rack PDU 320) which, in turn, may distribute the power cap values to the power controller (e.g., the BMC/ILOM 328) at the host(s) 324 for storage. The power management service 402 (e.g., the constraint identification manager 408) may process consumption data with respect to other row devices of the same row to determine power cap values for devices corresponding to different row. This may be advantageous since devices managed by another row may not be consuming their budgeted power, leaving some amount of power unutilized at that row-level device. In some embodiments, the power management service 402 (e.g., constraint identification manager 408) may be configured to determine whether power capping the devices of one row, while allowing at least some devices of another row to operate unconstrained may be more advantageous. Determining a benefit for a set of power cap values may be based at least in part on minimizing an estimated impact (e.g., a number of devices to be power capped), minimizing priority values associated with the devices to be power capped, maximizing the number of devices associated with particular high priority values that will not be power capped, and the like. The power management service 402 may utilize a predefined protocol (e.g., a set of rules) to determine whether enforcement of the power cap values it already sent to one PDU is more or less advantageous/beneficial than different power capping values it has identified based on processing consumption data from multiple PDUs associated with one or more other rows.

The power management service 402 (e.g., the enforcement manager 410) may be configured to enact the enforcement of the set of power cap values that are determined to be most advantageous (based on a predefined rule set) to ensure that one or more circuit breakers within the datacenter are not tripped and/or that an aggregate power threshold is enforced. If current/aggregate power consumption levels exceed the current aggregate power threshold, the power management service 402 may be configured to execute or trigger execution of operations to bring the current/aggregate power consumption levels to a value that falls below the current aggregate power threshold.

In some embodiments, monitoring, identifying, and/or constraining based on power cap values may be determined by the power management service 402 directly based on the power data 310, the account data 312, the environment data 314, the host/instance data 316, operational data 318, and the like.

In some embodiments, the power management service 402 may be configured to identify power cap values and/or enforce power cap values based at least in part on instructions and/or constraints or other applicable data provided by the VEPO orchestration service 302. As a non-limiting example, the VEPO orchestration service 302 may filter aggregated data of any suitable combination power data 310, account data 312, environment data 314, hist/instance data 316, and/or operational data 318, based on a reduction action associated with a level (e.g., "power cap by 10% all low priority hosts.") to determine the estimated impact of implementing the action, including the number and/or subset of resources (e.g., hosts, instances, workloads, customers) to which the action, if implemented, applied. By way of example, the VEPO orchestration service 302 may identify from aggregated data of any suitable combination power data 310, account data 312, environment data 314, hist/instance data 316, and/or operational data 318, the number and/or identifiers corresponding to all low-priority hosts. In some embodiments, the identifiers and/or the instruction (power cap by 10%) may be provided to the power management service 402, received through the input/output processing module 404 and implemented by the enforcement manager 410. As another non-limiting example, any suitable portion of the metadata associated with the reduction action (e.g., "power cap by 10% all low priority hosts") may be provided to the power management service 402 and constraint identification manager 408 may be configured to identify the particular hosts/instances/workloads from the metadata associated with the reduction action. Said another way, any suitable combination of the VEPO orchestration service 302 and/or the power management service 402 (e.g., the power management service 304) may be configured to identify the estimated impact of a given action. In some embodiments, the power management service 402 (e.g., the constraint identification manager 408) may be configured to identify, given the hosts/instances/workloads/customers expected to be impacted if the action (or level) is effectuated, an estimated power reduction value corresponding to an individual or aggregate power consumption of one or more device(s) (e.g., host(s) 324).

If the set of power caps previously provided to power controller (e.g., BMC/ILOM 322 and/or BMC/ILOM 322) is determined to be most advantageous, the power management service 402 may transmit data to the power controller to cause the power controller to transmit the indicator to device(s) to commence power capping based on the previously distributed power caps. Alternatively, if the power management service 402 determines the new set of power caps are more (or most) advantageous from a power management perspective, it may transmit data to the power controller (e.g., BMC/ILOM 322) to cancel the timer. In some embodiments, canceling the timer may cause the previously distributed power caps to be deleted by instruction from the power controller (e.g., transmitted in response to canceling the timer), or those power caps may time out by default (e.g., according to a predefined time period). The power management service 402 may transmit the new power caps to the appropriate PDUs (which may include or exclude the same PDU to which the previous set of power caps was transmitted) with an indication that the power caps are to be immediately enforced by the corresponding devices. These PDUs may transmit those power caps with an instruction to the receiving device to immediately commence power capping operations (e.g., including monitoring consumption with respect to the power cap value, determining whether the cap based on the power cap value and current consumption of the device, and cap or leave unconstrained the operations of the device based on the determination).

In some embodiments, if the timer expires at the original PDU (e.g., a time period corresponding to the timing value elapses), and a cancellation from the power management system 402 has not been received, the power controller (e.g., BMC/ILOM 322) may automatically instruct the device(s) (e.g., via BMC/ILOM 328) to commence power capping operations with the power cap values stored. This technique ensure a failsafe for when, for any reason, the power management service 402 fails to instruct the PDU or cancel the timer.

The techniques described above enable more lower-level devices to run unconstrained by minimizing the number and/or frequency at which those devices' power consumption is capped. Additionally, devices downstream in the hierarchy to a given device may be allowed to peak past the device's budgeted power while still ensuring that the device's maximum power capacity (a value higher than that of the budgeted value) is not exceeded. This enables consumption of low-level devices to cause consumption levels at the higher device to operate within the buffer of power that conventional systems left unutilized. The system and the techniques described allow more efficient utilization of the power distribution components of the system 400 and reduce waste while ensuring that power failures are avoided.

In some embodiments, a set of power cap values that are determined to be most advantageous (e.g., based at least in part on any suitable combination of maximum expected reduction and/or a minimum estimated impact, etc.) may be selected by the power management service 402, or a particular set of power cap values (previously identified by the power management service 402 and provided to the VEPO orchestration service 302) may be provided from the VEPO orchestration service 302 and/or implemented by the power management service 402. In some embodiments, the particular power cap values identified may be identified based at least in part on maximizing power consumption reductions, identifying a sufficient power cap related reduction that individually or collectively with other operations corresponding to a reduction action or level related to dropping an aggregate power consumption value of the device(s) below a current aggregate power threshold.

Figure 6:
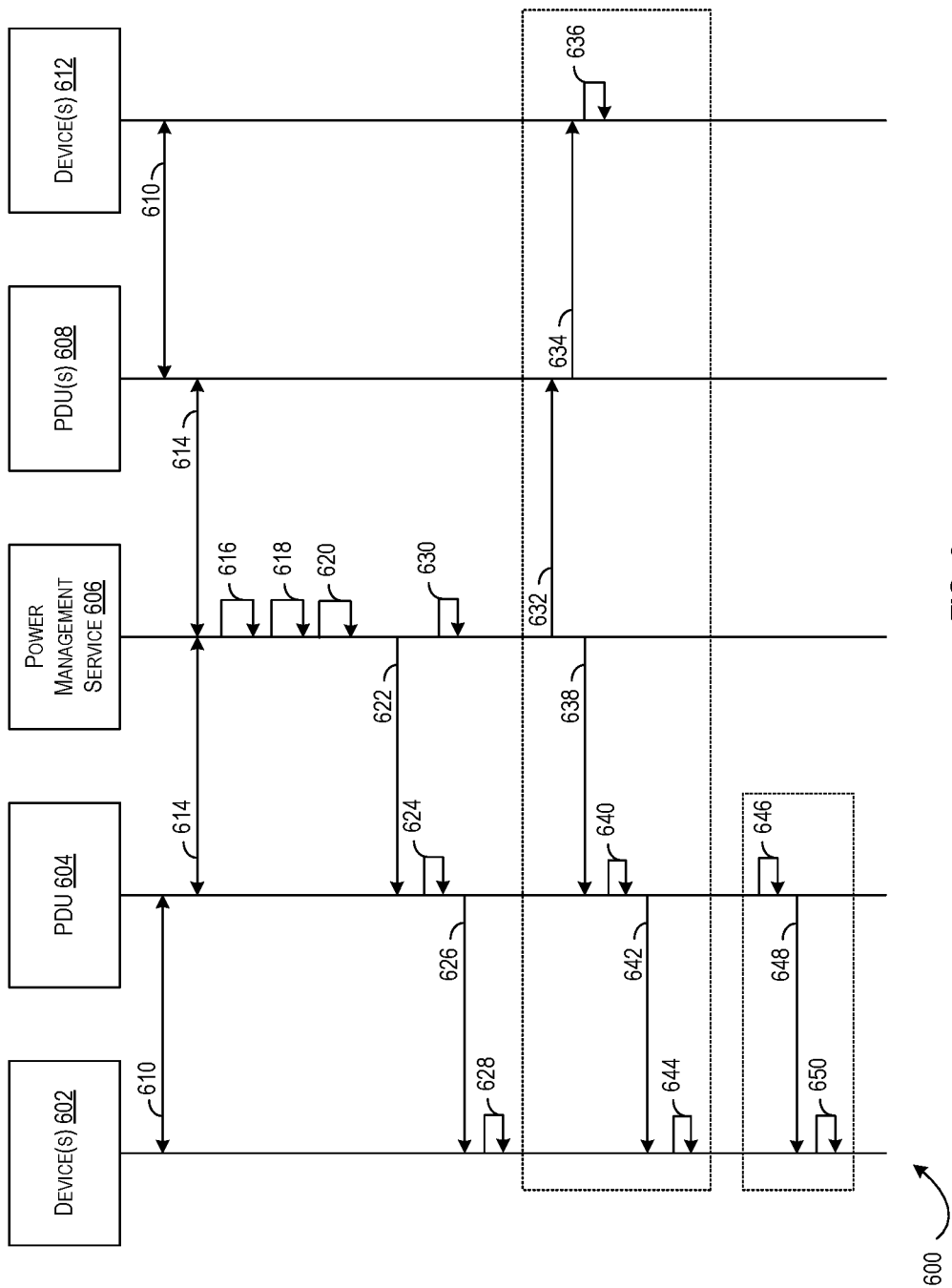
FIG. 6 is a flow diagram illustrating an example method for managing excessive power consumption, in accordance with at least one embodiment.

FIG. 6 is a flow diagram illustrating an example method 600 for managing excessive power consumption, in accordance with at least one embodiment. The method 600 may include more or fewer operations than those depicted or describes with respect to FIG. 6. The operations may be performed in any suitable order. Any suitable portion of the operations described in connection with power management service 606 may be additionally or alternatively performed by the VEPO orchestration service 302 and/or the compute service 306 of FIG. 3.

The method 600 may begin at 610, where consumption data may be received and/or obtained (e.g., by request) by PDU 604 from device(s) 602. Device(s) 602 may be examples of the host(s) 324 of FIG. 3 (e.g., a number of servers) and may be arranged within a common server rack (e.g., rack 319). PDU 604 is an example of the rack PDU 208A of FIG. 2 and/or the rack PDU 320 of FIG. 3. Each of the device(s) 602 may be a device to which PDU 604 distributes power. PDU(s) 608 may be examples of other rack PDUs associated with the same row as PDU 604 and thus, receiving power from the same row PDU (e.g., row PDU 206 of FIG. 2, corresponding to node 506 of FIG. 5) as PDU 604. The consumption received from PDU(s) 608 may correspond to the power consumption of device(s) 612. In some embodiments, at least some portions of PDU(s) 608 and device(s) 612 correspond to a row that is different from the row corresponding to device(s) 602. In some embodiments, any suitable number of instances of consumption data (referred to as "device consumption data") received by PDU 604 may relate to a single device of device(s) 602. The same may be true of the device consumption data received by PDU(s) 608. In some embodiments, PDU 604 and PDU(s) 608 may aggregate and/or perform calculations from the device consumption data instances received to generate rack consumption data corresponding to each respective PDU. For example, PDU 605 may generate rack consumption data from the device consumption data provided by device(s) 602. The rack consumption data may include the device consumption data instances received by the PDU 604 at 610. Similarly, the rack consumption data provided by PDU(s) 608 may include device consumption instances received from device(s) 612. The rack consumption data generated by PDU 604 and/or PDU(s) 608 may be generated based at least in part on the power consumption of PDU 604 and/or PDU(s) 608, respectively.

At 614, the power management service 606 (an example of power management service 402 of FIG. 4, the power management service 304 of FIG. 3) may receive and/or obtain (e.g., via request) rack consumption data from any suitable combination of PDU 604 and PDU(s) 608 (also examples of PDU(s) 208 of FIG. 2), not necessarily at the same time. In some embodiments, power management service 606 may receive/obtain rack consumption data from PDUs 604 and PDU(s) 608 on an ongoing basis. PDU 604 and PDU(s) 608 may likewise receive and/or obtain (e.g., via request) device consumption data from device(s) 602 and 612, respectively (e.g., from corresponding power controllers of those devices, each power controller being an example of the BMC/ILOM 328 of FIG. 3). The PDU(s) 608 may correspond to PDUs associated with the same row as PDU 604.

At 616, the power management service 606 may determine whether to calculate power cap values for device(s) 602 based at least in part on maximum and/or budgeted power amounts associated with another PDU (e.g., a row-level device not depicted in FIG. 5, such as bus bar) and the consumption data received from PDU 604 and/or PDU(s) 608. In some embodiments, the power management service 606 may access these maximum and/or budgeted power amounts associated with, for example, a row-level PDU (e.g., row PDU 206 of FIG. 2, not depicted here), from stored data or the maximum and/or budgeted amounts may be received by the power management service 606 at any suitable time from the PDU (the row-level PDU) to which the maximum and/or budgeted power amounts relate. The power management service 606 may aggregate the rack consumption data from PDU 604 and/or PDU(s) 608 to determine a cumulative power consumption value with respect to the row-level device (e.g., total power consumption from devices downstream of the row-level device within a last time window, a change of the rate of consumption from the perspective of the row level device, a direction of change of the rate of consumption from the perspective of the row-level device, a time period needed to commence power capping at one or more of device(s) 602 and/or 612, or the like). In some embodiments, the power management service 606 may generate additional cumulative power consumption data from at least some portion of the cumulative power consumption data values and/or using historical device consumption data (e.g., cumulative or individual consumption data). For example, the power management service 606 may calculate any suitable combination of: a change of the rate of consumption from the perspective of the row-level device, a direction of change of the rate of consumption from the perspective of the row-level device, or the like, based at least in part on historical consumption data (e.g., historical device consumption data and/or historical rack consumption data corresponding to device(s) 602 and/or 512).

Alternatively, in some embodiments, the power management service 606 may receive at 616 any suitable data and/or instructions from VEPO orchestration service 402 identifying any suitable portion of a reduction action (e.g., power cap only low-priority hosts) and/or any suitable constraints and/or any suitable device to which the constraints apply. The power management service 606 may identify (e.g., in this example, from only low-priority host candidates) a subset of the host(s) to which power caps are to be calculated. An action for power capping only low-priority hosts, for example, may result in the power management service 606 identifying, from all low-priority hosts (e.g., a subset of the host(s) 324) a number of power caps for a subset of those low-priority hosts.

The power management service 606 may determine that power cap values should be calculated if the cumulative power consumption (e.g., power consumption corresponding to device(s) 602 and 612) exceeds a budgeted amount of power associated with the row-level PDU. If the cumulative power consumption does not exceed the budget amount associated with the row-level PDU, the power management service 606 may determine power caps should not be calculated and the method 600 may conclude. Alternatively, the power management service may determine power caps should be calculated due to the cumulative power consumption of downstream devices (e.g., device(s) 602 and 612) exceeding the budget amount associated with the row-level PDU and may proceed to 618.

In some embodiments, the power management service 606 may additionally or alternatively determine that power cap values should be calculate at 616 based at least in part on providing historical consumption data (e.g., device consumption data and/or rack consumption data corresponding to device(s) 602 and/or 612) as input data to one or more machine-learning models. The machine-learning model(s) may be trained using any suitable supervised or unsupervised machine-learning algorithms to identify from historical consumption data provided as input a likelihood that consumption corresponding to the devices associated with the historical consumption data will exceed a budgeted amount (e.g., a budgeted amount of power allocated to a row-level device). The machine-learning model(s) may be trained using corresponding training data sets including historical consumption data instances. The training of these machine-learning model(s) is discussed in more detail with respect to FIG. 12. Using the techniques described above, the power management service 506 may identify that power cap values are to be calculated based on cumulative device/rack consumption levels exceeding the budgeted power associated with the row-level device and/or based on determining, from the output of the machine-learning model(s), that the cumulative device/rack consumption levels are likely to exceed the budgeted power associated with the row-level device. Determining that the device/rack consumption levels are likely to exceed the budgeted power of the row-level device may be determined based on receiving an output from the machine-learning model(s) that indicates a likelihood (e.g., likely/unlikely) or by comparing the output value (e.g., a percentage, a confidence value, etc.) indicating the likelihood of exceeding the budgeted power of the row-level device to a predefined threshold. An output value indicating a likelihood that exceeds the predefined threshold may result in the power management service 606 determining that power capping is warranted and that power cap values are to be calculated.

At 618, the power management service 606 may calculate power cap values for any suitable number of device(s) 602 and/or device(s) 612. By way of example, the power management service 606 may utilize the device consumption data and/or rack consumption data corresponding to each of the device(s) 602 and 612. In some embodiments, the power management service 606 may determine a difference between the cumulative power consumption (calculated from aggregating the device and/or rack consumption data corresponding to device(s) 602 and device(s) 612) of a row of devices (e.g., device(s) 602 and any of device(s) 612 of the same row) and the budgeted power associated with the row-level device). The difference may be used to identify an amount by which power consumption is to be constrained at the devices associated with that row. The power management service 606 may determine power cap values for any suitable combination of the device(s) 602 and/or 612 for devices of the same row based on identifying that power cap values that, if enforced by the devices, will result in a reduction of power consumption to a value that is less than the budgeted power associated with the row-level device.

In some embodiments, the power management service 606 may determine particular power cap values for any suitable combination of the device(s) 602 and 612 corresponding to the same row based at least in part on the consumption data and/or priority values associated with those devices and/or the workloads associated with those the devices' power consumption. In some embodiments, these priority values may be provided as part of the device consumption data provided by the device to which that consumption data relates, or the priority values may be ascertained based at least in part on a type of device, a type of workload, or the like, obtained from the consumption data or any other suitable source (e.g., from separate data accessible to the power management service 606). Using the priority respectively associated with the device or workload, the power management service 606 may calculate power cap values in a manner that favors power capping devices associated with lower priority workloads over power capping devices with higher priority workloads. In some embodiments, the power management service 606 may calculate power cap values based at least in part on favoring power capping devices that are consuming at higher rates (e.g., a set of highest consuming devices) over that of power capping other devices that are consuming at lower rates. In some embodiments, the power management service 606 may calculate power cap values based at least in part on a combination of factors including the consumption values for each device and the priority associated with the device or the workload being executed by the device. The power management service 606 may identify power cap values for the devices that avoid capping a high consuming device and/or a high priority device altogether, or that cap those devices to a lesser degree than devices consuming less power and/or being associated with a lower priority.

At 620, the power management service 620 may calculate a timing value corresponding to a duration for a timer to be initialized and managed by a PDU (e.g., PDU 604). The timing value may be calculated based at least in part on any suitable combination of a rate of change of the power consumption from the perspective of the row-level device, a direction of change of the power consumption from the perspective of the row-level device, or a time to perform the power capping at each of the devices to which the power caps calculated at 618 relate. By way of example, the power management service 620 may determine a timing value based on determine a relatively large increase in power consumption from the perspective of the row-level device that is greater than a timing value for a smaller increase in power consumption from the perspective of the row-level device. Therefore, the greater the increase in the rate of power consumption is, the smaller the timing value (corresponding to a shorter timer), while a smaller increase in the rate of power consumption may result in a larger timing value (corresponding to a longer timer). Similarly, a first timing value calculated may be less than a second timing value calculated when the time to perform the power capping at each of the devices to which the power caps relate is shorter with respect to the calculation of the first timing value. Therefore, the quicker the devices to which power capping is contemplated can enforce the caps, the shorter the timing value may be. In some embodiments, the timer is not calculated for power caps determined via data provided by or instructed by VEPO orchestration service 302.

At 622, the calculated power cap value calculated at 618 and/or the timing value calculated at 620 may be transmitted to PDU 604. Although not depicted, the corresponding power cap values and/or timing values for any of device(s) 612 of the same row may be transmitted at 620. Although not depicted, in some embodiments, the transmission at 622 may be based at least in part on an instruction received from VEPO orchestration service 302 to effectuate/implemented the power cap value calculated at 618.

At 624, when a timing value is provided at 622, the PDU 604 may use the timing value to initialize a timer having a duration corresponding to the timing value. As described above, in instances in which the power management service 606 is being instructed by the VEPO orchestration service 302, the timing value may not be provided at 622, nor stored at 624.

At 626, the PDU 604 may transmit the power cap values (if received at 622) to device(s) 602. Device(s) 602 may store the received power cap values at 628. In some embodiments, the power cap values provided at 626 may include an indicator that indicates enforcement is not to commence, or no indicator may be provided and the device(s) 602 may refrain from commencing power capping by default.

At 630, the power management service 606 may perform a higher-level analysis of device/rack consumption data receive from any of the device(s) 612 that correspond to a different row than the row to which device(s) 602 correspond. As part of this processing, the power management service 606 may identify unutilized power associated with other row-level devices. If unutilized power exists, the power management service 606 may calculate a new set of power cap values based at least in part on the consumption data corresponding to at least one other row of devices. In some embodiments, any suitable power cap values identified by the power management service 606 may be provided at any suitable time to VEPO orchestration service 302. As described above, the new set of power cap values may be advantageous since devices managed by another row-level device may not be consuming their budgeted power, leaving unutilized power at that row-level device. In some embodiments, the power management service 606 may be configured to determine whether capping the devices of another row, while allowing at least some devices of device(s) 602 (and potentially some of device(s) 612 corresponding to the same row as device(s) 602) to operate unconstrained may be more advantageous. The benefit of each power capping approach may be calculated based at least in part on minimizing a number of devices to be power capped, minimizing priority values associated with the devices to be power capped, maximizing the number of devices associated with particular high priority values that will not be power capped, and the like. The power management service 606 may utilize a predefined scheme or set of rules to determine whether enforcement of the power cap values it already determined for one row (e.g., corresponding to the power cap values transmitted at 622) is more or less advantageous than different power capping values that have been identified based on processing consumption data from multiple rows. In some embodiments, the benefit of each set of power cap values identified by the power management service 606 may be accessed and a most advantageous set of power caps may be selected by the power management service 606 (e.g., according to a set of rules, according to user input selecting a particular response level, etc.).

The power management service 606 may be configured to enact the enforcement of the set of power cap values that are determined to be more (or most) advantageous (or the power cap value set instructed by VEPO orchestration service 302) to ensure that one or more circuit breakers within the datacenter are not tripped and/or that an aggregate power threshold is enforced. If the set of power caps previously provided to PDU 604 is determined to be less advantageous than the set of power cap values calculated at 630, the power management service 606 may transmit data to PDU 604 immediately to cause the PDU 604 to transmit an indicator to device(s) 602 to immediately commence power capping based on the power caps previously distributed. Alternatively, the power management service 606 may take no further actions, which may allow the timer at PDU 604 to elapse. Any suitable operations discussed as being performed by the power management service 606 based on determinations or identification made by the power management service 606 may alternatively be triggered by instruction of the VEPO orchestration service 302.

If the power management service 606 determines the new set of power caps are more (or most) advantageous from a power management perspective, it may transmit data to the power controller (e.g., BMC/ILOM 322 of FIG. 3) to cancel the timer. The previously distributed power caps may be deleted by instruction from the power controller (e.g., BMC/ILOM 322) (e.g., transmitted in response to canceling the timer), or those power caps may time out by default according to a predefined time period. The power management service 606 may transmit the new power caps to the appropriate PDUs (which may include or exclude the same PDU to which the previous set of power caps was transmitted) with an indication that the power caps are to be immediately enforced by the corresponding devices. These PDUs may transmit those power caps with an instruction to the receiving device to immediately commence power capping operations (e.g., including monitoring consumption with respect to the power cap value, determining whether the cap based on the power cap value and current consumption of the device, and cap or leave unconstrained the operations of the device based on the determination).

If the power cap values calculated at 630 are determined to be more advantageous from a power management perspective than the power cap values calculated at 618 and ultimately stored at device(s) 602 at 628, the method 600 may proceed to 632 where the power cap values calculated at 630 may be transmitted to PDU(s) 608 (e.g., any of the PDU(s) 608 that manage devices to which the power cap values relate). In some embodiments, the power management service 606 may provide an indication that the power cap values transmitted at 632 are to be immediately enforced. The operations described at 632 may be triggered by the power management service 606 based on determinations/identification made by the power management service 606 or in response to receiving instructions from the VEPO orchestration service 302.

In response to receiving the power cap values and indication at 632, the PDU(s) 608 that distribute power to the devices to which those power cap values relate may transmit the power cap values and the indication to the devices to which those power cap values relate. At 636, the receiving devices of device(s) 612 may, based on receiving the indication, execute power capping operations without delay. This includes 1) determining whether to limit/restrict operations based on the current consumption of a given device when compared with the power cap value provided to that device, and 2) limiting/restricting or refraining from limiting/restricting power consumption of that device.

In some embodiments, power management service 606, based at least in part on identifying the power cap values calculated at 630 are more (or most) advantageous than the ones calculated at 618, may transmit data cancelling the timer and/or power cap values that were transmitted at 622. In some embodiments, the PDU 604 may be configured to cancel the timer at 640. In some embodiments, the PDU 604 may transmit data at 642 that causes the device(s) 602 to delete the power cap values from memory at 644.

At 646, in situations where a more advantageous set of power cap values are not found, as described above, or the power management service 606 has not transmitted a cancellation as described above in connection with 638, the PDU 604 may identify that the timer that was initiated at 624 has expired (e.g., a duration corresponding to the timing value provided at 622 has elapsed). As a result, the PDU 604 may transmit an indication to device(s) 602 at 648, instructing the device(s) 602 to commence power capping based on the power cap values stored at the device(s) 602 at 628. Receiving this indication at 648 may cause the device(s) 602 to commence power capping at 650 according to the power cap values stored at 628. In some embodiments, the VEPO orchestration service 302 may be configured to control the operations of 646-650 and the operations of 646-650 may not be executed by the power management service 606 unless instructed to do so by the VEPO orchestration service 302.

In some embodiments, the PDU 604 may be configured to cancel the timer at any suitable time after the timer is initiated at 624, if the PDU 604 identifies that the power consumption of device(s) 602 has lowered. In some embodiments, this may cause the PDU 604 to transmit data to device(s) 602 to cause the device(s) 602 to discard the previously stored power cap values from local memory.

In some embodiments, the power cap values being enforced at any suitable device may be timed out or may be replaced by power cap values calculated by the power management service 606 at any suitable time. In some embodiments, the power management service 606 may transmit a cancellation or replacement of a power cap value to any suitable device though its corresponding rack PDU. If a cancellation of the power cap value is received, the device may delete the previously stored power cap value, allowing the device to resume operations unconstrained. If a replacement power cap value is received, the device may store the new power cap value and enforce the new power cap value immediately, or when instructed by its rack PDU. In some embodiments, being instructed to enforce the new power cap value by its PDU may cause the device (e.g., the power controller 446) of the device to replace the power cap value that was previously being utilized for power capping with the new power cap value the device is being instructed to enforce.

Any suitable operations of method 600 may be performed at any suitable time on an ongoing basis to manage excessive consumption (e.g., situations in which the consumption of the servers corresponding to a row-level device exceed the row-level device's budgeted power) to enable more efficient use of previously unutilized power while avoiding power outages due to tripped circuit breakers. It should be appreciated that similar operations may be performed by the power management service 606 with respect to any suitable level of power distribution hierarchy 500. Although examples have been provided with respect to monitoring power consumption corresponding to a row-level device (e.g., a device represented by a level 3 node of power distribution hierarchy 500), similar operations may be performed with respect to higher-level devices of any suitable level (e.g., components corresponding to any of levels 2-5 of power distribution hierarchy 500). As described above, any suitable function/operations of the power management service 606 may be triggered based at least in part on determinations/identifications performed by the power management service 606 or any suitable function/operation of the power management service 606 may be triggered via instruction by the VEPO orchestration service 302.

Figure 7:
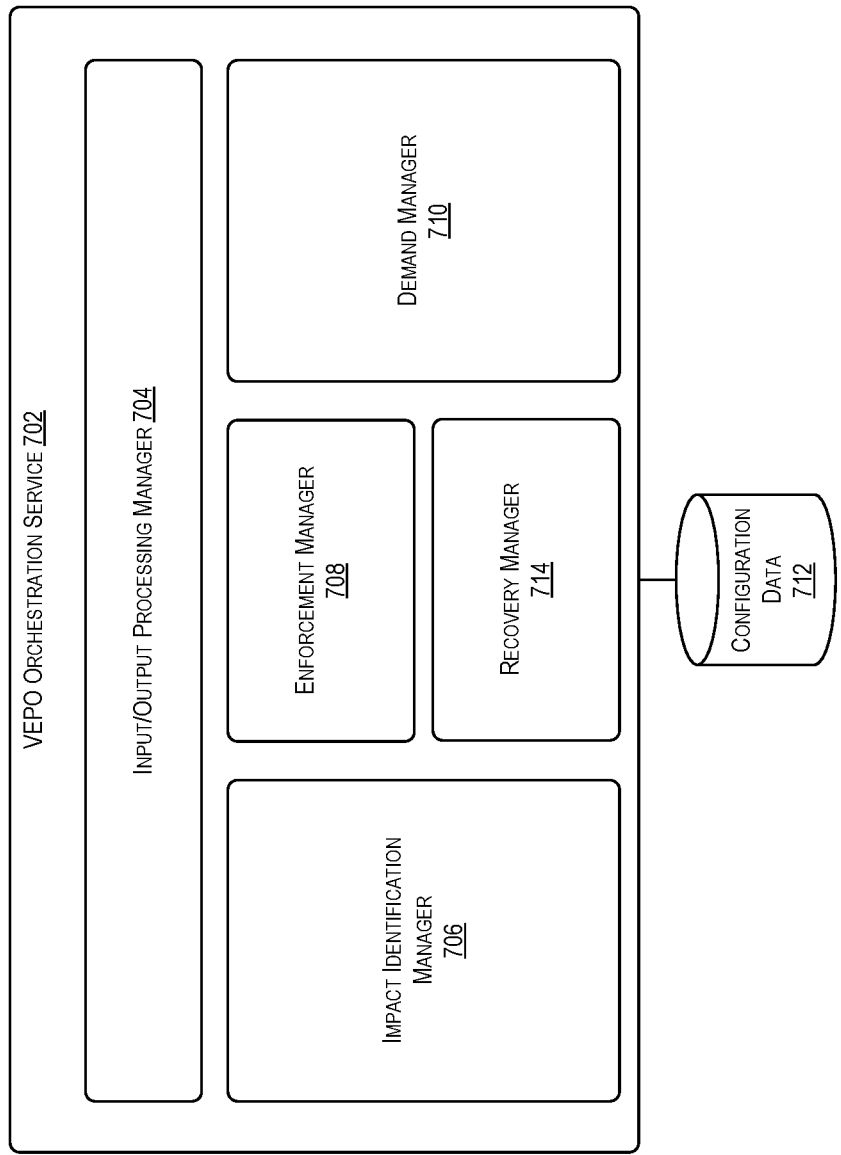
FIG. 7 illustrates an example architecture of a VEPO orchestration service for orchestrating power consumption constraints and/or power shut down tasks, in accordance with at least one embodiment.

FIG. 7 illustrates an example architecture of a VEPO orchestration service 702 (an example of the VEPO orchestration service 302 of FIG. 3) that is configured to orchestrate the management of power consumption of hosts in relation to an aggregate power threshold, in accordance with at least one embodiment. The VEPO orchestration service 702 may include input/output processing manager 704 which may be configured to receive and/or transmit any suitable data between the VEPO orchestration service 702 and any other suitable device of FIG. 3. As depicted, the power management service 402 may include demand manager 710, impact identification manager 706, and enforcement manager 708, although more or fewer computing components or subroutines may be similarly utilized.

The demand manager 710 may be configured to monitor and/or modify an aggregate power threshold associated with a physical environment (e.g., datacenter 102, room 110A, row 108A of FIG. 1, etc.). Monitoring may include monitoring any suitable combination of the power data 310, the environment data 314, the host/instance data 316, and/or the operational data 318 of FIG. 3. Modifying the aggregate power threshold may be performed, and an amount by which the aggregate power threshold may be modified, may be determined based at least in part on a number of triggering events. These triggering events may include, but are not limited to: 1) receiving a request from a government entity (e.g., local power authority) requesting a power reduction indefinitely, or for a period of time, 2) determining a current and/or predicted environment condition (e.g., a current ambient or external temperature, a predicted ambient or external temperature), 3) determining a current or predicted aggregate power consumption corresponding to the devices of the physical environment, 4) determining a current and/or predicted operational status of one or more temperature control units of the physical environment. The amount by which the aggregate power threshold may be or is to be modified, may be determined based at least in part on a number of factors, including, but not limited to: a difference between an ambient temperature and an external temperature, an amount of power consumption attributed to or associated with a particular component (e.g., a particular temperature control unit), an amount or percentage specified in a request received from a government entity, or a difference between a current or predicted aggregate power consumption value and a current or predicted aggregate power threshold.

The impact identification manager 706 may be configured to generate (directly, or by invoking functionality of another service or process such as the compute service 306 and/or power management service 304) one or more instances of an estimated impact corresponding to a response level and/or a reduction action corresponding to a response level. The VEPO orchestration service 702 may obtain configuration data 712 which specifies a number of VEPO levels and their corresponding set of one or more reduction actions.

FIG. 8 is a table 800 illustrating an example set of response levels and respective sets of reduction actions for each response level, in accordance with at least one embodiment. The data of table 800 may be differently provided such as through a mapping or embedded within program code of the VEPO orchestration service 702. Each response level of the set of response levels may be associated with a corresponding set of reduction actions that are performable on a plurality of resources (e.g., hosts, instances, workloads, etc.) of the data center, each corresponding set of reduction actions being associated with implementing a different reduction in the aggregate power consumption of the data center. In some embodiments, the plurality of response levels indicate an increasing severity and/or with which reduction actions are performed to reduce the aggregate power consumption of the data center.

By way of example, table 800 includes four VEPO response levels, although any suitable number of response levels may be utilized. VEPO response level 1 may be associated with one reduction action. Specifically, a reduction action specifying that all vacant and/or idle hosts and hypervisors that can be evacuated completed (e.g., via migration) are to be shut down (e.g., powered off).

In some embodiments, VEPO response level 1 may include halting or inhibiting any launch or assignment of instances and/or workloads to affected hosts. In some embodiments, VEPO response level 1 may include a reduction action that includes migrating an instance and/or workload from one host to another, or from one instance to another (in the case of workload migration).

VEPO response level 2 may be associated with multiple actions such as any/all of the reduction actions discussed above in connection to VEPO response level 1, and one or more additional reduction actions. For example, an additional reduction action corresponding to powering off hypervisors that host instances and/or workloads associated with a customer of category 1 (e.g., free tier customers, free trial customers, etc.).

VEPO response level 3 may be associated with multiple actions such as any/all of the reduction actions associated with VEPO response level 1 and/or 2, and one or more additional reduction actions. By way of example, VEPO response level 3 may include an additional reduction actions corresponding to powering off category 2 bare metal instances (e.g., pay-as-you-go and/or enterprise BMs), and hypervisors hosting category 3 virtual machines (e.g., VMs associated with pay-as-you-go and enterprise categories) (e.g., after evacuating higher priority VMs). In some embodiments, an additional reduction action may specify that BMs and/or VMs associated with customer and/or cloud services of priority level 1 (e.g., critical customers and cloud-provider services) are to be excluded from consideration.

VEPO response level 4 may be associated with multiple actions such as any/all of the reduction actions associated with VEPO response level 1, 2, and/or 3, and one or more additional reduction actions. By way of example, VEPO response level 4 may include an additional reduction action corresponding to powering off all compute hosts in the customer's enclave except those that persist to be in a critical state and/or are deemed critical for recovery.

The number of response levels and/or particular reduction actions depicted in FIG. 8 are not intended to limit the scope of this disclosure. Any suitable number of response levels may be employed, each corresponding to any suitable number of reduction actions. Reduction actions may include or exclude hosts, instances, workloads, and/or customers based on any suitable attribute associated with the same. For example, based on priority, category, state, and/or based on a future recovery need. In some embodiments, the hosts, instances, workloads considered as candidates for applying these reduction actions may be based on a limited scope described in more detail with respect to FIG. 9.

Although the response levels depicted in FIG. 8 include some amount of overlapping reduction actions, this is not a necessary condition. In some embodiments, the reduction actions of each level may include a lesser or greater degree of overlap, including no overlap resulting in completely unique actions being associated with each level.

Figure 9:
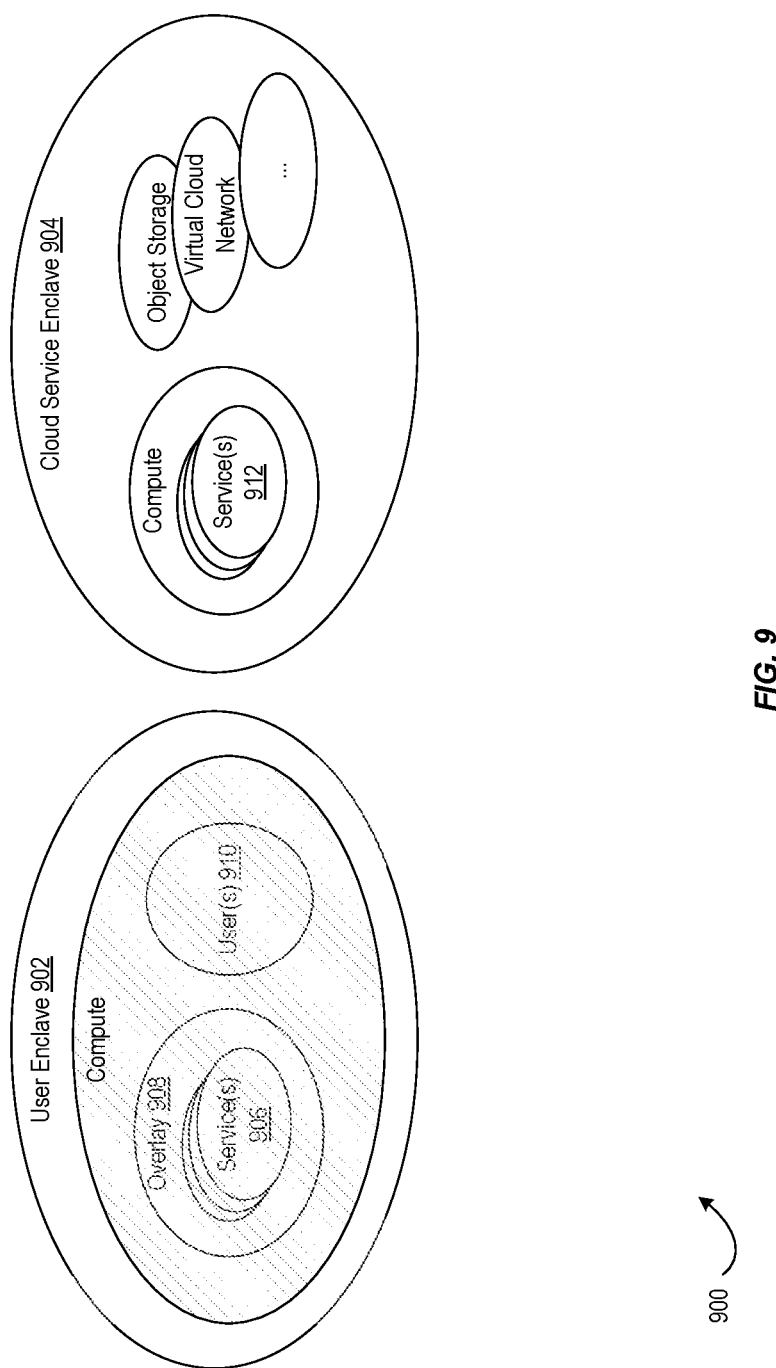
FIG. 9 is a diagram illustrating an example scope for components affected by one or more response levels utilized by the VEPO orchestration service for orchestrating power consumption constraints and/or power shut down tasks, in accordance with at least one embodiment.

FIG. 9 is a diagram 900 illustrating an example scope for components affected by one or more response levels utilized by the VEPO orchestration service (e.g., VEPO orchestration service 702 of FIG. 7) for orchestrating power consumption constraints, migration, pausing and/or power shut down tasks, in accordance with at least one embodiment. The diagram illustrates a user enclave 902 and a cloud service enclave 904. User enclave 902 may include compute instances running workloads corresponding to service(s) 906 (or any suitable workload), operating within a customer overlay (e.g., overlay 908). The instances and/or workloads corresponding to service(s) 906 may be associated user(s) 910.

In contrast, cloud service enclave 904 may include compute instances running workloads corresponding to service(s) 912 (e.g., control and/or data plane services such as those discussed in connection with the service tenancies of FIGS. 20-25) and/or resources such as object storage, virtual cloud networking, and the like.

In some embodiments, while host(s) 324 may host any suitable combination of instances and/or workloads corresponding to service(s) 906 associated with a user (e.g., a customer) and/or service(s) 912 and/or resources associated with the cloud provider, only hosts, instances, and/or workloads corresponding to the customer's enclave (e.g., compute resources) may be considered candidates for which a reduction action may be applied. In some embodiments, the application of a reduction action on a service and/or resource associated with the cloud provider may be avoided entirely (at least for a time) due to those services and/or resources being required for later recovery.

Returning now to FIG. 7, the functionality described in connection with power management service 402 may, in some embodiments, be executed by one or more virtual machines that are implemented in a hosted computing environment (e.g., on host(s) 324, corresponding to any suitable number of servers 104 of FIG. 1). The hosted computing environment may include one or more rapidly provisioned and released computing resources, which computing resources may include computing, networking and/or storage devices. A hosted computing environment may also be referred to as a cloud-computing environment. A number of example cloud-computing environments are provided and discussed below in more detail with respect to FIGS. 20-25.

VEPO orchestration service 702 may be configured to manage through associated functionality or functionality provided by other systems and/or services, power consumption corresponding to the hosts/instances/workloads of the physical environment. Managing power consumption values may include power capping, pausing a workload, instance, host, shutting down a workload/instance/host, migrating an instance from one host to another, migrating a workload from one instance and/or host to another instance and/or host, or the like.

The impact identification manager 706 may be configured to utilize the configuration data 712 (e.g., the table 800 of FIG. 8) corresponding to a specification of a number of response level(s) and their corresponding reduction actions to determine an estimated impact of applying the reduction actions of a given level to the hosts/instances/workloads (collectively, "resources") of the physical environment. The estimated impact of applying a given action and/or level may depend on the current conditions of the resources at run time. In some embodiments, identifying an estimated impact for a given reduction action may include identifying a set of resources and/or customers to which the action, if implemented, is applicable. An estimated impact is therefore intended to refer to a scope, or applicability of a given action or level. Identifying the scope and/or applicability of a given action or level may include identifying the particular resources and/or customers that would be affected by implementing the action or level and/or identifying any suitable attributes associated with the applicable resources and/or customers. As a simplistic example, the impact identification manager 706 may identify that X number of idle host of host(s) 324 would be affected should an action be taken to shut down all idle hosts, that those host(s) are associated with particular customers or a particular number of customers, and/or that the host(s) and/or customers are associated with other attributes such as a category (e.g., free tier), a priority (e.g., high priority), and the like. The reduction actions may provide incrementally more severe actions and/or incrementally more extensive impact. As an example of an increasingly sever action, a lower level may specify an action to power cap particular hosts associated with particular attributes, while a higher level may specify shutting down that host entirely. An example of increasingly extensive impacts may include a lower level that affects a small number of hosts (e.g., 2, 5, 10) corresponding to a single low-priority customer, while a higher level may affect a greater number of hosts (e.g., 100) corresponding to the same or greater number of customers, that are associated with a wider range of priority levels, etc. Thus, a more extensive impact refers to a number, scope, or range of applicability of a given action on hosts, instances, workloads, or customers.

The impact identification manager 706 may be configured to estimate an impact and/or an estimated power reduction that would likely be experienced for one or more of the levels based at least in part on the configuration data specifying the levels and corresponding actions and any suitable combination of the power data 310, account data 312, host/instance data, or the like. An estimated impact (e.g., what host(s), instance(s), workload(s), customer(s) would likely be affected, what attributes are associated with the affected host(s), instance(s), workload(s) and/or customers, how many host(s)/instance(s)/workload(s)/customer(s) are affected, etc.) can be identified for one or more response levels, one or more reduction actions corresponding to a given level, or the like. In some embodiments, the estimated impact of a given action may be aggregated with the estimated impacts for all actions of a given level to identify an estimated impact for the given level.

In some embodiments, the impact identification manager 706 may be utilized to estimate impact and/or estimate power reductions for every level. In some embodiments, determining an estimated power reduction may be an incremental process including identifying applicable resources (e.g., hosts, instances, and/or workloads), determining the applicable resources' current power consumption, estimating a reduction for each response should the action be effectuated/implemented, and aggregate individual estimated reductions of the individual response to identify an aggregate estimated power reduction corresponding to a given action. This process may be repeated for each action of a given level and the resultant estimated power consumption reductions for each action may be aggregated to determine an aggregate estimated power consumption reduction for a given level. The functionality of the impact identification manager 706 may be invoked by the enforcement manager 708.

In some embodiments, the functionality of the enforcement manager 708 may be invoked by the demand manager 710 based at least in part on monitoring or determining that a change to an aggregate power threshold is needed. Monitoring may include monitoring any suitable combination of the power data 310, the environment data 314, the host/instance data 316, and/or the operational data 318 of FIG. 3. Modifying the aggregate power threshold may be performed, and an amount by which the aggregate power threshold may be modified, may be determined based at least in part on a number of triggering events. These triggering events may include, but are not limited to: 1) receiving a request from a government entity (e.g., local power authority) requesting a power reduction indefinitely, or for a period of time, 2) determining a current and/or predicted environment condition (e.g., a current ambient or external temperature, a predicted ambient or external temperature), 3) determining a current or predicted aggregate power consumption corresponding to the devices of the physical environment, 4) determining a current and/or predicted operational status of one or more temperature control units of the physical environment. The amount by which the aggregate power threshold may be or is to be modified, may be determined based at least in part on a number of factors, including, but not limited to: a difference between an ambient temperature and an external temperature, an amount of power consumption attributed to or associated with a particular component (e.g., a particular temperature control unit), an amount or percentage specified in a request received from a government entity, or a difference between a current or predicted aggregate power consumption value and a current or predicted aggregate power threshold.

In some embodiments, upon determining a change amount in the aggregate power threshold, the demand manager 710 may invoke the functionality of enforcement manager 708 to determine what response level is appropriate for the given change. As a non-limiting example, enforcement manager 708 may incrementally invoke functionality of the impact identification manager 706 (e.g., via function call or otherwise) to determine an estimated impact and/or estimated power reduction corresponding to a given level (e.g., VEPO response level 1 of FIG. 8). The resultant estimated impact and/or estimated power reduction calculated by impact identification manager may be returned to enforcement manager 708. In some embodiments, enforcement manager 708 may obtain and/or implement a predefined scheme to determine the suitability of selecting one response level over another. By way of example, environment manager 708 may be configured to compare the estimated power reduction of a given level to the current aggregate power threshold identified by demand manager 710 to determine if the estimated power consumption of the given level (e.g., VEPO response level 1) is sufficient (e.g., exceeds the change needed to drop a current aggregate power consumption (e.g., identified and provided by power management service 402) to a value that is below the aggregate power threshold identified by demand manager 710). If sufficient, in some embodiments, the enforcement manager 708 may assess the estimated impact according to predefined scheme to determine whether the estimated impact is sufficient and/or acceptable. As a non-limiting example, even when the estimated power reduction is sufficient to drop the current aggregate power consumption below the current aggregate power threshold, the response level may be rejected by the enforcement manager 708 if the estimated impact exceeds conditions of the predefined scheme (e.g., the number of affected hosts exceeds a threshold value identified in the predefined scheme). If either the estimated power consumption and/or estimated impact of the response level fails to pass requirement/conditions of the predefined scheme, the enforcement manager 708 may be configured to invoke the impact identification manager 706 to determine an estimated impact and/or estimated power reduction corresponding to a higher VEPO response level (e.g., VEPO response level 2).

The estimation of impact and/or power reduction may be invoked by the enforcement manager 708, and determined by the impact identification manager 706, one level at a time, until the enforcement manager 708 finds a first level that satisfies the requirements/conditions of the predefined scheme with respect to the estimated impact and/or the estimated power reduction. A level that is determined to be a lowest level (e.g., one that occurs higher up in the table 800) for which all impact conditions of the predefined scheme are met may be referred to as a "least impactful resource level." A level that is determined to be a lowest level (e.g., one that occurs higher up in the table 800) for which all power reduction conditions of the predefined scheme and/or conforms to (e.g., falls below) a current aggregate power threshold may be referred to as a "least reducing resource level." A level that is determined to be the lowest level of the response levels for which all conditions regarding estimated impact and estimated power reductions are met may be referred to as a "first sufficient response level." The enforcement manager 708 may be configured to select a response level that is the first identified as being the least impactful, the least reducing, or the first sufficient depending on the predefined scheme.

In some embodiments, the enforcement manager 708 may cause the estimated impact and/or estimated power reduction for every level (or some subset such as the first five, next five, etc.) to be determined by the impact identification manager 706. The enforcement manager 708 may be configured to select a particular response level based at least in part on comparing the estimated impacts and/or estimated power reductions of each level to determine one that is least impactful (e.g., has a comparatively smallest impact), least reducing (e.g., results in the smallest amount of power reduction sufficient to drop current aggregate power consumption below the current aggregate power threshold), or one that is least reducing as well as being least impactful (e.g., based at least in part on a weighting algorithm).

The estimated impacts and/or estimated reductions calculated by the impact identification manager 706 (potentially though invoking the functionality of the computer service 306 and/or the power management service 304 of FIG. 3), and/or any suitable data such as current and/or predicted values relied on for those estimates may be presented via interface 11 discussed in more detail below.

As discussed herein, any suitable determinations and/or identifications of the demand manager 710, the impact identification manager 706, and/or the enforcement manager 708 (or any suitable service or subroutine invoked by the same) may rely on current data, historical data, and/or predicted data. As a non-limiting example, the demand manager 710 may determine a change is needed and/or an amount by which a current aggregate power threshold is to be modified based on current operational status of the temperature control unit(s) 112 of FIG. 1, or a predicted operational status of those units during a future period of time. This predicted status may be identified based at least in part on historical data (e.g., indicating one or more partial or complete failures or shutdowns of that temperature control unit) and/or based on output provided by a machine-learning model (e.g., a model trained in the manner described in connection with FIG. 12). In some embodiments, the amount of change determined by the demand manager 710 for the aggregate power threshold may be based on predefined formulas and/or tables. For example, a formula and/or table may be available from which a capability associated with the temperature control unit may be determined and/or calculated. A table, if used, may indicate an amount of power consumption attributable to or associated with the temperature control unit. Thus, a failure (e.g., a partial and/or complete) failure of that temperature control unit may be associated with the whole, or some proportional share, of the power consumption attributable to or associated with the temperature control unit (e.g., an amount of power consumption in the form of heat for which the temperature control unit is configured to handle). The demand manger 710 may therefore determine that a total failure of that temperature control unit requires a reduction in the aggregate power threshold by an amount equal to that of the total power consumption attributable to or associated with the temperature control unit as specified by the table.

In some embodiments, the enforcement manager 708 may be configured to present, recommend, or select automatically a given response level from the set of possible response levels based at least in part on any suitable combination of the estimated impact and/or estimated power reduction that would likely be experienced if the reduction actions corresponding to a given level were implemented (e.g., effectuated). Thus, in some embodiments, a particular level may be recommended and/or selected by the VEPO orchestration service 702 based on any suitable combination of: 1) determining a level that, if implemented, would likely lead to a sufficient, but not overly excessive reduction in power consumption at the resources of the physical environment (e.g., a least amount of power consumption reduction that is sufficient to drop the current power consumption values under the current aggregate power threshold), 2) determining a level that includes the set of least sever actions, or 3) determining a least impactful level or action (e.g., a fewest number of likely affected resources/customers, a set of affected resources and/or customers that have the priorities or categories that indicate the least collective degree of importance, etc.). Determining a least sever level or action, or a least impactful level or action may be determined regardless of the estimated power consumption reduction likely to be experienced through implementing the level and/or action, or determining the least severe level/action and/or least impactful level/action may be determined from one or more level(s) that, if implemented given current conditions, are estimated to cause a sufficient reduction in power consumption to drop power consumption values to an aggregated value that falls under the current aggregate power threshold. In some embodiments, the enforcement manger 708 may cause any suitable data corresponding to current, predicted, or estimated power consumption and/or impact to be presented at the interface of FIG. 11. In some embodiments, selection of the particular level to be effectuated may be driven by user input provided at the user interface. Thus, in some embodiments, enforcement manager 708 may refrain from executing operations for effectuating the reduction actions of a level until the user identifies and/or confirms the level to be effectuated via user input provided at the user interface.

In some embodiments, performing these operations may include instructing the power management service 402 and/or the computer service 306 to perform operations. By way of example, the enforcement manager 708 may provide identifiers for the impacted resources (e.g., hosts, instances, workloads, etc.) and the estimated power reduction and/or the reduction action data specifying the action to be taken to the power management service 402 (e.g., power cap specific resources, power cap all low-priority hosts/instances/workloads, power cap specific or all resources conforming to a specific set of attributes by a specific amount (e.g., 10%, by at least x amount, etc.). Which, as described above, may be configured to enact/effectuate the corresponding power caps as instructed by the enforcement manager 708. Similarly, the compute service 306 may be provided identifiers for the impacted resources (e.g., hosts, instances, workloads, etc.) and the reduction action data specifying the action to be taken by the compute service 306 (e.g., shutdown all idle hosts, shut down these specific hosts, pause all low-priority workloads, migrate and/or condense all low-priority workloads to maximize the number of idle/vacant hosts, etc.). Which, as described above, may be configured to enact/effectuate the corresponding power caps as instructed by the enforcement manager 708.

The demand manager 710 may be further configured to identify a previous trigger resulting in a response level being implemented is no longer occurring and may modify the aggregate power threshold based on identifying the triggering condition is no longer occurring. For example, the demand manager 710 (e.g., via monitoring the operational data 318) may identify that a temperature control unit that has previously failed is not operational again. As a result, the demand manager 710 may modify (e.g., increase) the aggregate power threshold by an amount that was attributed to the temperature control unit when fully operational. According to this change, the enforcement manager 706 may be configured to perform any suitable operations to reverse, to the degree possible, the reduction actions previously take according to whichever response level was selected in response to the original triggering condition. If power caps were utilized, the enforcement manager 706 may instruct power management service 402 to remove those previously applied power caps. If migration of workloads and/or instances were performed, the enforcement manager 706 may instruct compute service 306 to attempt to migrate those resources back to the original host and/or instance that hosted the instance and/or workload respectively. If resources were paused and/or shutoff, the enforcement manager 706 may instruct the compute service 306 to execute operations to cause the instance and/or workload to resume and/or to send a signal to the powered down host to power up. In this manner, the enforcement manager 706 may perform any suitable operations to recover from reduction actions taken based on previous selection of a given response level.

Figure 10:
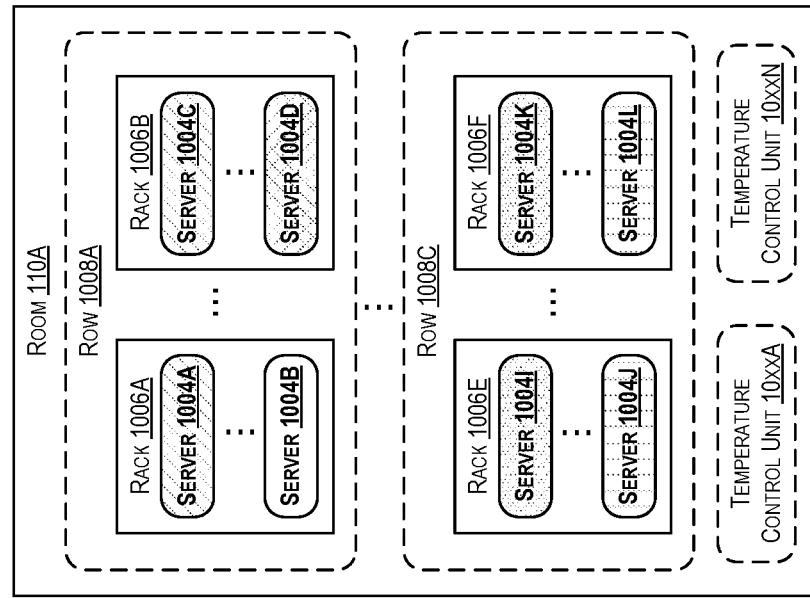
FIG. 10 is a block diagram illustrating an example use case in which a number of response levels are applied based on current conditions of a set of hosts, in accordance with at least one embodiment.

FIG. 10 is a block diagram illustrating an example use case in which a number of response levels are applied based on current conditions of a set of hosts, in accordance with at least one embodiment. The example provided in FIG. 10 presupposes that the VEPO response levels and corresponding actions discussed in connection with FIG. 8 are the current configuration data utilized by the VEPO orchestration service 702 of FIG. 7. As depicted, the following conditions are assumed:

Server 1004A and Server 1004C are vacant.
Server 1004D is hosting a resource (e.g., instance) associated with a customer of category level 1.
Server 10041 is hosting a BM instance associated with a customer associated with priority level 2.
Server 1004J is hosting a BM of a customer associated with priority level 3.
Server 1004K is hosting a VM of a customer associated with priority level 1.
Server 1004B is hosting one or more instances deemed critical for recovery. In some embodiments, these instances may be associated with the service(s) 912 provided by the cloud provider.

As described above, the VEPO orchestration service 702 may identify estimated impacts and/or estimated power reductions corresponding to each response level, incrementally, or in parallel. The VEPO orchestration service 702 may (e.g., through functionality provided by the power management service 304 and/or the compute service 306) identify the response applicable to a given level (e.g., to the reduction actions corresponding to a given response level). By way of example, in the ongoing example, the VEPO orchestration service 702 (through the power management service 304) may identify that VEPO response level 1 may be estimated to impact 2 servers, servers 1004A and Server 1004C, based on identifying (e.g., from non-cloud-provider based resources such as those associated with a user enclave such as user enclave 902) that servers 1004A and 1004C are the set of resources to which the redundant action of VEPO response level 1 applies. In some embodiments, the VEPO orchestration service 702 (e.g., the impact identification manager 706) may determine an amount of degree by which the estimated power reduction for a given level would affect, if enacted/effectuated, the aggregate power consumption of the resources of the physical environment (e.g., 10% reduction with no customer impact. Free BM capacity reduced to 0%, free CM capacity severely curtailed, etc.). Any suitable portion of this information may be presented at user interface 1100 with or without presentation of similar data associated with the other VEPO response levels.

The VEPO orchestration service 702 (through the power management service 304) may identify that VEPO response level 2 may be estimated to impact the servers 1004A and Server 1004C based on including the reduction action of VEPO response level 1, in addition to identifying (e.g., from non-cloud-provider based resources such as those associated with a user enclave such as user enclave 902) that server 1004D is hosting a resource to which a redundant action of VEPO response level 3 applies. In some embodiments, the VEPO orchestration service 702 (e.g., the impact identification manager 706) may determine an amount of degree by which the estimated power reduction for VEPO response level 2 would affect, if enacted/effectuated, the aggregate power consumption of the resources of the physical environment (e.g., 20% reduction with minimal customer impact. Up to 400 low priority VMs impacted, etc.). Any suitable portion of this information may be presented at user interface 1100 with or without presentation of similar data associated with the other VEPO response levels.

The VEPO orchestration service 702 (through the power management service 304) may identify that VEPO response level 3 may be estimated to impact the servers 1004A, 1004C, and 1004D based on including the reduction action of VEPO response levels 1 and 2, in addition to identifying (e.g., from non-cloud-provider based resources such as those associated with a user enclave such as user enclave 902) that the BM hosted by server 10041 and the VM hosted by server 1004J are resources to which the redundant action of VEPO response level 3 applies. Server 1004K and/or the resource hosted by server 1004K may be excluded based on meeting an exclusion associated with the response level being evaluated. In some embodiments, the VEPO orchestration service 702 (e.g., the impact identification manager 706) may determine an amount of degree by which the estimated power reduction for VEPO response level 3 would affect, if enacted/effectuated, the aggregate power consumption of the resources of the physical environment (e.g., 40% reduction with moderate impact. Up to 200 category 1 or 2 BMs/VMs impacted, etc.). Any suitable portion of this information may be presented at user interface 1100 with or without presentation of similar data associated with the other VEPO response levels.

The VEPO orchestration service 702 (through the power management service 304) may identify that VEPO response 4 may be estimated to impact all servers excluding server 1004B (e.g., the set of servers including servers 1004A and 1004C-L) based on including the reduction action of VEPO response levels 1-3, in addition to identifying (e.g., from non-cloud-provider based resources such as those associated with a user enclave such as user enclave 902) that the BM hosted by server 10041 and the VM hosted by server 1004J are resources to which the redundant action of VEPO response level 4 applies. In some embodiments, the VEPO orchestration service 702 (e.g., the impact identification manager 706) may determine an amount of degree by which the estimated power reduction for VEPO response level 4 would affect, if enacted/effectuated, the aggregate power consumption of the resources of the physical environment (e.g., 80% reduction with severe impact, region down, etc.). Any suitable portion of this information may be presented at user interface 1100 with or without presentation of similar data associated with the other VEPO response levels.

Figure 11:
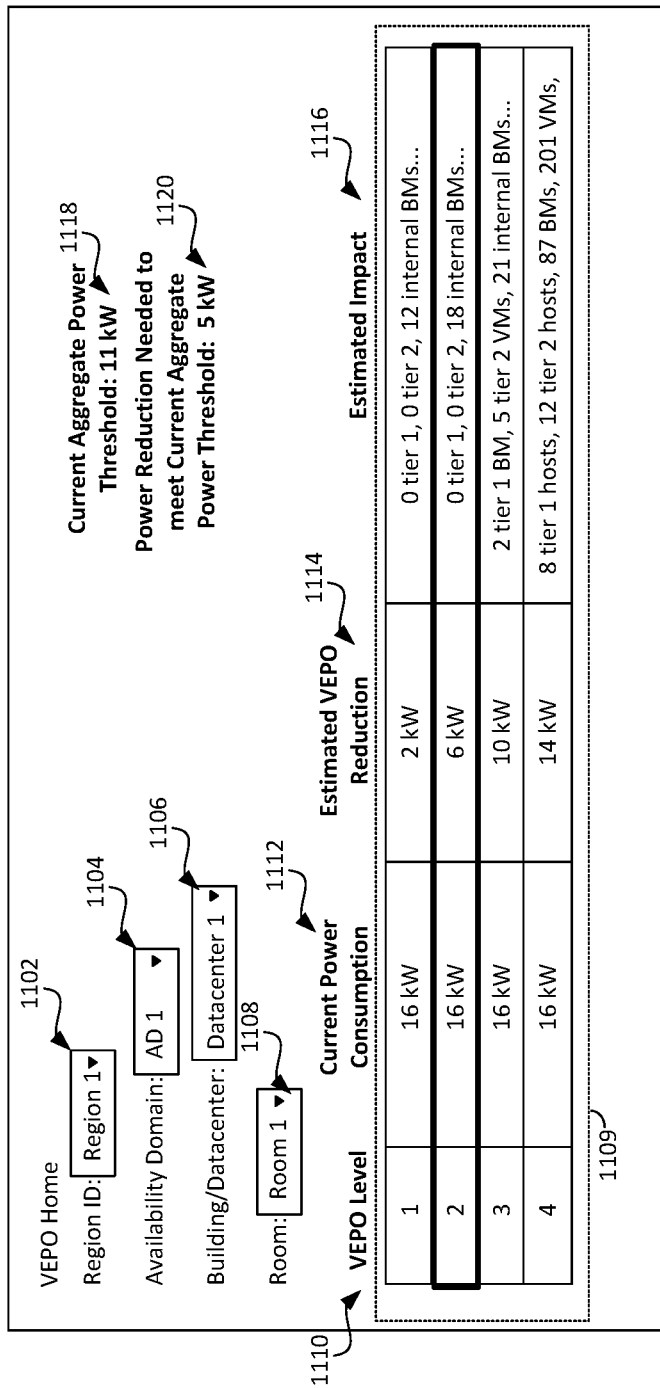
FIG. 11 is a schematic of an example user interface, in accordance with at least one embodiment.

FIG. 11 is a schematic of an example user interface 1100, in accordance with at least one embodiment. User interface 1100 may include any suitable number and type of graphical interface elements (e.g., drop down boxes 1102-1108) to select and/or view VEPO data corresponding to a given region, availability domain (AD), building, and/or room, respectively. Other interface elements such as radio buttons and/or edit boxes may be employed. The VEPO data presented at user interface 1100 may correspond to the region, AD, building, and room selected via the graphical interface elements 1102-1108 (also referred to as "options" 1102-1108). As depicted, the VEPO data 1109 is displayed according to the values selected via options 1102-1108.

As discussed above any suitable information utilized by the VEPO orchestration service 702, the power management service 304, and/or the compute service 306 may be presented via user interface 1100. As a non-limiting example, any suitable combination of the power data 310, the account data 312, the environment data 314, the host/instance data 316, and/or the operational data 318 may be presented in user interface 1100.

The particular content of the VEPO data 1109 displayed at user interface 1100 may vary, but as depicted the VEPO data 1109 includes VEPO level data (e.g., the identifiers corresponding to the VEPO response levels of FIG. 8, presented in column 1110), current power consumption values (e.g., the current power consumption values presented in column 1112), estimated reductions associated with each VEPO level (e.g., the estimated VEPO reductions presented in column 1114), and estimated impacts associated with each VEPO level (e.g., the estimated VEPO impacts presented in column 1116).

A current aggregate power threshold may be displayed at 1118 (e.g., a current aggregate power threshold determined by demand engine 710 of FIG. 7). A current power reduction needed to meet the current aggregate power threshold may be presented at 1120. This value (e.g., indicating a 5 kW reduction is needed) may be calculated (e.g., by the demand engine 710) based at least in part on a identifying a difference between the current aggregate power threshold (e.g., 11 kW) and the current power consumption presented at 1112 (e.g., 16 kW).

The user interface 1100 may be configured to present estimated impact data corresponding to each of the VEPO response levels ("VEPO levels," for brevity) within column 1116. In some embodiments, the area corresponding a row of column 1116 may be selectable to present an expanded view of the estimated impact data corresponding to a particular VEPO level. Similarly, the area corresponding to a row of column 1114 may be selectable to present an expanded view of the estimated VEPO reduction corresponding to a particular VEPO level.

User interface 1100 may include an indicator 1122 that indicates a recommended VEPO response level (as depicted, VEPO level 2 is recommended by the system). As discussed above, the recommended VEPO level may be identified by the power orchestration service 702 based on the factors described above. In some embodiments, the recommended VEPO level (e.g., VEPO level 2) may be chosen based on identifying that VEPO level 2 is associated with a smallest amount of estimated VEPO reduction which satisfies the reduction needed as indicated at 1120. In some embodiments, the VEPO level 2 may additionally or alternatively be recommended based at least in part on identifying that the estimated impact of applying VEPO level 2 provides the minimum impact with respect to the estimated impacts of VEPO levels 104.

In some embodiments, the area corresponding to each row of VEPO data 1109 may be selectable to select a given VEPO response level. Once selected, the user may be provided an additional menu or option for instructing the system to proceed with the selected VEPO response according to the reduction actions associated with that level.

Figure 12:
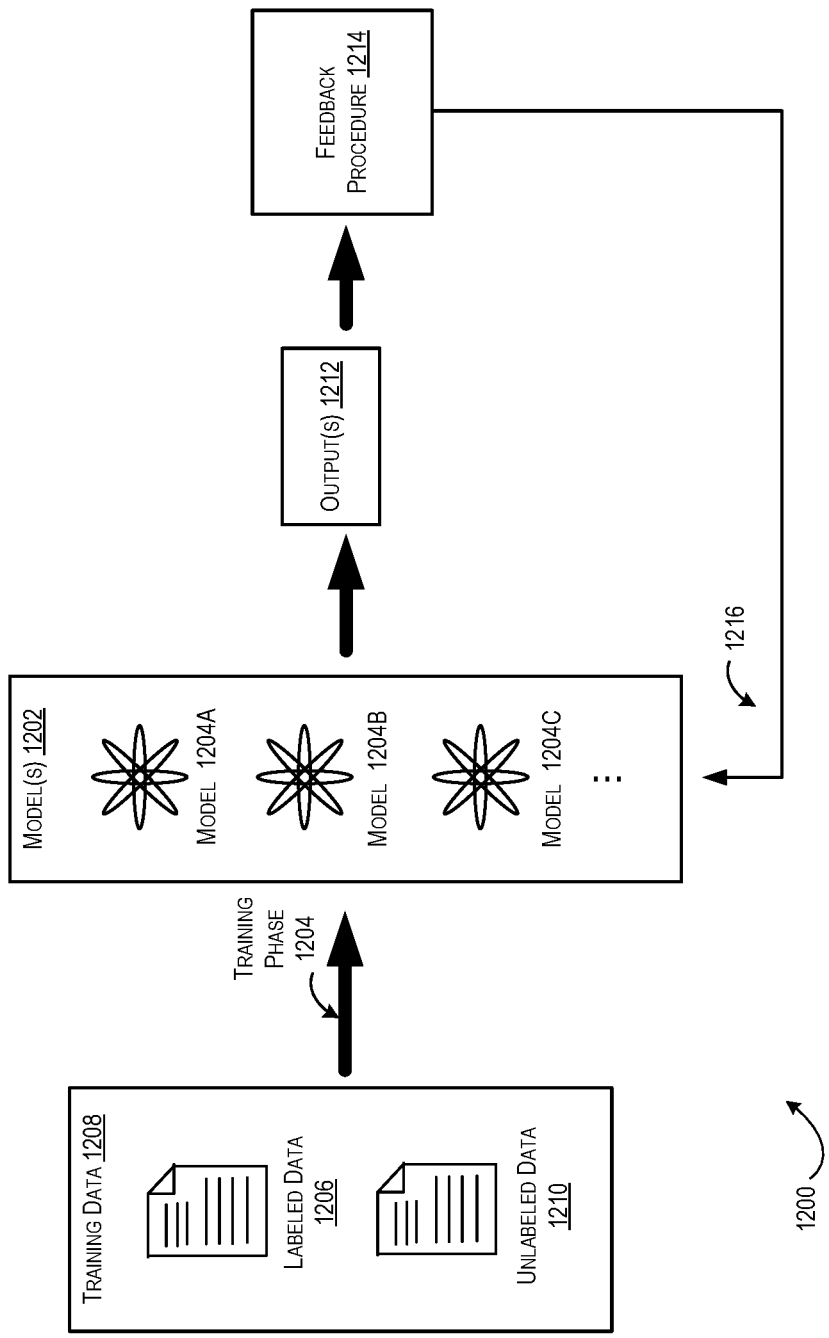
FIG. 12 illustrates a flow depicting an example method for training one or more machine-learning models, in accordance with at least one embodiment.

FIG. 12 illustrates a flow depicting an example method 1200 for training one or more machine-learning models, in accordance with at least one embodiment. In some embodiments, the model(s) 1202 may be trained (e.g., by power management service 304 of FIG. 3, the power orchestration service 302 of FIG. 3, the compute service 306 of FIG. 3, or a different device or system) using any suitable machine-learning algorithms (e.g., supervised, unsupervised, etc.) and any suitable number of training data sets (e.g., training data 1208). A supervised machine-learning algorithm refers to a machine learning task that includes learning an inferred function that maps an input to an output based on a labeled training data set for which example input/output pairs are known. Unsupervised machine-learning algorithms refer to a set of algorithms that are used to analyze and cluster unlabeled data sets (e.g., unlabeled data 1210). These algorithms are configured to identify patterns or data groupings without the need for human intervention. In some embodiments, any suitable number of model(s) 1202 may be trained during training phase 1204.

At least one model of model(s) may be trained to identify a likelihood or confidence that aggregate power consumption of downstream devices (e.g., host(s) 324 of FIG. 3) will exceed a budget threshold corresponding to an upstream device (e.g., a row-level device such as row PDU 204 of FIG. 2) through which power is distributed to host(s) 324 and/or any suitable combination of server(s) 104), in accordance with at least one embodiment. The training data 1208 for training one or more of model(s) 1202 may include any suitable combination of individual and/or aggregate power consumption values (current or historical) of power data 310 corresponding to one or more hosts (e.g., host(s) 324 of FIG. 3, for the server(s) 104 of FIG. 1, etc.). In some embodiments, the training data 1208 for training these particular model(s) 1202 may include any suitable combination of power data 310, account data 312, environment data 314, host/instance data 316, and/or operational data 318. In some embodiments, the model(s) may be trained to identify a predicted amount corresponding to the aggregate power consumption of any suitable combination of host(s) 324 and/or server(s) 104. In some embodiments, the training data 1208 may include current or historic power caps applied to respective hosts and the output provided by such model(s) 1208 may identify predicted power cap values for any suitable combination of host(s) 324 and/or server(s) 104.

At least one model of model(s) may be trained to identify predicted workloads for the host(s) 324 and/or any suitable combination of server(s) 104, in accordance with at least one embodiment. The training data 1208 for training one or more of model(s) 1202 to identify predicted workloads may include any suitable combination of current and/or historic data of host/instance data 316 corresponding to one or more hosts (e.g., host(s) 324 of FIG. 3, for the server(s) 104 of FIG. 1, etc.). In some embodiments, the training data 1208 for training these particular model(s) 1202 may include any suitable combination of power data 310, account data 312, environment data 314, host/instance data 316, and/or operational data 318. In some embodiments, the model(s) may be trained to identify a likelihood or confidence that a predicted set of workloads will be assigned to any suitable combination of host(s) 324 and/or server(s) 104.

At least one model of model(s) may be trained to identify predicted partial or complete failures of one or more temperature control units, in accordance with at least one embodiment. The training data 1208 for training one or more of model(s) 1202 to identify such failures may include any suitable combination of current and/or historic data of environment data 314 and/or operational data 318 corresponding to the physical location in which the host(s) 324 and/or server(s) 104 are located, current and/or historic external temperatures occurring currently or in the past with respect to an area outside of the physical environment (e.g., in the geographical area in which the physical environment is located), current and/or historic ambient locations associated with the physical location, weather forecasts corresponding to a future time period, and current and/or historic failures experienced by one or more temperature control units (e.g., the temperature control system(s) 112 of FIG. 1). In some embodiments, the training data 1208 for training these particular model(s) 1202 may include any suitable combination of power data 310, account data 312, environment data 314, host/instance data 316, and/or operational data 318. In some embodiments, the model(s) may be trained to identify a likelihood or confidence that a particular failure (partial or complete) of temperature control system(s) 112 will occur during a future time period. In some embodiments, the model(s) may be trained to identify a degree of failure for the temperature control system(s) 112 (e.g., 80% failure, 100% failure, etc.).

At least one model of model(s) may be trained to provide an estimated aggregate power reduction needed due to a partial and/or complete failure of one or more temperature control units (e.g., the temperature control system(s) 112), in accordance with at least one embodiment. The training data 1208 for training one or more of model(s) 1202 to identify estimated aggregate power reduction needed may include any suitable combination of current and/or historic data of environment data 314 and/or operational data 318 corresponding to the physical location in which the host(s) 324 and/or server(s) 104 are located, current and/or historic external temperatures occurring currently or in the past with respect to an area outside of the physical environment (e.g., in the geographical area in which the physical environment is located), current and/or historic ambient locations associated with the physical location, weather forecasts corresponding to a future time period, current and/or historic failures experienced by one or more temperature control units (e.g., the temperature control system(s) 112 of FIG. 1), current and/or historic aggregate power thresholds, and/or current and/or historic power consumption levels of the host(s) 324 and/or any suitable combination of the server(s) 104. In some embodiments, the training data 1208 for training these particular model(s) 1202 may include any suitable combination of power data 310, account data 312, environment data 314, host/instance data 316, and/or operational data 318. In some embodiments, the model(s) may be trained to identify a likelihood or confidence that the estimated aggregate power reduction will be needed during a future time period.

At least one model of model(s) may be trained to predict a future temperature (e.g., ambient and/or external), in accordance with at least one embodiment. The training data 1208 for training one or more of model(s) 1202 to identify the future temperature may include any suitable combination of current and/or historic data of environment data 314 and/or operational data 318 corresponding to the physical location in which the host(s) 324 and/or server(s) 104 are located, current and/or historic external temperatures occurring currently or in the past with respect to an area outside of the physical environment (e.g., in the geographical area in which the physical environment is located), current and/or historic ambient locations associated with the physical location, weather forecasts corresponding to a future time period, current and/or historic failures experienced by one or more temperature control units (e.g., the temperature control system(s) 112 of FIG. 1), current and/or historic aggregate power thresholds, and/or current and/or historic power consumption levels of the host(s) 324 and/or any suitable combination of the server(s) 104. In some embodiments, the training data 1208 for training these particular model(s) 1202 may include any suitable combination of power data 310, account data 312, environment data 314, host/instance data 316, and/or operational data 318. In some embodiments, the model(s) may be trained to identify a likelihood or confidence that the predicted temperature will be experienced during the future time period.

In general, the model(s) 1202 may include any suitable number of models. The model(s) 1202 may be individually trained to identify, from the training data 1208 discussed above, a likelihood or confidence or accuracy of the output provided by model(s) 1202. In some embodiments, the model(s) 1202 may be configured to determine a value corresponding to the examples provided above, and the likelihood and/or confidence value may indicate a likelihood or degree of confidence that the output provided by the model(s) is accurate.

In general, the model(s) 1202 can be trained during training phase 1204 using a supervised learning algorithm and labeled data 1206 to identify outputs described in the examples above. A likelihood value may be a binary indicator, a percentage, a confidence value or the like that indicates a degree of likelihood. The likelihood value can be a binary indicator that indicates a particular budget amount is likely or unlikely to be breached, or the likelihood value can indicate a likelihood and/or confidence that the predicted output will be experienced in the future. Labeled data 1206 may be any suitable portion of potential training data (e.g., training data 1208) that can be used to train model(s) to produce the output described above. Labeled data 1206 may include any suitable number of examples of current and/or historical data corresponding any suitable number of devices of the physical environment (e.g., datacenter 102, server(s) 104, temperature control system(s) 112, PDUs of FIG. 2, etc.). In some embodiments, labeled data 1206 may include labels that identify known likelihood and/or actual values. Using the labeled data 1206, a model (e.g., an inferred function) may be learned that maps an input (e.g., one or more instances of training data) to an output (e.g., a predicted value or likelihood/confidence value that the predicted value or output will occur in a future time period). In some embodiments, any suitable combination of the VEPO orchestration service 302, power management service 304, and/or the compute service 306 of FIG. 3, or a separate service or system may train any suitable combination of the model(s) 1202. In some embodiments, any suitable combination of the VEPO orchestration service 302, power management service 304, and/or the compute service 306 may obtained pretrained versions of the model(s) 1202.

The model(s) 1202, and the various type of those models discussed above, may include any suitable number of models that are trained using unsupervised learning techniques to identify the likelihood/confidence and/or a predicted amount corresponding to the examples provided above. Unsupervised machine-learning algorithms are configured to learn patterns from untagged data. In some embodiments, the training phase 1204 may utilize unsupervised machine-learning algorithms to generate one or more of the model(s) 1202. For example, the training data 1208 may include unlabeled data 1210 (e.g., any suitable combination of current and/or historic values corresponding to power data 310, account data 12, environment data 314, host/instance data 316, operational data 318, etc.). Unlabeled data 1210 may be utilized, together with an unsupervised learning algorithm to segment the entries of unlabeled data 1210 into groups. The unsupervised learning algorithm may be configured to cause similar entries to be grouped together in a common group. An example of an unsupervised learning algorithm may include clustering methods such as k-means clustering, DBScan, and the like. In some embodiments, the unlabeled data 1210 may be clustered with the labeled data 1206 such that unlabeled instances of a given group may be assigned the same labeled as other labeled instances within the group.

In some embodiments, any suitable portion of the training data 1208 may be utilized during the training phase 1204 to train the model(s) 1202. For example, 70% of labeled data 1206 and/or unlabeled data 1210 may be utilized to train the model(s) 1202. Once trained, or at any suitable time, the model(s) 1202 may be evaluated to assess their quality (e.g., the accuracy of output(s) 1212 with respect to the labels corresponding to labeled data 1206). By way of example, a portion of the examples of labeled data 1206 and/or unlabeled data 1210 may be utilized as input to the model(s) 1202 in order to generate output(s) 1212. By way of an example, an example of the labeled data 1206 may be provided as input, and the corresponding output (e.g., output(s) 1212) may be compared to the label already known to be associated with the example. If some portion of the output (e.g., a label) matches the example label, that portion of the output may be deemed accurate. Any suitable number of labeled examples may be utilized, and a number of accurate labels may be compared to the total number of examples provided (and/or the total number of labels previously identified) to determine an accuracy value for a given model that quantifies a degree of accuracy for the model. For example, if 90 out of 100 of the input examples generate output labels that match the previously known example labels, the model being assessed may be determined to be 90% accurate.

In some embodiments, as the model(s) 1202 are utilized for subsequent inputs, the subsequent output generated by the model(s) 1202 may be added to corresponding input and used to retrain and/or update the model(s) 1202 at 1216. In some embodiments, the example may not be used to retrain or update the model until feedback procedure 1214 is executed. In feedback procedure 1214 the example (e.g., an example including one or more historical consumption data instances corresponding to one or more devices and/or racks) and the corresponding output generated for the example by one of the model(s) 1202 is presented to a user and the user identifies whether the output generated (e.g., amount and/or likelihood confidence value) is correct for the given example.

The training process depicted in FIG. 12 (e.g., method 1200) may be performed any suitable number of times at any suitable interval and/or according to any suitable schedule such that the accuracy of the model(s) 1202 are improved over time.

In some embodiments, any suitable number and/or combination of the model(s) 1202 may be used to determine output. In some embodiments, the power management service 402 may utilize any suitable combination of output provided by the model(s) 1202 to determine whether a budget threshold of a given component (e.g., a row-level PDU) is likely to be breached (and/or is likely to be breached by some amount). Thus, in some embodiment, models that have trained with any suitable combination of supervised and unsupervised learning algorithms may be utilized by the power management service 402.

Figure 13:
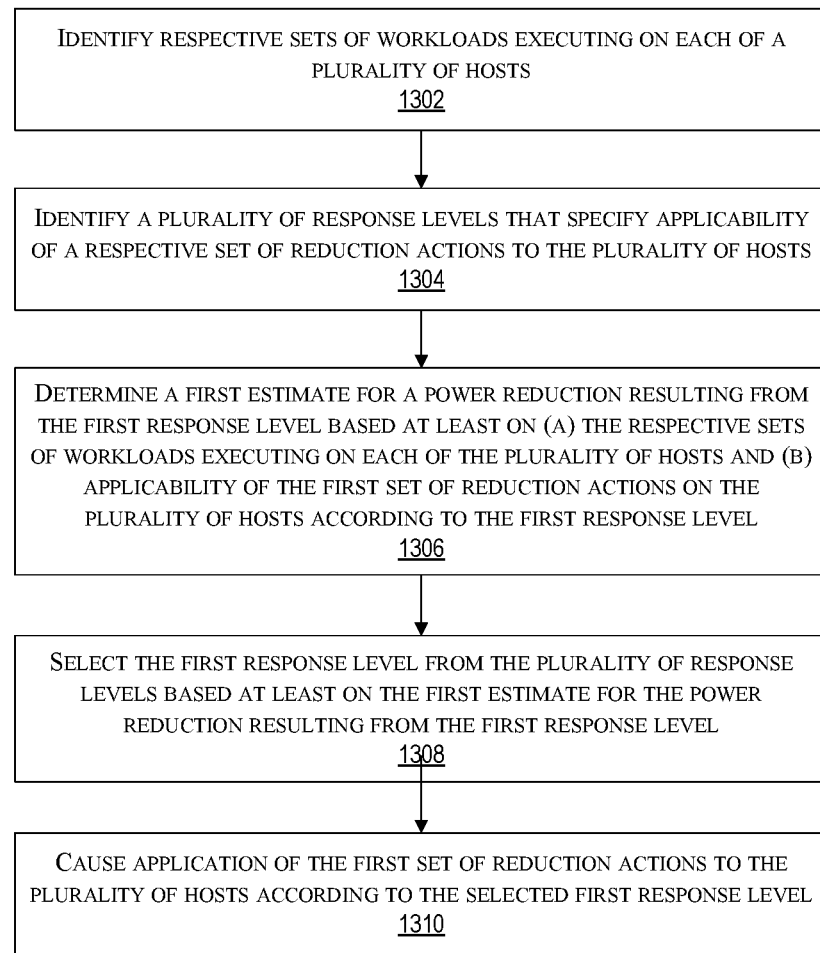
FIG. 13 is a block diagram illustrating an example method for implementing a response level from a plurality of response levels based at least in part on an estimated power reduction, in accordance with at least one embodiment.

FIG. 13 is a block diagram illustrating an example method 1300 for implementing a response level from a plurality of response levels based at least in part on an estimated power reduction, in accordance with at least one embodiment. Method 1300 may be performed by one or more components of power orchestration system 300 of FIG. 3 or subcomponents thereof discussed in connection with FIGS. 4 and 7. By way of example. The method 1300 may be performed, at least in part, any suitable combination of the VEPO orchestration service 302, the power management service 304, and/or the compute service 306 of FIG. 3. The operations of method 1300 may be performed in any suitable order. More or few operations than those depicted in FIG. 13 may be included in method 1300.

The method 1300 may begin at 1302, where respective sets of workloads executing on each of a plurality of hosts may be identified (e.g., by impact identification manager 706 of FIG. 7). In some embodiments, the respective sets of workloads executing on each of the plurality of hosts may be identified based at least in part on host/instance data 316 of FIG. 3.

At 1304, a plurality of response levels that specify applicability of a respective set of reduction actions to a plurality of hosts may be identified (e.g., by the impact identification manager 706 of FIG. 7). In some embodiments, the plurality of response levels may be identified from configuration data (e.g., configuration data 712 of FIG. 7). In some embodiments, the plurality of response levels (e.g., VEPO response levels of FIG. 8) specify applicability of a respective set of reduction actions to a plurality of hosts (e.g., via one or more reduction actions corresponding to each response level). In some embodiments, a first response level of the plurality of response levels specifies applicability of a first set of reduction actions to the plurality of hosts (e.g., based at least in part on the one or more reduction actions associated with that response level). By way of example, VEPO response level of FIG. 8 may specify that all vacant/idle hosts and hypervisors that can be evacuated completely are applicable to an action (e.g., powering off). Thus, the reduction action indicates a subset of resources (e.g., vacant/idle hosts and hypervisors that can be evacuated completely) are applicable to a given reduction action (e.g., powering off), and through association, the corresponding response level.

At 1306, a first estimate for a power reduction resulting from the first response level may be determined (e.g., by the impact identification manager 706). In some embodiments, the first estimate may be determined based at least on (a) the respective sets of workloads executing on each of the plurality of hosts and (b) applicability of the first set of reduction actions on the plurality of hosts according to the first response level.

At 1308, the first response level may be selected (e.g., by the enforcement manager 708 of FIG. 7) from the plurality of response levels based at least on the first estimate for the power reduction resulting from the first response level. In some embodiments, the enforcement manager 708 may select the first response level based at least in part on identifying that the respective set of reduction actions to the plurality of hosts of the first response level is sufficient to reduce power consumption levels of the plurality of hosts to a value that falls below an aggregate power threshold (e.g., an aggregate power threshold determined by demand manager 710 of FIG. 7). In some embodiments, a corresponding estimate for each of the response levels (e.g., VEPO response levels of FIG. 8) may be identified (e.g., by the impact identification manager 706) and the first response level may be selected based at least in part on being least impactful (e.g., impacting fewer workloads, hosts, customers, or any suitable combination of the above) while being sufficient to reduce power consumption levels of the plurality of hosts to a value that falls below the aggregate power threshold.

At 1310, application of the first set of reduction actions to the plurality of hosts according to the selected first response level may be caused. By way of example, instructions may be transmitted (e.g., by the enforcement manager 708 of FIG. 7) to cause the first set of reduction actions to be applied to the plurality of hosts. In some embodiments, the instructions may be transmitted to the power management service 304 of FIG. 3 and/or the compute service 306 of FIG. 3. At least some of the instructions may cause power caps to be identified/applied, workloads and/or virtual machines to be migrated, virtual machine(s) and/or host(s) to be shut off, workloads to be migrated, or any suitable combination of the above.

Figure 14:
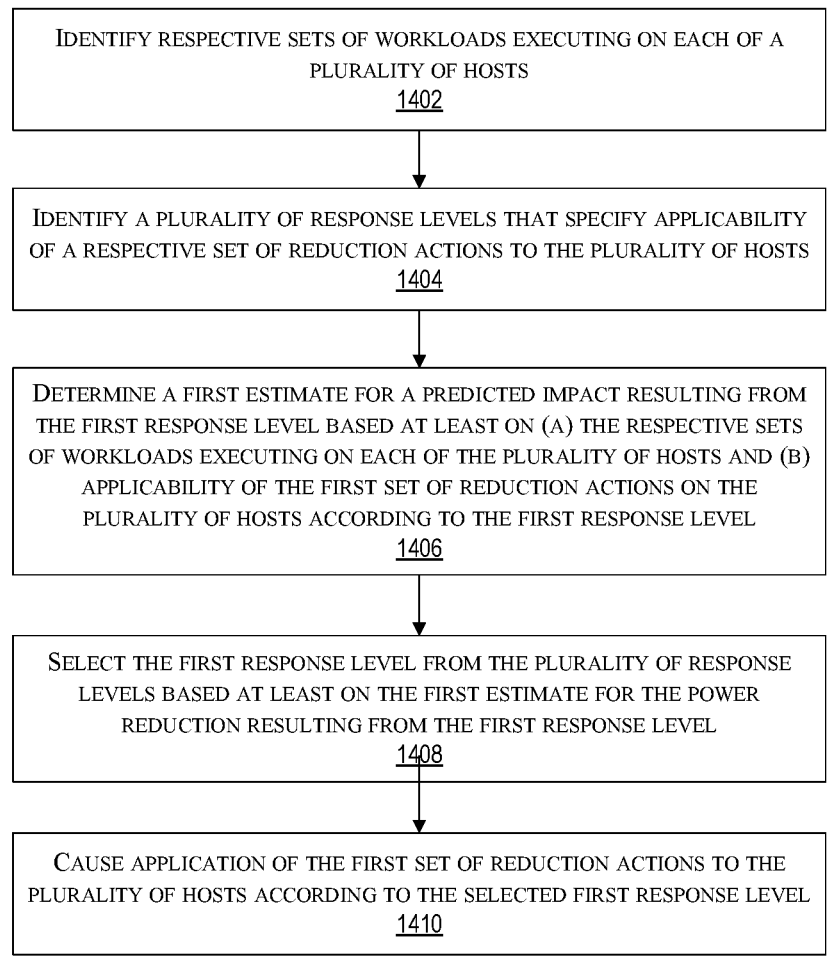
FIG. 14 is a block diagram illustrating an example method for implementing a response level from a plurality of response levels based at least in part on a predicted impact, in accordance with at least one embodiment.

FIG. 14 is a block diagram illustrating an example method 1400 for implementing a response level from a plurality of response levels based at least in part on a predicted impact, in accordance with at least one embodiment. Method 1400 may be performed by one or more components of power orchestration system 300 of FIG. 3 or subcomponents thereof discussed in connection with FIGS. 4 and 7. By way of example. The method 1400 may be performed, at least in part, any suitable combination of the VEPO orchestration service 302, the power management service 304, and/or the compute service 306 of FIG. 3. The operations of method 1400 may be performed in any suitable order. More or few operations than those depicted in FIG. 14 may be included in method 1400.

The method 1400 may begin at 1402, where respective sets of workloads executing on each of a plurality of hosts may be identified (e.g., by impact identification manager 706 of FIG. 7). In some embodiments, the respective sets of workloads executing on each of the plurality of hosts may be identified based at least in part on host/instance data 316 of FIG. 3.

At 1404, a plurality of response levels that specify applicability of a respective set of reduction actions to a plurality of hosts may be identified (e.g., by the impact identification manager 706 of FIG. 7). In some embodiments, the plurality of response levels may be identified from configuration data (e.g., configuration data 712 of FIG. 7). In some embodiments, the plurality of response levels (e.g., VEPO response levels of FIG. 8) specify applicability of a respective set of reduction actions to a plurality of hosts (e.g., via one or more reduction actions corresponding to each response level). In some embodiments, a first response level of the plurality of response levels specifies applicability of a first set of reduction actions to the plurality of hosts (e.g., based at least in part on the one or more reduction actions associated with that response level). By way of example, VEPO response level of FIG. 8 may specify that all vacant/idle hosts and hypervisors that can be evacuated completely are applicable to an action (e.g., powering off). Thus, the reduction action indicates a subset of resources (e.g., vacant/idle hosts and hypervisors that can be evacuated completely) are applicable to a given reduction action (e.g., powering off), and through association, the corresponding response level.

At 1406, a first estimate for predicted impact resulting from the first response level may be determined (e.g., by the impact identification manager 706). In some embodiments, the first estimate may be determined based at least on (a) the respective sets of workloads executing on each of the plurality of hosts and (b) applicability of the first set of reduction actions on the plurality of hosts according to the first response level. In some embodiments, the predicted workload impact may be determined based on at least one of a priority of a host, or a number of affected hosts, a number of affected workloads, priority levels of the affected workloads, a number of affected customers, or priority levels of the affected customers. In some embodiments, the predicted workload impact may be predicted based at least in part on historical host/instance data (e.g., host/instance data 316 of FIG. 3), account data (e.g., account data 312), and/or any suitable data discussed in connection with FIG. 3. In some embodiments, the predicted workload impact may be predicted based at least in part on providing input data (e.g., host/instance data 316 of FIG. 3, account data 312, etc.) to a machine-learning model (e.g., one or more of the model(s) 1202 of FIG. 12).

At 1408, the first response level may be selected (e.g., by the enforcement manager 708 of FIG. 7) from the plurality of response levels based at least on the first estimate for the workload impact resulting from the first response level. In some embodiments, the enforcement manager 708 may select the first response level based at least in part on identifying that the first estimate for the workload impact indicates an impact to fewer workloads than estimated workload impacts corresponding to at least one other response level of the plurality of response levels. In some embodiments, the workload impact may indicate an impact to fewer workloads, host(s), and/or customers. In some embodiments, the enforcement manager 708 may select the first response level based further on identifying that applying the set of reduction actions corresponding to the first response level is expected to reduce power consumption levels of the plurality of hosts to a value that falls below the aggregate power threshold.

At 1410, application of the first set of reduction actions to the plurality of hosts according to the selected first response level may be caused. By way of example, instructions may be transmitted (e.g., by the enforcement manager 708 of FIG. 7) to cause the first set of reduction actions to be applied to the plurality of hosts. In some embodiments, the instructions may be transmitted to the power management service 304 of FIG. 3 and/or the compute service 306 of FIG. 3. At least some of the instructions may cause power caps to be identified/applied, workloads and/or virtual machines to be migrated, virtual machine(s) and/or host(s) to be shut off, workloads to be migrated, or any suitable combination of the above.

Figure 15:
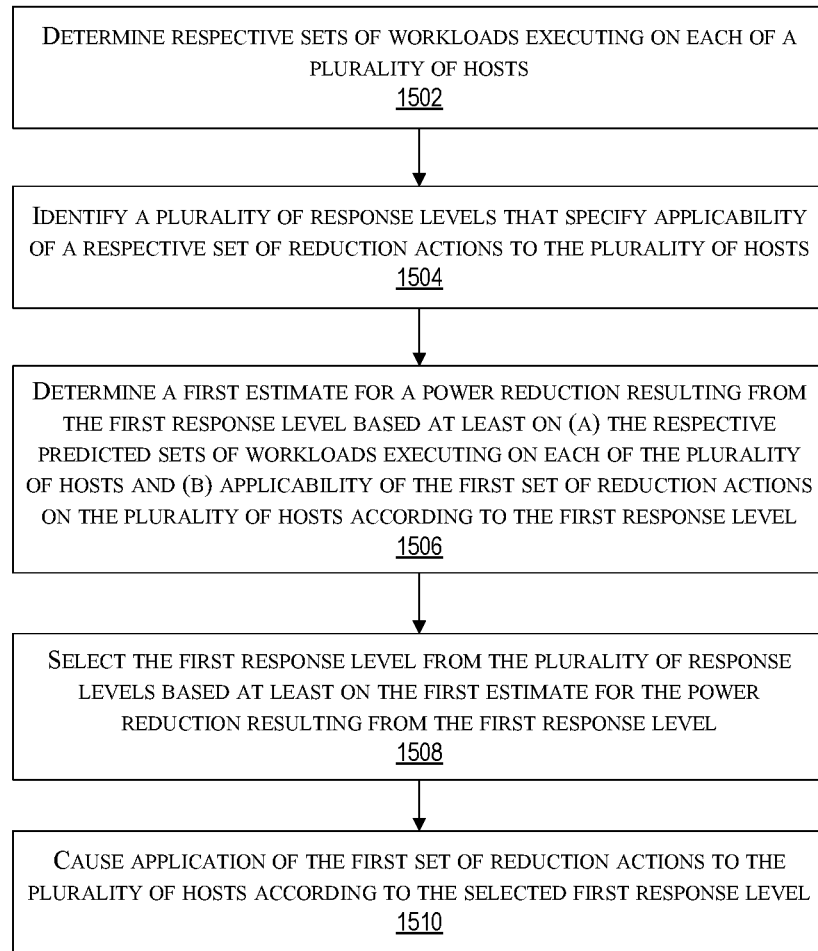
FIG. 15 is a block diagram illustrating an example method for preemptively migrating workloads affected by a selected response level, in accordance with at least one embodiment.

FIG. 15 is a block diagram illustrating an example method for preemptively migrating workloads affected by a selected response level, in accordance with at least one embodiment. Method 1500 may be performed by one or more components of power orchestration system 300 of FIG. 3 or subcomponents thereof discussed in connection with FIGS. 4 and 7. By way of example. The method 1500 may be performed, at least in part, any suitable combination of the VEPO orchestration service 302, the power management service 304, and/or the compute service 306 of FIG. 3. The operations of method 1500 may be performed in any suitable order. More or few operations than those depicted in FIG. 15 may be included in method 1500.

The method 1500 may begin at 1502, where respective predicted sets of workloads executing on each of a plurality of hosts during a future time may be determined (e.g., by impact identification manager 706 of FIG. 7). In some embodiments, the respective predicted sets of workloads executing on each of the plurality of hosts during a future time may be identified based at least in part on historical data (e.g., included in host/instance data 316 of FIG. 3). In some embodiments, the predicted sets of workloads may be predicted based at least in part on providing input data (e.g., host/instance data 316 of FIG. 3, account data 312, etc.) to a machine-learning model (e.g., one or more of the model(s) 1202 of FIG. 12).

At 1504, a plurality of response levels that specify applicability of a respective set of reduction actions to a plurality of hosts may be identified (e.g., by the impact identification manager 706 of FIG. 7). In some embodiments, the plurality of response levels may be identified from configuration data (e.g., configuration data 712 of FIG. 7). In some embodiments, the plurality of response levels (e.g., VEPO response levels of FIG. 8) specify applicability of a respective set of reduction actions to a plurality of hosts (e.g., via one or more reduction actions corresponding to each response level). In some embodiments, a first response level of the plurality of response levels specifies applicability of a first set of reduction actions to the plurality of hosts (e.g., based at least in part on the one or more reduction actions associated with that response level). By way of example, VEPO response level of FIG. 8 may specify that all vacant/idle hosts and hypervisors that can be evacuated completely are applicable to an action (e.g., powering off). Thus, the reduction action indicates a subset of resources (e.g., vacant/idle hosts and hypervisors that can be evacuated completely) are applicable to a given reduction action (e.g., powering off), and through association, the corresponding response level.

At 1506, a first estimate for a power reduction resulting from the first response level may be determined (e.g., by the impact identification manager 706). In some embodiments, the first estimate may be determined based at least on (a) the respective predicted sets of workloads executing on each of the plurality of hosts and (b) applicability of the first set of reduction actions on the plurality of hosts according to the first response level. In some embodiments, the power reduction may be determined based on at least one the predicted sets of workloads, predicted power consumption values, predicted priorities, or the like. In some embodiments, the predicted workloads, predicted power consumption values, predicted priorities, and the like may be predicted based at least in part on historical/current power data (e.g., included in power data 310 of FIG. 3, historical/current host/instance data (e.g., included in host/instance data 316 of FIG. 3), historical/current account data (e.g., included in account data 312), and/or any suitable historical and/or current data discussed in connection with FIG. 3. In some embodiments, the power reduction resulting from the first response level may be determined based at least in part on providing input data (e.g., power data 310, host/instance data 316, account data 312, environment data 314, operational data 318, any suitable combination of the above) to a machine-learning model (e.g., one or more of the model(s) 1202 of FIG. 12).

At 1508, the first response level may be selected (e.g., by the enforcement manager 708 of FIG. 7) from the plurality of response levels based at least on the first estimate for the power reduction resulting from the first response level. In some embodiments, the enforcement manager 708 may select the first response level based at least in part on identifying that the respective set of reduction actions to the plurality of hosts of the first response level is sufficient to reduce power consumption levels of the plurality of hosts to a value that falls below an aggregate power threshold (e.g., an aggregate power threshold determined by demand manager 710 of FIG. 7). In some embodiments, a corresponding estimate for each of the response levels (e.g., VEPO response levels of FIG. 8) may be identified (e.g., by the impact identification manager 706) and the first response level may be selected based at least in part on being least impactful (e.g., impacting fewer workloads, hosts, customers, or any suitable combination of the above) while being sufficient to reduce power consumption levels of the plurality of hosts to a value that falls below the aggregate power threshold.

At 1510, one or more workloads that (a) are currently executing on the plurality of hosts and (b) would be affected by application of the first set of reduction actions to the plurality of hosts according to the selected first response level may be identified (e.g., by the impact identification manager 706 of FIG. 7). In some embodiments, the one or more workloads may be predicted workloads. The impact identification manager 706 may predict the one or more workloads based at least in part on historical data (e.g., included in host/instance data 316 of FIG. 3) and/or based at least in part on output provided by at least one of the model(s) 1202 of FIG. 12 (e.g., output provided in response to providing input data comprising any suitable historical and/or current data of host/instance data 316.

At 1512, prior to the future time period, the affected workloads may be preemptively migrated from the plurality of hosts to one or more other hosts. As a non-limiting example, the affected workloads (and/or virtual machines on which the workloads execute) may be migrated to other hosts to condense the number of total hosts used and/or to empty a host and/or virtual machine such that it may be shut down. In some embodiments, these migrations may be initiated by the enforcement manager 708 based at least in part on sending instructions to compute service 306 of FIG. 3.

FIGS. 16-19 depict a number of example environments which may be hosted by host(s) 324 of FIG. 3. The environments depicted in FIGS. 16-20 depict cloud-computing, multi-tenant environments. As described above, cloud-computing and/or multi-tenant environments, and other environments, may benefit from utilizing the power management techniques disclosed herein. These techniques enable a datacenter including components implementing the environments described in connection with FIGS. 1-4 and 7, among others, to more efficiently utilize the power resources of the datacenter over conventional techniques that left large amounts of power unutilized.

IaaS Infrastructure Examples

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 16:
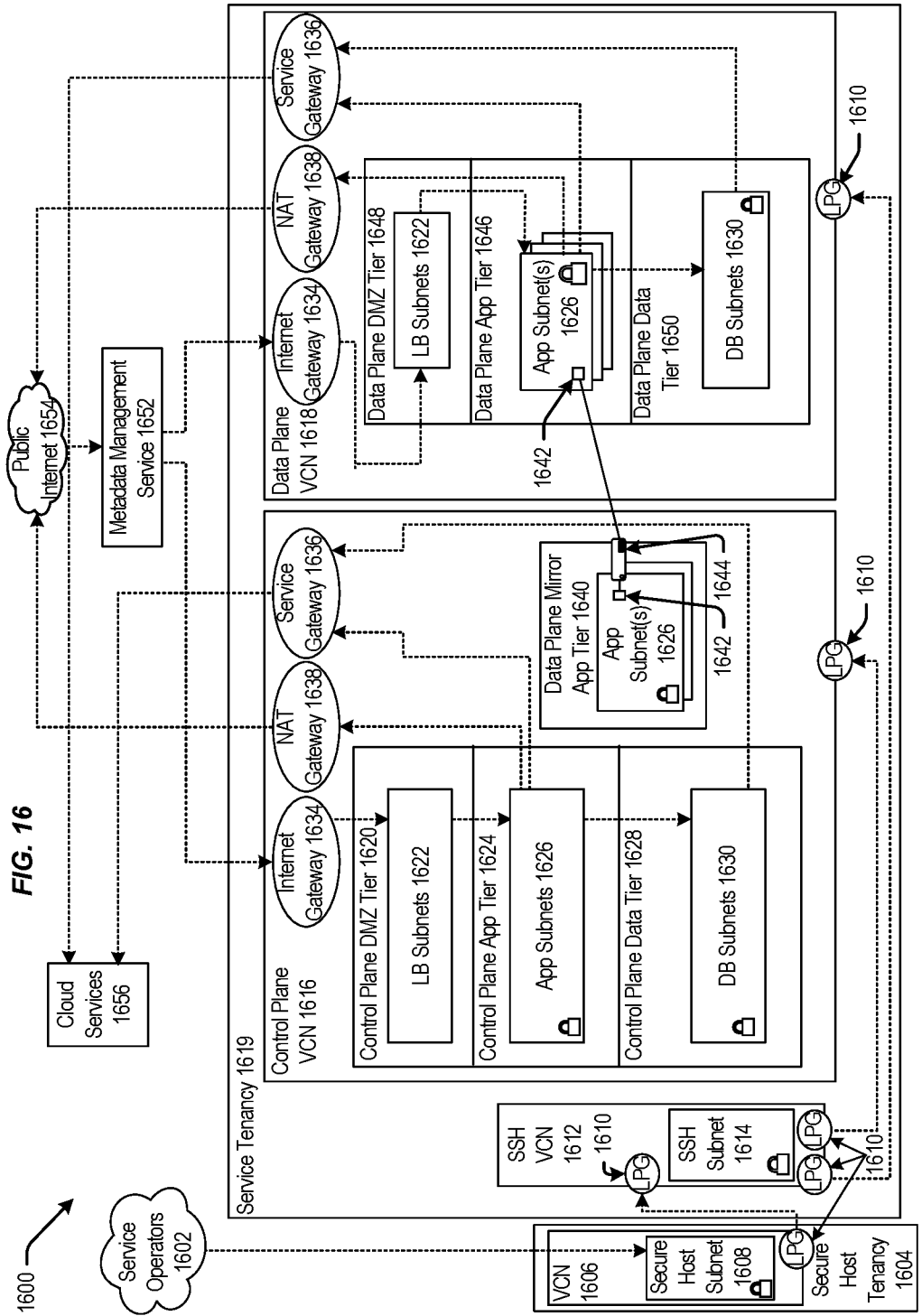
FIG. 16 is a block diagram illustrating one pattern for implementing a cloud infrastructure as a service system, according to at least one embodiment.

FIG. 16 is a block diagram 1600 illustrating an example pattern of an IaaS architecture, according to at least one embodiment. Service operators 1602 can be communicatively coupled to a secure host tenancy 1604 that can include a virtual cloud network (VCN) 1606 and a secure host subnet 1608. In some examples, the service operators 1602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1606 and/or the Internet.

The VCN 1606 can include a local peering gateway (LPG) 1610 that can be communicatively coupled to a secure shell (SSH) VCN 1612 via an LPG 1610 contained in the SSH VCN 1612. The SSH VCN 1612 can include an SSH subnet 1614, and the SSH VCN 1612 can be communicatively coupled to a control plane VCN 1616 via the LPG 1610 contained in the control plane VCN 1616. Also, the SSH VCN 1612 can be communicatively coupled to a data plane VCN 1618 via an LPG 1610. The control plane VCN 1616 and the data plane VCN 1618 can be contained in a service tenancy 1619 that can be owned and/or operated by the IaaS provider.

The control plane VCN 1616 can include a control plane demilitarized zone (DMZ) tier 1620 that acts as a perimeter network (e.g., portions of a corporate network between the corporate intranet and external networks). The DMZ-based servers may have restricted responsibilities and help keep breaches contained. Additionally, the DMZ tier 1620 can include one or more load balancer (LB) subnet(s) 1622, a control plane app tier 1624 that can include app subnet(s) 1626, a control plane data tier 1628 that can include database (DB) subnet(s) 1630 (e.g., frontend DB subnet(s) and/or backend DB subnet(s)). The LB subnet(s) 1622 contained in the control plane DMZ tier 1620 can be communicatively coupled to the app subnet(s) 1626 contained in the control plane app tier 1624 and an Internet gateway 1634 that can be contained in the control plane VCN 1616, and the app subnet(s) 1626 can be communicatively coupled to the DB subnet(s) 1630 contained in the control plane data tier 1628 and a service gateway 1636 and a network address translation (NAT) gateway 1638. The control plane VCN 1616 can include the service gateway 1636 and the NAT gateway 1638.

The control plane VCN 1616 can include a data plane mirror app tier 1640 that can include app subnet(s) 1626. The app subnet(s) 1626 contained in the data plane mirror app tier 1640 can include a virtual network interface controller (VNIC) 1642 that can execute a compute instance 1644. The compute instance 1644 can communicatively couple the app subnet(s) 1626 of the data plane mirror app tier 1640 to app subnet(s) 1626 that can be contained in a data plane app tier 1646.

The data plane VCN 1618 can include the data plane app tier 1646, a data plane DMZ tier 1648, and a data plane data tier 1650. The data plane DMZ tier 1648 can include LB subnet(s) 1622 that can be communicatively coupled to the app subnet(s) 1626 of the data plane app tier 1646 and the Internet gateway 1634 of the data plane VCN 1618. The app subnet(s) 1626 can be communicatively coupled to the service gateway 1636 of the data plane VCN 1618 and the NAT gateway 1638 of the data plane VCN 1618. The data plane data tier 1650 can also include the DB subnet(s) 1630 that can be communicatively coupled to the app subnet(s) 1626 of the data plane app tier 1646.

The Internet gateway 1634 of the control plane VCN 1616 and of the data plane VCN 1618 can be communicatively coupled to a metadata management service 1652 that can be communicatively coupled to public Internet 1654. Public Internet 1654 can be communicatively coupled to the NAT gateway 1638 of the control plane VCN 1616 and of the data plane VCN 1618. The service gateway 1636 of the control plane VCN 1616 and of the data plane VCN 1618 can be communicatively couple to cloud services 1656.

In some examples, the service gateway 1636 of the control plane VCN 1616 or of the data plane VCN 1618 can make application programming interface (API) calls to cloud services 1656 without going through public Internet 1654. The API calls to cloud services 1656 from the service gateway 1636 can be one-way: the service gateway 1636 can make API calls to cloud services 1656, and cloud services 1656 can send requested data to the service gateway 1636. But, cloud services 1656 may not initiate API calls to the service gateway 1636.

In some examples, the secure host tenancy 1604 can be directly connected to the service tenancy 1619, which may be otherwise isolated. The secure host subnet 1608 can communicate with the SSH subnet 1614 through an LPG 1610 that may enable two-way communication over an otherwise isolated system. Connecting the secure host subnet 1608 to the SSH subnet 1614 may give the secure host subnet 1608 access to other entities within the service tenancy 1619.

The control plane VCN 1616 may allow users of the service tenancy 1619 to set up or otherwise provision desired resources. Desired resources provisioned in the control plane VCN 1616 may be deployed or otherwise used in the data plane VCN 1618. In some examples, the control plane VCN 1616 can be isolated from the data plane VCN 1618, and the data plane mirror app tier 1640 of the control plane VCN 1616 can communicate with the data plane app tier 1646 of the data plane VCN 1618 via VNICs 1642 that can be contained in the data plane mirror app tier 1640 and the data plane app tier 1646.

In some examples, users of the system, or customers, can make requests, for example create, read, update, or delete (CRUD) operations, through public Internet 1654 that can communicate the requests to the metadata management service 1652. The metadata management service 1652 can communicate the request to the control plane VCN 1616 through the Internet gateway 1634. The request can be received by the LB subnet(s) 1622 contained in the control plane DMZ tier 1620. The LB subnet(s) 1622 may determine that the request is valid, and in response to this determination, the LB subnet(s) 1622 can transmit the request to app subnet(s) 1626 contained in the control plane app tier 1624. If the request is validated and requires a call to public Internet 1654, the call to public Internet 1654 may be transmitted to the NAT gateway 1638 that can make the call to public Internet 1654. Metadata that may be desired to be stored by the request can be stored in the DB subnet(s) 1630.

In some examples, the data plane mirror app tier 1640 can facilitate direct communication between the control plane VCN 1616 and the data plane VCN 1618. For example, changes, updates, or other suitable modifications to configuration may be desired to be applied to the resources contained in the data plane VCN 1618. Via a VNIC 1642, the control plane VCN 1616 can directly communicate with, and can thereby execute the changes, updates, or other suitable modifications to configuration to, resources contained in the data plane VCN 1618.

In some embodiments, the control plane VCN 1616 and the data plane VCN 1618 can be contained in the service tenancy 1619. In this case, the user, or the customer, of the system may not own or operate either the control plane VCN 1616 or the data plane VCN 1618. Instead, the IaaS provider may own or operate the control plane VCN 1616 and the data plane VCN 1618, both of which may be contained in the service tenancy 1619. This embodiment can enable isolation of networks that may prevent users or customers from interacting with other users', or other customers', resources. Also, this embodiment may allow users or customers of the system to store databases privately without needing to rely on public Internet 1654, which may not have a desired level of threat prevention, for storage.

In other embodiments, the LB subnet(s) 1622 contained in the control plane VCN 1616 can be configured to receive a signal from the service gateway 1636. In this embodiment, the control plane VCN 1616 and the data plane VCN 1618 may be configured to be called by a customer of the IaaS provider without calling public Internet 1654. Customers of the IaaS provider may desire this embodiment since database(s) that the customers use may be controlled by the IaaS provider and may be stored on the service tenancy 1619, which may be isolated from public Internet 1654.

Figure 17:
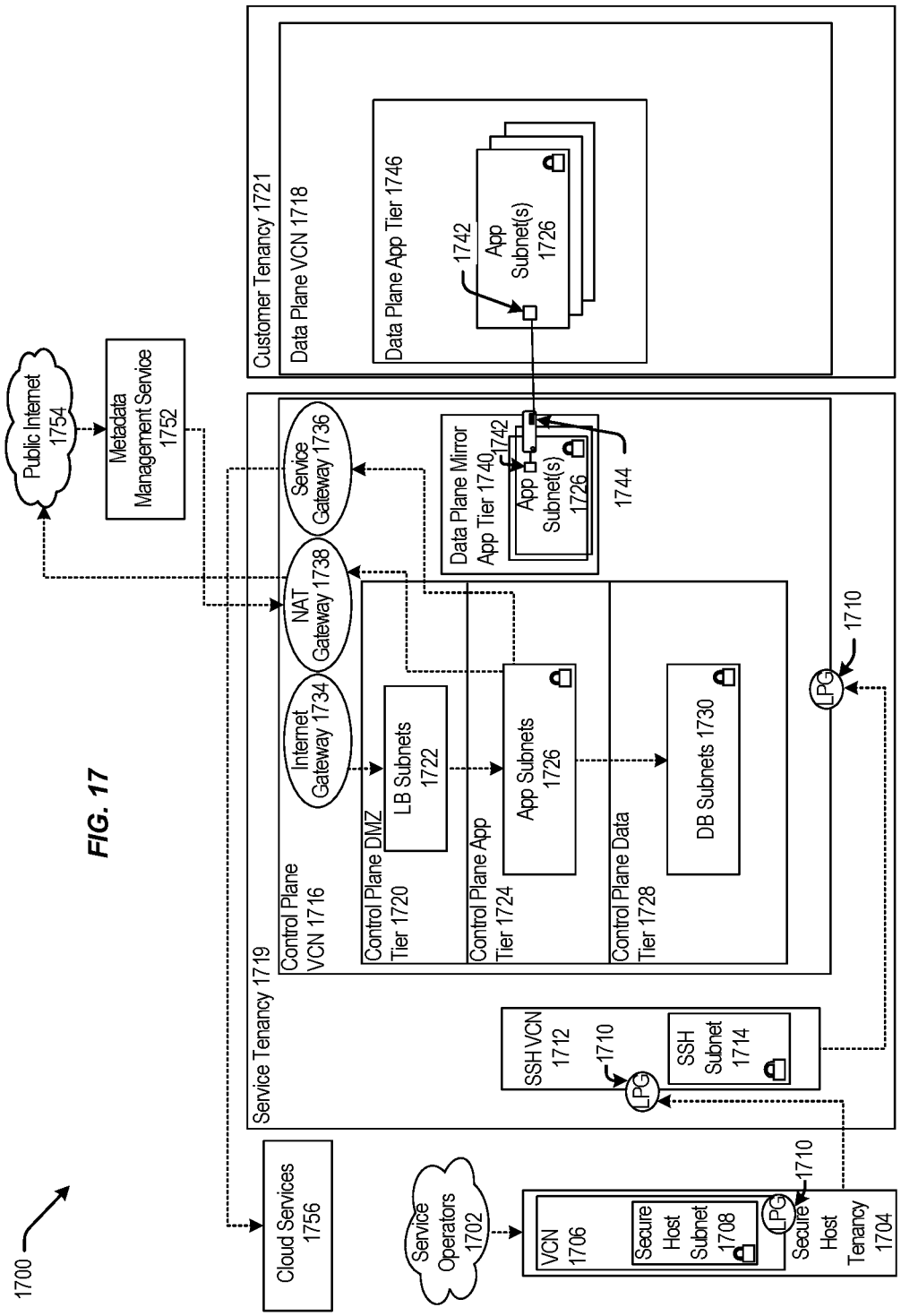
FIG. 17 is a block diagram illustrating another pattern for implementing a cloud infrastructure as a service system, according to at least one embodiment.

FIG. 17 is a block diagram 1700 illustrating another example pattern of an IaaS architecture, according to at least one embodiment. Service operators 1702 (e.g., service operators 1602 of FIG. 16) can be communicatively coupled to a secure host tenancy 1704 (e.g., the secure host tenancy 1604 of FIG. 16) that can include a virtual cloud network (VCN) 1706 (e.g., the VCN 1606 of FIG. 16) and a secure host subnet 1708 (e.g., the secure host subnet 1608 of FIG. 16). The VCN 1706 can include a local peering gateway (LPG) 1710 (e.g., the LPG 1610 of FIG. 16) that can be communicatively coupled to a secure shell (SSH) VCN 1712 (e.g., the SSH VCN 1612 of FIG. 16) via an LPG 1610 contained in the SSH VCN 1712. The SSH VCN 1712 can include an SSH subnet 1714 (e.g., the SSH subnet 1614 of FIG. 16), and the SSH VCN 1712 can be communicatively coupled to a control plane VCN 1716 (e.g., the control plane VCN 1616 of FIG. 16) via an LPG 1710 contained in the control plane VCN 1716. The control plane VCN 1716 can be contained in a service tenancy 1719 (e.g., the service tenancy 1619 of FIG. 16), and the data plane VCN 1718 (e.g., the data plane VCN 1618 of FIG. 16) can be contained in a customer tenancy 1721 that may be owned or operated by users, or customers, of the system.

The control plane VCN 1716 can include a control plane DMZ tier 1720 (e.g., the control plane DMZ tier 1620 of FIG. 16) that can include LB subnet(s) 1722 (e.g., LB subnet(s) 1622 of FIG. 16), a control plane app tier 1724 (e.g., the control plane app tier 1624 of FIG. 16) that can include app subnet(s) 1726 (e.g., app subnet(s) 1626 of FIG. 16), a control plane data tier 1728 (e.g., the control plane data tier 1628 of FIG. 16) that can include database (DB) subnet(s) 1730 (e.g., similar to DB subnet(s) 1630 of FIG. 16). The LB subnet(s) 1722 contained in the control plane DMZ tier 1720 can be communicatively coupled to the app subnet(s) 1726 contained in the control plane app tier 1724 and an Internet gateway 1734 (e.g., the Internet gateway 1634 of FIG. 16) that can be contained in the control plane VCN 1716, and the app subnet(s) 1726 can be communicatively coupled to the DB subnet(s) 1730 contained in the control plane data tier 1728 and a service gateway 1736 (e.g., the service gateway 1636 of FIG. 16) and a network address translation (NAT) gateway 1738 (e.g., the NAT gateway 1638 of FIG. 16). The control plane VCN 1716 can include the service gateway 1736 and the NAT gateway 1738.

The control plane VCN 1716 can include a data plane mirror app tier 1740 (e.g., the data plane mirror app tier 1640 of FIG. 16) that can include app subnet(s) 1726. The app subnet(s) 1726 contained in the data plane mirror app tier 1740 can include a virtual network interface controller (VNIC) 1742 (e.g., the VNIC of 1642) that can execute a compute instance 1744 (e.g., similar to the compute instance 1644 of FIG. 16). The compute instance 1744 can facilitate communication between the app subnet(s) 1726 of the data plane mirror app tier 1740 and the app subnet(s) 1726 that can be contained in a data plane app tier 1746 (e.g., the data plane app tier 1646 of FIG. 16) via the VNIC 1742 contained in the data plane mirror app tier 1740 and the VNIC 1742 contained in the data plane app tier 1746.

The Internet gateway 1734 contained in the control plane VCN 1716 can be communicatively coupled to a metadata management service 1752 (e.g., the metadata management service 1652 of FIG. 16) that can be communicatively coupled to public Internet 1754 (e.g., public Internet 1654 of FIG. 16). Public Internet 1754 can be communicatively coupled to the NAT gateway 1738 contained in the control plane VCN 1716. The service gateway 1736 contained in the control plane VCN 1716 can be communicatively couple to cloud services 1756 (e.g., cloud services 1656 of FIG. 16).

In some examples, the data plane VCN 1718 can be contained in the customer tenancy 1721. In this case, the IaaS provider may provide the control plane VCN 1716 for each customer, and the IaaS provider may, for each customer, set up a unique compute instance 1744 that is contained in the service tenancy 1719. Each compute instance 1744 may allow communication between the control plane VCN 1716, contained in the service tenancy 1719, and the data plane VCN 1718 that is contained in the customer tenancy 1721. The compute instance 1744 may allow resources, which are provisioned in the control plane VCN 1716 that is contained in the service tenancy 1719, to be deployed or otherwise used in the data plane VCN 1718 that is contained in the customer tenancy 1721.

In other examples, the customer of the IaaS provider may have databases that live in the customer tenancy 1721. In this example, the control plane VCN 1716 can include the data plane mirror app tier 1740 that can include app subnet(s) 1726. The data plane mirror app tier 1740 can reside in the data plane VCN 1718, but the data plane mirror app tier 1740 may not live in the data plane VCN 1718. That is, the data plane mirror app tier 1740 may have access to the customer tenancy 1721, but the data plane mirror app tier 1740 may not exist in the data plane VCN 1718 or be owned or operated by the customer of the IaaS provider. The data plane mirror app tier 1740 may be configured to make calls to the data plane VCN 1718 but may not be configured to make calls to any entity contained in the control plane VCN 1716. The customer may desire to deploy or otherwise use resources in the data plane VCN 1718 that are provisioned in the control plane VCN 1716, and the data plane mirror app tier 1740 can facilitate the desired deployment, or other usage of resources, of the customer.

In some embodiments, the customer of the IaaS provider can apply filters to the data plane VCN 1718. In this embodiment, the customer can determine what the data plane VCN 1718 can access, and the customer may restrict access to public Internet 1754 from the data plane VCN 1718. The IaaS provider may not be able to apply filters or otherwise control access of the data plane VCN 1718 to any outside networks or databases. Applying filters and controls by the customer onto the data plane VCN 1718, contained in the customer tenancy 1721, can help isolate the data plane VCN 1718 from other customers and from public Internet 1754.

In some embodiments, cloud services 1756 can be called by the service gateway 1736 to access services that may not exist on public Internet 1754, on the control plane VCN 1716, or on the data plane VCN 1718. The connection between cloud services 1756 and the control plane VCN 1716 or the data plane VCN 1718 may not be live or continuous. Cloud services 1756 may exist on a different network owned or operated by the IaaS provider. Cloud services 1756 may be configured to receive calls from the service gateway 1736 and may be configured to not receive calls from public Internet 1754. Some cloud services 1756 may be isolated from other cloud services 1756, and the control plane VCN 1716 may be isolated from cloud services 1756 that may not be in the same region as the control plane VCN 1716. For example, the control plane VCN 1716 may be located in "Region 1," and cloud service "Deployment 15," may be located in Region 1 and in "Region 2." If a call to Deployment 15 is made by the service gateway 1736 contained in the control plane VCN 1716 located in Region 1, the call may be transmitted to Deployment 15 in Region 1. In this example, the control plane VCN 1716, or Deployment 15 in Region 1, may not be communicatively coupled to, or otherwise in communication with, Deployment 15 in Region 2.

Figure 18:
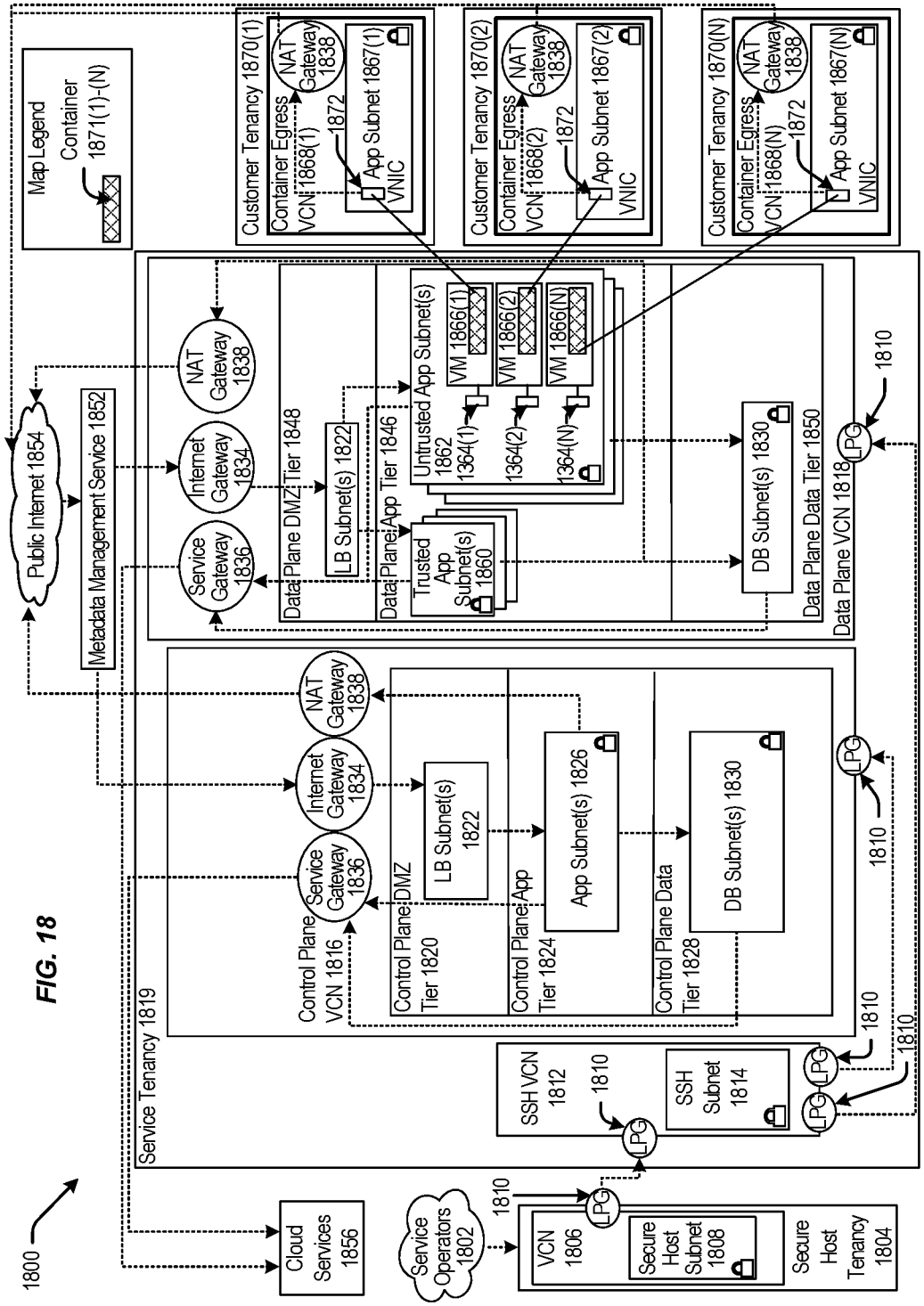
FIG. 18 is a block diagram illustrating another pattern for implementing a cloud infrastructure as a service system, according to at least one embodiment.

FIG. 18 is a block diagram 1800 illustrating another example pattern of an IaaS architecture, according to at least one embodiment. Service operators 1802 (e.g., service operators 1602 of FIG. 16) can be communicatively coupled to a secure host tenancy 1804 (e.g., the secure host tenancy 1604 of FIG. 16) that can include a virtual cloud network (VCN) 1806 (e.g., the VCN 1606 of FIG. 16) and a secure host subnet 1808 (e.g., the secure host subnet 1608 of FIG. 16). The VCN 1806 can include an LPG 1810 (e.g., the LPG 1610 of FIG. 16) that can be communicatively coupled to an SSH VCN 1812 (e.g., the SSH VCN 1612 of FIG. 16) via an LPG 1810 contained in the SSH VCN 1812. The SSH VCN 1812 can include an SSH subnet 1814 (e.g., the SSH subnet 1614 of FIG. 16), and the SSH VCN 1812 can be communicatively coupled to a control plane VCN 1816 (e.g., the control plane VCN 1616 of FIG. 16) via an LPG 1810 contained in the control plane VCN 1816 and to a data plane VCN 1818 (e.g., the data plane 1618 of FIG. 16) via an LPG 1810 contained in the data plane VCN 1818. The control plane VCN 1816 and the data plane VCN 1818 can be contained in a service tenancy 1819 (e.g., the service tenancy 1619 of FIG. 16).

The control plane VCN 1816 can include a control plane DMZ tier 1820 (e.g., the control plane DMZ tier 1620 of FIG. 16) that can include load balancer (LB) subnet(s) 1822 (e.g., LB subnet(s) 1622 of FIG. 16), a control plane app tier 1824 (e.g., the control plane app tier 1624 of FIG. 16) that can include app subnet(s) 1826 (e.g., similar to app subnet(s) 1626 of FIG. 16), a control plane data tier 1828 (e.g., the control plane data tier 1628 of FIG. 16) that can include DB subnet(s) 1830. The LB subnet(s) 1822 contained in the control plane DMZ tier 1820 can be communicatively coupled to the app subnet(s) 1826 contained in the control plane app tier 1824 and to an Internet gateway 1834 (e.g., the Internet gateway 1634 of FIG. 16) that can be contained in the control plane VCN 1816, and the app subnet(s) 1826 can be communicatively coupled to the DB subnet(s) 1830 contained in the control plane data tier 1828 and to a service gateway 1836 (e.g., the service gateway of FIG. 16) and a network address translation (NAT) gateway 1838 (e.g., the NAT gateway 1638 of FIG. 16). The control plane VCN 1816 can include the service gateway 1836 and the NAT gateway 1838.

The data plane VCN 1818 can include a data plane app tier 1846 (e.g., the data plane app tier 1646 of FIG. 16), a data plane DMZ tier 1848 (e.g., the data plane DMZ tier 1648 of FIG. 16), and a data plane data tier 1850 (e.g., the data plane data tier 1650 of FIG. 16). The data plane DMZ tier 1848 can include LB subnet(s) 1822 that can be communicatively coupled to trusted app subnet(s) 1860 and untrusted app subnet(s) 1862 of the data plane app tier 1846 and the Internet gateway 1834 contained in the data plane VCN 1818. The trusted app subnet(s) 1860 can be communicatively coupled to the service gateway 1836 contained in the data plane VCN 1818, the NAT gateway 1838 contained in the data plane VCN 1818, and DB subnet(s) 1830 contained in the data plane data tier 1850. The untrusted app subnet(s) 1862 can be communicatively coupled to the service gateway 1836 contained in the data plane VCN 1818 and DB subnet(s) 1830 contained in the data plane data tier 1850. The data plane data tier 1850 can include DB subnet(s) 1830 that can be communicatively coupled to the service gateway 1836 contained in the data plane VCN 1818.

The untrusted app subnet(s) 1862 can include one or more primary VNICs 1864(1)-(N) that can be communicatively coupled to tenant virtual machines (VMs) 1866(1)-(N). Each tenant VM 1866(1)-(N) can be communicatively coupled to a respective app subnet 1867(1)-(N) that can be contained in respective container egress VCNs 1868(1)-(N) that can be contained in respective customer tenancies 1870(1)-(N). Respective secondary VNICs 1872(1)-(N) can facilitate communication between the untrusted app subnet(s) 1862 contained in the data plane VCN 1818 and the app subnet contained in the container egress VCNs 1868(1)-(N). Each container egress VCNs 1868(1)-(N) can include a NAT gateway 1838 that can be communicatively coupled to public Internet 1854 (e.g., public Internet 1654 of FIG. 16).

The Internet gateway 1834 contained in the control plane VCN 1816 and contained in the data plane VCN 1818 can be communicatively coupled to a metadata management service 1852 (e.g., the metadata management system 1652 of FIG. 16) that can be communicatively coupled to public Internet 1854. Public Internet 1854 can be communicatively coupled to the NAT gateway 1838 contained in the control plane VCN 1816 and contained in the data plane VCN 1818. The service gateway 1836 contained in the control plane VCN 1816 and contained in the data plane VCN 1818 can be communicatively couple to cloud services 1856.

In some embodiments, the data plane VCN 1818 can be integrated with customer tenancies 1870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1846. Code to run the function may be executed in the VMs 1866(1)-(N), and the code may not be configured to run anywhere else on the data plane VCN 1818. Each VM 1866(1)-(N) may be connected to one customer tenancy 1870. Respective containers 1871(1)-(N) contained in the VMs 1866(1)-(N) may be configured to run the code. In this case, there can be a dual isolation (e.g., the containers 1871(1)-(N) running code, where the containers 1871(1)-(N) may be contained in at least the VM 1866(1)-(N) that are contained in the untrusted app subnet(s) 1862), which may help prevent incorrect or otherwise undesirable code from damaging the network of the IaaS provider or from damaging a network of a different customer. The containers 1871(1)-(N) may be communicatively coupled to the customer tenancy 1870 and may be configured to transmit or receive data from the customer tenancy 1870. The containers 1871(1)-(N) may not be configured to transmit or receive data from any other entity in the data plane VCN 1818. Upon completion of running the code, the IaaS provider may kill or otherwise dispose of the containers 1871(1)-(N).

In some embodiments, the trusted app subnet(s) 1860 may run code that may be owned or operated by the IaaS provider. In this embodiment, the trusted app subnet(s) 1860 may be communicatively coupled to the DB subnet(s) 1830 and be configured to execute CRUD operations in the DB subnet(s) 1830. The untrusted app subnet(s) 1862 may be communicatively coupled to the DB subnet(s) 1830, but in this embodiment, the untrusted app subnet(s) may be configured to execute read operations in the DB subnet(s) 1830. The containers 1871(1)-(N) that can be contained in the VM 1866(1)-(N) of each customer and that may run code from the customer may not be communicatively coupled with the DB subnet(s) 1830.

In other embodiments, the control plane VCN 1816 and the data plane VCN 1818 may not be directly communicatively coupled. In this embodiment, there may be no direct communication between the control plane VCN 1816 and the data plane VCN 1818. However, communication can occur indirectly through at least one method. An LPG 1810 may be established by the IaaS provider that can facilitate communication between the control plane VCN 1816 and the data plane VCN 1818. In another example, the control plane VCN 1816 or the data plane VCN 1818 can make a call to cloud services 1856 via the service gateway 1836. For example, a call to cloud services 1856 from the control plane VCN 1816 can include a request for a service that can communicate with the data plane VCN 1818.

Figure 19:
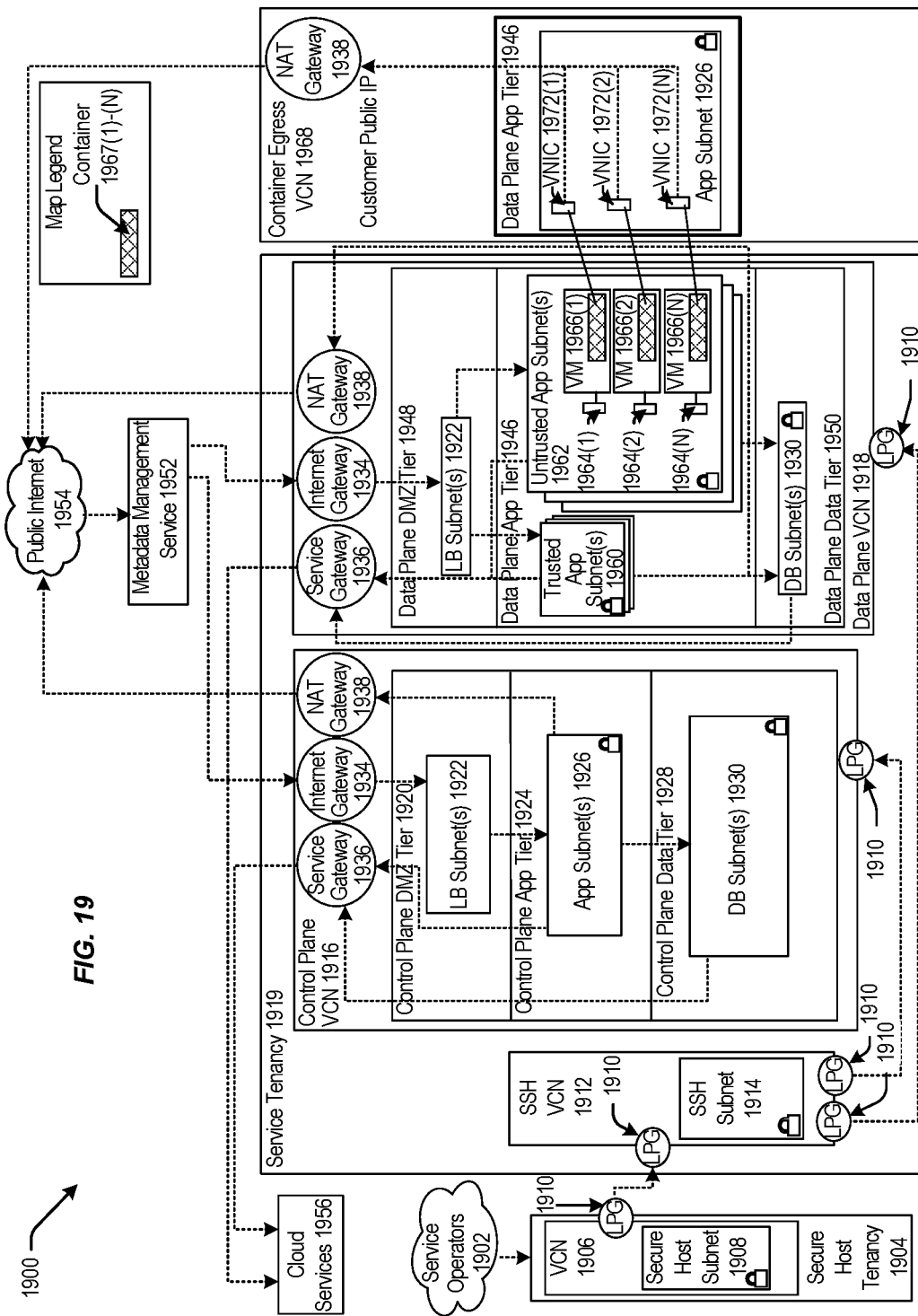
FIG. 19 is a block diagram illustrating another pattern for implementing a cloud infrastructure as a service system, according to at least one embodiment.

FIG. 19 is a block diagram 1900 illustrating another example pattern of an IaaS architecture, according to at least one embodiment. Service operators 1902 (e.g., service operators 1602 of FIG. 16) can be communicatively coupled to a secure host tenancy 1904 (e.g., the secure host tenancy 1604 of FIG. 16) that can include a virtual cloud network (VCN) 1906 (e.g., the VCN 1606 of FIG. 16) and a secure host subnet 1908 (e.g., the secure host subnet 1608 of FIG. 16). The VCN 1906 can include an LPG 1910 (e.g., the LPG 1610 of FIG. 16) that can be communicatively coupled to an SSH VCN 1912 (e.g., the SSH VCN 1612 of FIG. 16) via an LPG 1910 contained in the SSH VCN 1912. The SSH VCN 1912 can include an SSH subnet 1914 (e.g., the SSH subnet 1614 of FIG. 16), and the SSH VCN 1912 can be communicatively coupled to a control plane VCN 1916 (e.g., the control plane VCN 1616 of FIG. 16) via an LPG 1910 contained in the control plane VCN 1916 and to a data plane VCN 1918 (e.g., the data plane 1618 of FIG. 16) via an LPG 1910 contained in the data plane VCN 1918. The control plane VCN 1916 and the data plane VCN 1918 can be contained in a service tenancy 1919 (e.g., the service tenancy 1619 of FIG. 16).

The control plane VCN 1916 can include a control plane DMZ tier 1920 (e.g., the control plane DMZ tier 1620 of FIG. 16) that can include LB subnet(s) 1922 (e.g., LB subnet(s) 1622 of FIG. 16), a control plane app tier 1924 (e.g., the control plane app tier 1624 of FIG. 16) that can include app subnet(s) 1926 (e.g., app subnet(s) 1626 of FIG. 16), a control plane data tier 1928 (e.g., the control plane data tier 1628 of FIG. 16) that can include DB subnet(s) 1930 (e.g., DB subnet(s) 1830 of FIG. 18). The LB subnet(s) 1922 contained in the control plane DMZ tier 1920 can be communicatively coupled to the app subnet(s) 1926 contained in the control plane app tier 1924 and to an Internet gateway 1934 (e.g., the Internet gateway 1634 of FIG. 16) that can be contained in the control plane VCN 1916, and the app subnet(s) 1926 can be communicatively coupled to the DB subnet(s) 1930 contained in the control plane data tier 1928 and to a service gateway 1936 (e.g., the service gateway of FIG. 16) and a network address translation (NAT) gateway 1938 (e.g., the NAT gateway 1638 of FIG. 16). The control plane VCN 1916 can include the service gateway 1936 and the NAT gateway 1938.

The data plane VCN 1918 can include a data plane app tier 1946 (e.g., the data plane app tier 1646 of FIG. 16), a data plane DMZ tier 1948 (e.g., the data plane DMZ tier 1648 of FIG. 16), and a data plane data tier 1950 (e.g., the data plane data tier 1650 of FIG. 16). The data plane DMZ tier 1948 can include LB subnet(s) 1922 that can be communicatively coupled to trusted app subnet(s) 1960 (e.g., trusted app subnet(s) 1860 of FIG. 18) and untrusted app subnet(s) 1962 (e.g., untrusted app subnet(s) 1862 of FIG. 18) of the data plane app tier 1946 and the Internet gateway 1934 contained in the data plane VCN 1918. The trusted app subnet(s) 1960 can be communicatively coupled to the service gateway 1936 contained in the data plane VCN 1918, the NAT gateway 1938 contained in the data plane VCN 1918, and DB subnet(s) 1930 contained in the data plane data tier 1950. The untrusted app subnet(s) 1962 can be communicatively coupled to the service gateway 1936 contained in the data plane VCN 1918 and DB subnet(s) 1930 contained in the data plane data tier 1950. The data plane data tier 1950 can include DB subnet(s) 1930 that can be communicatively coupled to the service gateway 1936 contained in the data plane VCN 1918.

The untrusted app subnet(s) 1962 can include primary VNICs 1964(1)-(N) that can be communicatively coupled to tenant virtual machines (VMs) 1966(1)-(N) residing within the untrusted app subnet(s) 1962. Each tenant VM 1966(1)-(N) can run code in a respective container 1967(1)-(N) and be communicatively coupled to an app subnet 1926 that can be contained in a data plane app tier 1946 that can be contained in a container egress VCN 1968. Respective secondary VNICs 1972(1)-(N) can facilitate communication between the untrusted app subnet(s) 1962 contained in the data plane VCN 1918 and the app subnet contained in the container egress VCN 1968. The container egress VCN can include a NAT gateway 1938 that can be communicatively coupled to public Internet 1954 (e.g., public Internet 1654 of FIG. 16).

The Internet gateway 1934 contained in the control plane VCN 1916 and contained in the data plane VCN 1918 can be communicatively coupled to a metadata management service 1952 (e.g., the metadata management system 1652 of FIG. 16) that can be communicatively coupled to public Internet 1954. Public Internet 1954 can be communicatively coupled to the NAT gateway 1938 contained in the control plane VCN 1916 and contained in the data plane VCN 1918. The service gateway 1936 contained in the control plane VCN 1916 and contained in the data plane VCN 1918 can be communicatively couple to cloud services 1956.

In some examples, the pattern illustrated by the architecture of block diagram 1900 of FIG. 19 may be considered an exception to the pattern illustrated by the architecture of block diagram 1800 of FIG. 18 and may be desirable for a customer of the IaaS provider if the IaaS provider cannot directly communicate with the customer (e.g., a disconnected region). The respective containers 1967(1)-(N) that are contained in the VMs 1966(1)-(N) for each customer can be accessed in real-time by the customer. The containers 1967(1)-(N) may be configured to make calls to respective secondary VNICs 1972(1)-(N) contained in app subnet(s) 1926 of the data plane app tier 1946 that can be contained in the container egress VCN 1968. The secondary VNICs 1972(1)-(N) can transmit the calls to the NAT gateway 1938 that may transmit the calls to public Internet 1954. In this example, the containers 1967(1)-(N) that can be accessed in real-time by the customer can be isolated from the control plane VCN 1916 and can be isolated from other entities contained in the data plane VCN 1918. The containers 1967(1)-(N) may also be isolated from resources from other customers.

In other examples, the customer can use the containers 1967(1)-(N) to call cloud services 1956. In this example, the customer may run code in the containers 1967(1)-(N) that requests a service from cloud services 1956. The containers 1967(1)-(N) can transmit this request to the secondary VNICs 1972(1)-(N) that can transmit the request to the NAT gateway that can transmit the request to public Internet 1954. Public Internet 1954 can transmit the request to LB subnet(s) 1922 contained in the control plane VCN 1916 via the Internet gateway 1934. In response to determining the request is valid, the LB subnet(s) can transmit the request to app subnet(s) 1926 that can transmit the request to cloud services 1956 via the service gateway 1936.

It should be appreciated that IaaS architectures 1600, 1700, 1800, 1900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 20:
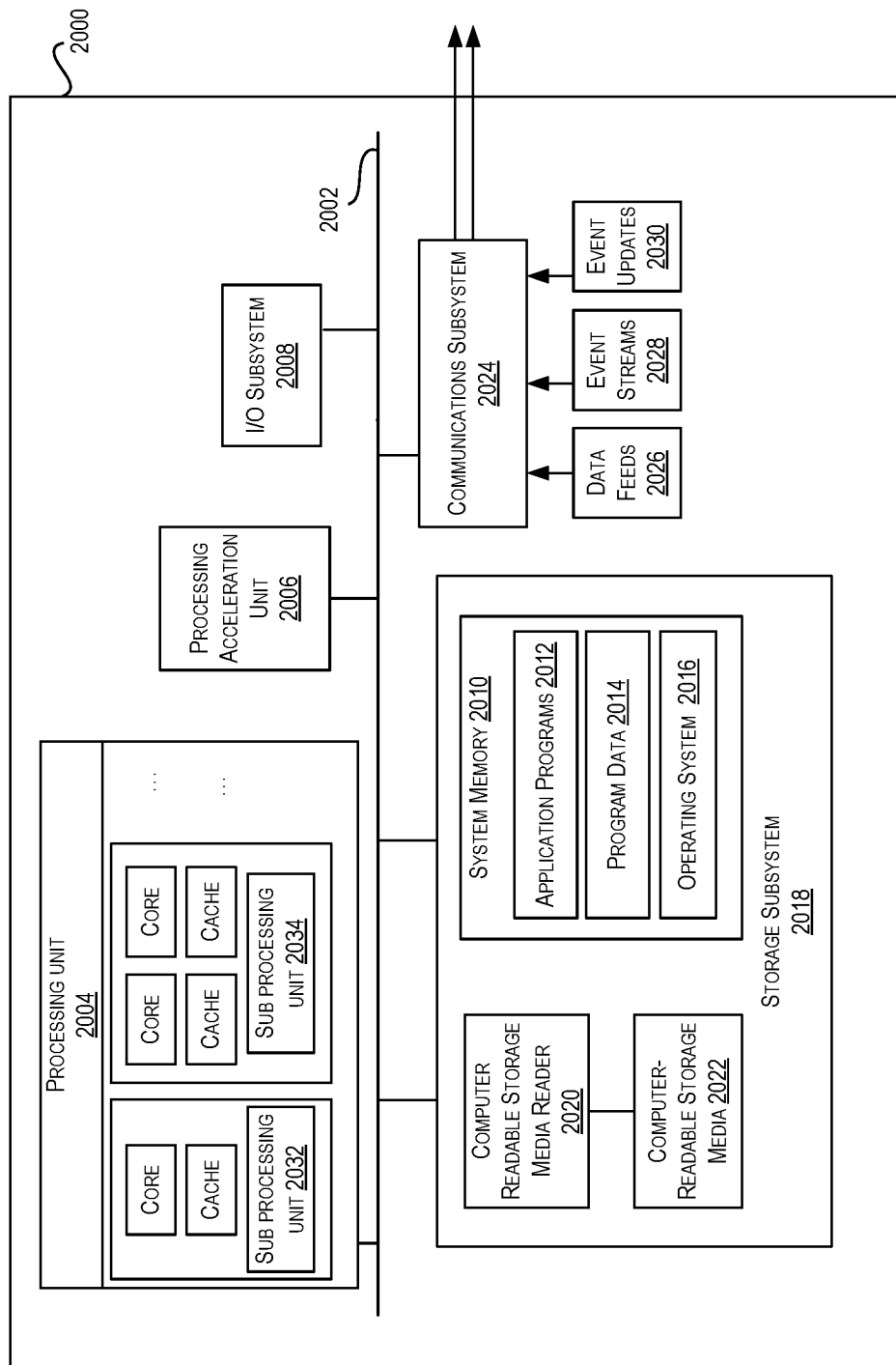
FIG. 20 is a block diagram illustrating an example computer system, according to at least one embodiment.

FIG. 20 illustrates an example computer system 2000, in which various embodiments may be implemented. The system 2000 may be used to implement any of the computer systems described above. As shown in the figure, computer system 2000 includes a processing unit 2004 that communicates with a number of peripheral subsystems via a bus subsystem 2002. These peripheral subsystems may include a processing acceleration unit 2006, and I/O subsystem 2008, a storage subsystem 2018 and a communications subsystem 2024. Storage subsystem 2018 includes tangible computer-readable storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative embodiments of the bus subsystem may utilize multiple buses. Bus subsystem 2002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2004, which can be implemented as one or more integrated circuits (e.g., a conventional microprocessor or microcontroller), controls the operation of computer system 2000. One or more processors may be included in processing unit 2004. These processors may include single core or multicore processors. In certain embodiments, processing unit 2004 may be implemented as one or more independent processing units 2032 and/or 2034 with single or multicore processors included in each processing unit. In other embodiments, processing unit 2004 may also be implemented as a quad-core processing unit formed by integrating two dual-core processors into a single chip.

In various embodiments, processing unit 2004 can execute a variety of programs in response to program code and can maintain multiple concurrently executing programs or processes. At any given time, some or all of the program code to be executed can be resident in processor(s) 2004 and/or in storage subsystem 2018. Through suitable programming, processor(s) 2004 can provide various functionalities described above. Computer system 2000 may additionally include a processing acceleration unit 2006, which can include a digital signal processor (DSP), a special-purpose processor, and/or the like.

I/O subsystem 2008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2000 may comprise a storage subsystem 2018 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 2004 provide the functionality described above. Storage subsystem 2018 may also provide a repository for storing data used in accordance with the present disclosure.

As depicted in the example in FIG. 20, storage subsystem 2018 can include various components including a system memory 2010, computer-readable storage media 2022, and a computer readable storage media reader 2020. System memory 2010 may store program instructions that are loadable and executable by processing unit 2004. System memory 2010 may also store data that is used during the execution of the instructions and/or data that is generated during the execution of the program instructions. Various different kinds of programs may be loaded into system memory 2010 including but not limited to client applications, Web browsers, mid-tier applications, relational database management systems (RDBMS), virtual machines, containers, etc.

System memory 2010 may also store an operating system 2016. Examples of operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 2000 executes one or more virtual machines, the virtual machines along with their guest operating systems (GOSs) may be loaded into system memory 2010 and executed by one or more processors or cores of processing unit 2004.

System memory 2010 can come in different configurations depending upon the type of computer system 2000. For example, system memory 2010 may be volatile memory (such as random-access memory (RAM)) and/or non-volatile memory (such as read-only memory (ROM), flash memory, etc.). Different types of RAM configurations may be provided including a static random-access memory (SRAM), a dynamic random-access memory (DRAM), and others. In some implementations, system memory 2010 may include a basic input/output system (BIOS) containing basic routines that help to transfer information between elements within computer system 2000, such as during start-up.

Computer-readable storage media 2022 may represent remote, local, fixed, and/or removable storage devices plus storage media for temporarily and/or more permanently containing, storing, computer-readable information for use by computer system 2000 including instructions executable by processing unit 2004 of computer system 2000.

Computer-readable storage media 2022 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 2022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2000.

Machine-readable instructions executable by one or more processors or cores of processing unit 2004 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to connect to one or more devices via the Internet. In some embodiments communications subsystem 2024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2024 can provide wired network connectivity (e.g., Ethernet) in addition to or instead of a wireless interface.

In some embodiments, communications subsystem 2024 may also receive input communication in the form of structured and/or unstructured data feeds 2026, event streams 2028, event updates 2030, and the like on behalf of one or more users who may use computer system 2000.

By way of example, communications subsystem 2024 may be configured to receive data feeds 2026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2024 may also be configured to receive data in the form of continuous data streams, which may include event streams 2028 of real-time events and/or event updates 2030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2024 may also be configured to output the structured and/or unstructured data feeds 2026, event streams 2028, event updates 2030, and the like to one or more databases that may be in communication with one or more streaming data source computers coupled to computer system 2000.

Computer system 2000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   determining, by a computer system, respective predicted sets of workloads executing on each of a plurality of hosts during a future time period;
   identifying, by the computer system, a plurality of response levels that specify, based on one or more respective host attributes, applicability of a respective set of reduction actions, wherein a first response level of the plurality of response levels specifies, based on a first host attribute, applicability of a first set of reduction actions, wherein a second response level of the plurality of response levels specifies, based on a second host attribute, applicability of a second set of reduction actions, and wherein the first set of reduction actions is more severe than the second set of reduction actions;
   determining 1) a first estimated power reduction that is expected for the first response level if the first response level is applied and 2) a second estimated power reduction that is expected for the second response level if the second response level is applied, the first estimated power reduction being determined based at least in part on the respective predicted sets of workloads and the first host attribute with which the applicability of the first set of reductions actions is specified, the second estimated power reduction being determined based at least in part on the predicted respective sets of workloads and the second host attribute with which the applicability of the second set of reduction actions is specified;
   selecting the first response level over the second response level based at least on the first estimated power reduction expected if the first response level is applied and the second estimated power reduction expected if the second response level is applied, wherein the first estimated power reduction that is estimated to result from application of the first response level is less than the second estimated power reduction that is estimated to result from application of the second response level;
   identifying one or more workloads of the respective predicted sets of workloads that (a) are currently executing on the plurality of hosts and (b) would be affected by application of the first set of reduction actions to the plurality of hosts according to the selected first response level;
   prior to the future time period, preemptively migrating the one or more workloads from respective hosts to other respective hosts of the plurality of hosts; and
   causing application of the first set of reduction actions to the plurality of hosts according to the first response level.

2. The method of claim 1, wherein determining the first estimated power reduction that is expected for the first response level comprises:
   determining, based on the first host attribute, that the first set of reduction actions are applicable to a first subset of hosts of the plurality of hosts;
   identifying the respective predicted sets of workloads executing on each of the first subset of hosts; and
   determining a respective power consumption of each of the respective predicted sets of workloads executing on each of the first subset of hosts.

3. The method of claim 2, wherein determining the first estimated power reduction that is expected for the first response level further comprises:
   determining a sum of the respective power consumption of the respective predicted sets of workloads executing on each of the first subset of hosts as the first estimated power reduction that is expected for the first response level if applied.

4. The method of claim 2, wherein determining the first estimated power reduction that is expected for the first response level further comprises:
   determining respective estimated power consumption of the predicted respective sets of workloads executing on each of the first subset of hosts after application of the first set of reduction actions to the first subset of hosts; and
   determining the first estimated power reduction expected for the first response level, if applied, further based on (a) the respective power consumption of the respective predicted sets of workloads executing on each of the first subset of hosts and (b) the respective estimated power consumptions of the respective predicted sets of workloads executing on each of the first subset of hosts after application of the first set of reduction actions to the first subset of hosts.

5. The method of claim 1, further comprising:
  determining a difference between a current value for an aggregate power consumption of the plurality of hosts and a value for an aggregate power threshold of the plurality of hosts; and
  determining that the first estimated power reduction expected for the first response level is greater than the difference;
  wherein selecting the first response level over the second response level is based at least on determining that the first estimated power reduction for the first response level is greater than the difference.

6. The method of claim 1, wherein the respective predicted sets of workloads executing on each of the plurality of hosts and the plurality of response levels that specify, based on one or more respective host attributes, applicability of the respective set of reduction actions to the plurality of hosts are identified based at least in part on at least one of:
  identifying a degradation or failure of a temperature control system for a physical environment including the plurality of hosts; or
  identifying a government reduction in power supply; or
  identifying an increase in external temperature.

7. A method, comprising:
  identifying, by a computer system, respective predicted sets of workloads executing on each of a plurality of hosts during a future time period;
  identifying, by the computer system, a plurality of response levels that specify, using respective host attributes, applicability of a respective set of reduction actions to the plurality of hosts, wherein a first response level of the plurality of response levels specifies, using a first host attribute, applicability of a first set of reduction actions, and wherein the first set of reduction actions is more severe than a second set of reduction actions associated with a second response level of the plurality of response levels;
  determining a first predicted impact for the first response level if the first set of reduction actions is applied, the first predicted impact being determined based at least on (a) the respective predicted sets of workloads executing on each of the plurality of hosts and (b) a first set of hosts to which the first set of reduction actions applies, each of the first set of hosts being individually associated with the first host attribute;
  wherein the first predicted impact is determined based on at least one of a priority of a host, or a number of affected hosts, a number of affected workloads, priority levels of one or more affected workloads, a number of affected customers, or priority levels of the affected customers;
  selecting the first response level from the plurality of response levels based at least on the first predicted impact for the first response level if the first set of reduction actions is applied, wherein the first predicted impact estimated to result from application of the first response level is less than a second predicted impact estimated to result from application of the second response level;
  identifying one or more affected workloads of the respective predicted sets of workloads that (a) are currently executing on the plurality of hosts and (b) would be affected by application of the first set of reduction actions to the plurality of hosts according to the selected first response level;
  prior to the future time period, preemptively migrating the one or more affected workloads from respective hosts to other respective hosts of the plurality of hosts; and
  causing application of the first set of reduction actions to the plurality of hosts according to the first response level.

8. The method of claim 7, further comprising:
  determining the second predicted impact for the second response level of the plurality of response levels if the second set of reduction actions is applied, the second predicted impact being determined based at least on (a) the respective predicted sets of workloads executing on each of the plurality of hosts and (b) a second set of hosts to which the second set of reduction actions applies, each of the second set of hosts being individually associated with a second host attribute;
  herein selecting the first response level from the plurality of response levels is based at least on the first predicted impact determined for the first response level and the second predicted impact determined for the second response level.

9. The method of claim 7, wherein determining the first predicted impact for the first response level comprises:
  determining, based at least in part on the first host attribute, that the first set of reduction actions are applicable to the first set of hosts of the plurality of hosts;
  identifying the respective predicted sets of workloads executing on each of the first set of hosts as the one or more affected workloads resulting from the first response level; and
  determining at least one of (a) the number of affected workloads for the first response level, or (b) the priority types of the affected workloads for the first response level.

10. The method of claim 7, wherein determining the first predicted impact for the first response level comprises:
  determining, based at least in part on the first host attribute, that the first set of reduction actions are applicable to the first set of hosts of the plurality of hosts;
  identifying the respective predicted sets of workloads executing on each of the first set of hosts;
  identifying respective customers for the respective predicted sets of workloads executing on each of the first set of hosts as the affected customers resulting from the first response level; and
  determining at least one of (a) the number of affected customers for the first response level if the first set of reduction actions is applied, or (b) the priority types of the affected customers for the first response level if the first set of reduction actions is applied.

11. The method of claim 7, further comprising:
  determining a second estimated power reduction for the first response level if the first set of reduction actions is applied, based at least on (a) the respective predicted sets of workloads executing on each of the plurality of hosts and (b) the first set of hosts to which the first set of reduction actions applies;
  wherein selecting the first response level from the plurality of response levels is based at least on the first predicted impact for the first response level and the second estimated power reduction for the first response level if the first response level is applied.

12. The method of claim 11, wherein the first response level is associated with a smallest impact that achieves a power reduction greater than or equal to a difference between a current value for an aggregate power consumption of the plurality of hosts and a value for an aggregate power threshold of the plurality of hosts.

13. A method, comprising:
- determining, by a computer system, respective predicted sets of workloads executing on each of a plurality of hosts during a future time period;
- identifying, by the computer system, a plurality of response levels that specify applicability of a respective set of reduction actions to the plurality of hosts;
- wherein a first response level of the plurality of response levels specifies, based on a first host attribute, applicability of a first set of reduction actions to the plurality of hosts, wherein the first set of reduction actions is more severe than a second set of reduction actions associated with a second response level of the plurality of response levels;
- determining a first estimated power reduction that is expected if the first set of reduction actions for the first response level are applied, the first estimated power reduction being determined based at least on (a) the respective predicted sets of workloads executing on each of the plurality of hosts and (b) a first set of hosts to which the first set of reduction actions apply according to the first host attribute;
- selecting the first response level from the plurality of response levels based at least on the first estimated power reduction that is expected if the first set of reductions actions for the first response level are applied, wherein the first estimated power reduction that is estimated to result from application of the first response level is less than a second estimated power reduction that is estimated to result from application of the second response level;
- identifying one or more workloads that (a) are currently executing on the plurality of hosts and (b) would be affected by application of the first set of reduction actions; and
- prior to the future time period, preemptively migrating the one or more workloads from respective hosts to other respective hosts of the plurality of hosts.

14. The method of claim 13, wherein determining the respective predicted sets of workloads executing on each of the plurality of hosts during the future time period is based on historical patterns of workloads executing on the plurality of hosts.

15. The method of claim 13, wherein determining the respective predicted sets of workloads executing on each of the plurality of hosts during the future time period is performed using a machine learning model that has previously been trained using a supervised learning algorithm to predict a set of workloads based at least in part on historical workload data provided as training data.

16. The method of claim 13, further comprising:
- obtaining, by the computer system, a predicted value for an aggregate power consumption of the plurality of hosts for the future time period;
- obtaining, by the computer system, a predicted value for an aggregate power threshold of the plurality of hosts for the future time period; and
- responsive to determining that the predicted value for the aggregate power consumption exceeds the predicted value for the aggregate power threshold, selecting from the plurality of response levels.

17. The method of claim 13, further comprising:
- identifying, by the computer system, a predicted failure of a temperature control system associated with the plurality of hosts for the future time period;
- obtaining, by the computer system, a predicted value for an aggregate power threshold of the plurality of hosts for the future time period based at least in part on identifying the predicted failure; and
- responsive to identifying the predicted failure, making a selection from the plurality of response levels.

18. The method of claim 17, wherein identifying the predicted failure of the temperature control system utilizes a machine-learning model that has been previously trained with training data comprising historical data associated with the plurality of hosts, the machine-learning model being trained using a supervised learning algorithm to identify the predicted failure from input data.

19. The method of claim 18, wherein the historical data of the training data comprises temperature control system data, historical power consumption data corresponding to a set of hosts, and historical aggregate power thresholds.

* * * * *